(12) United States Patent
Lathers

(10) Patent No.: US 6,712,418 B1
(45) Date of Patent: Mar. 30, 2004

(54) MODULAR SYSTEM AND APPARATUS FOR COVERING A TRUCK BED, AND METHOD OF USING SAME

(76) Inventor: Michael W. Lathers, P.O. Box 447, Eastport, MI (US) 49627

( * ) Notice: Subject to any disclaimer, the term of this patent is extended or adjusted under 35 U.S.C. 154(b) by 23 days.

(21) Appl. No.: 09/835,940

(22) Filed: Apr. 16, 2001

Related U.S. Application Data

(63) Continuation-in-part of application No. 09/427,527, filed on Oct. 26, 1999, now Pat. No. 6,217,102.
(60) Provisional application No. 60/105,610, filed on Oct. 26, 1998.

(51) Int. Cl.$^7$ ................................................ B60P 7/02
(52) U.S. Cl. .......................... 296/100.02; 296/100.06
(58) Field of Search ....................... 296/100.06, 100.09, 296/100.08, 100.07, 100.1, 100.02

(56) References Cited

U.S. PATENT DOCUMENTS

| | | | |
|---|---|---|---|
| 3,765,717 A | 10/1973 | Garvert | |
| 3,829,151 A | 8/1974 | Fellenstein | |
| 4,216,990 A | * 8/1980 | Musgrove et al. | |
| 4,335,916 A | 6/1982 | Gutgsell | |
| 4,824,162 A | * 4/1989 | Geisler et al. | |
| 5,011,214 A | 4/1991 | Friesen et al. | |
| 5,018,777 A | 5/1991 | Swenson et al. | |
| 5,121,960 A | 6/1992 | Wheatley | |
| 5,127,701 A | * 7/1992 | Miller | |
| 5,183,309 A | 2/1993 | Jordan | |
| 5,203,364 A | 4/1993 | Koole | |
| 5,228,739 A | 7/1993 | Love | |
| 5,322,336 A | 6/1994 | Isler | |
| 5,364,154 A | 11/1994 | Kaiser | |
| 5,584,521 A | 12/1996 | Hathaway et al. | |
| 5,636,893 A | 6/1997 | Wheatley et al. | |
| 5,788,315 A | 8/1998 | Tucker | |
| D398,282 S | 9/1998 | Dirks | |
| 5,857,729 A | * 1/1999 | Bogard | 296/100.09 |
| 5,951,095 A | 9/1999 | Herndon | |
| 5,971,469 A | * 10/1999 | Lund et al. | 296/100.06 X |
| 6,042,173 A | * 3/2000 | Nett | 296/100.06 |
| 6,076,881 A | 6/2000 | Tucker | |
| 6,234,559 B1 | * 5/2001 | Block et al. | 296/100.06 |
| 6,338,520 B2 | * 1/2002 | Rusu et al. | 296/100.07 |
| 6,340,194 B1 | * 1/2002 | Muirhead et al. | 296/100.06 |
| 6,382,698 B1 | * 5/2002 | Harrell | 296/100.06 |

* cited by examiner

Primary Examiner—Joseph D. Pape
(74) Attorney, Agent, or Firm—Carrier, Blackman & Associates, P.C.; William D. Blackman; Joseph P. Carrier

(57) ABSTRACT

A tonneau cover system, for covering a pickup truck cargo bed, includes a center panel, two side panels, and accessory hardware for supporting the center panel on the truck bed such that the center panel may be vertically moved thereon, between open and closed positions. In an open position, the center panel is at least partially disposed above the side panels. The cover side panels preferably include seals on inner longitudinal sides thereof, for sealingly engaging the center panel in the closed position thereof. The center panel may be made removable to allow for installation of selected accessory structures, such as camping tents, spare fuel tanks, fifth-wheel trailer connection hardware, or other accessories. The system may, optionally, include a front panel for placement across the entire width of the truck bed forward of both the side and center panels. Where used, the front panel may be made up of a frame and a removable cover plate which fits in the frame. Removal of the cover plate from the frame allows for still greater flexibility in accessory add-ons.

23 Claims, 42 Drawing Sheets

FIG. 4A
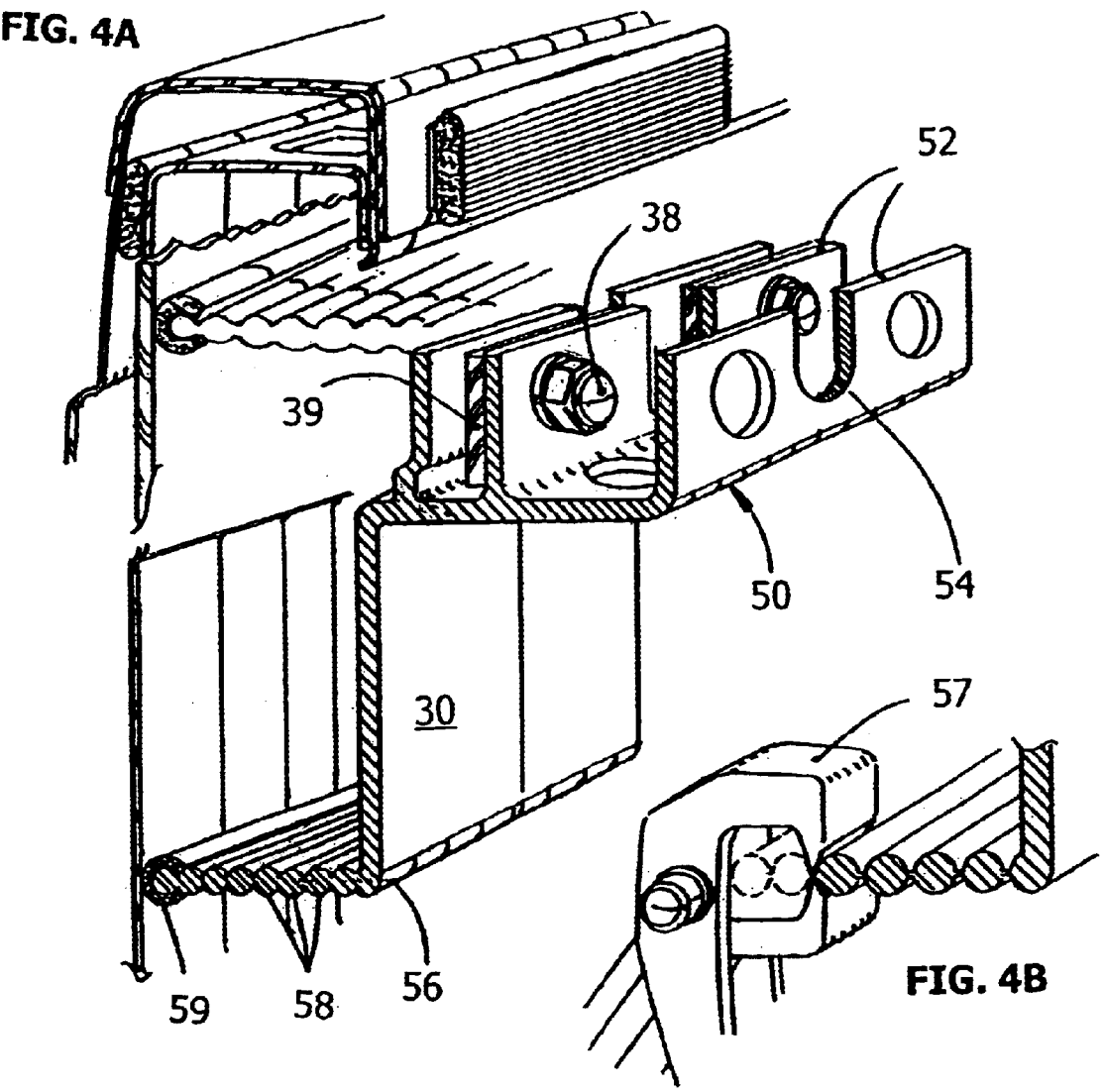
FIG. 4B
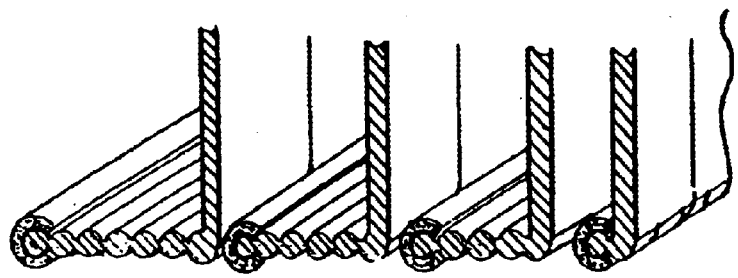
FIG. 4C

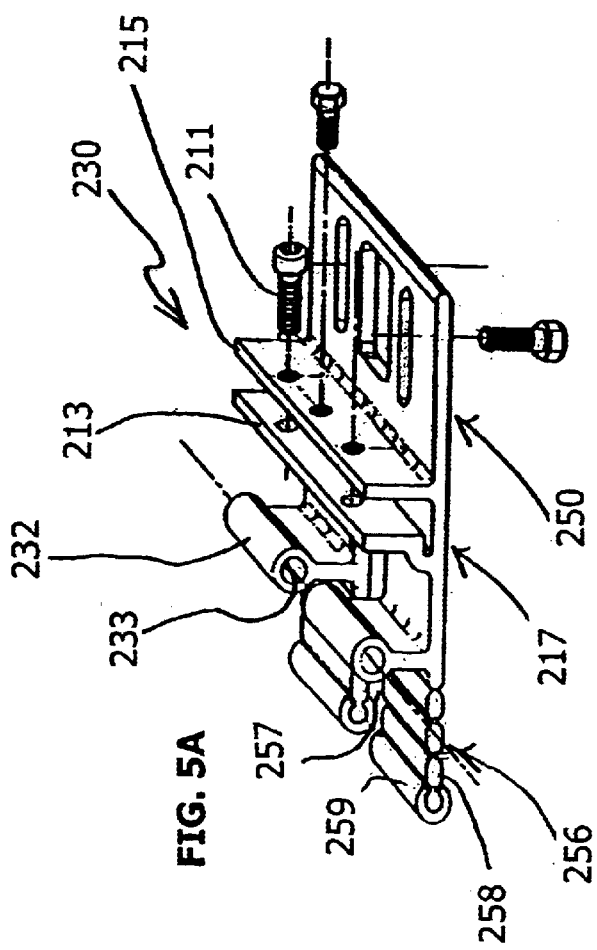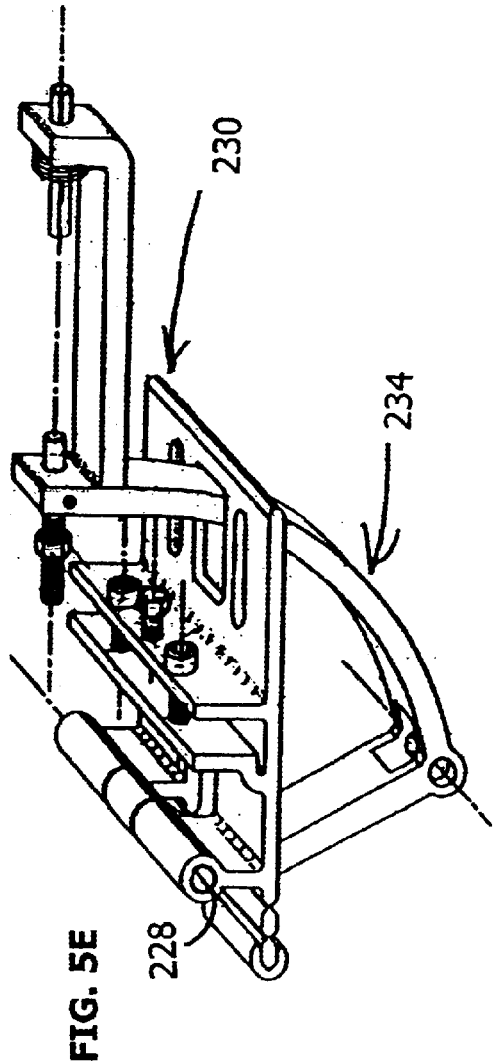
FIG. 5A
FIG. 5E

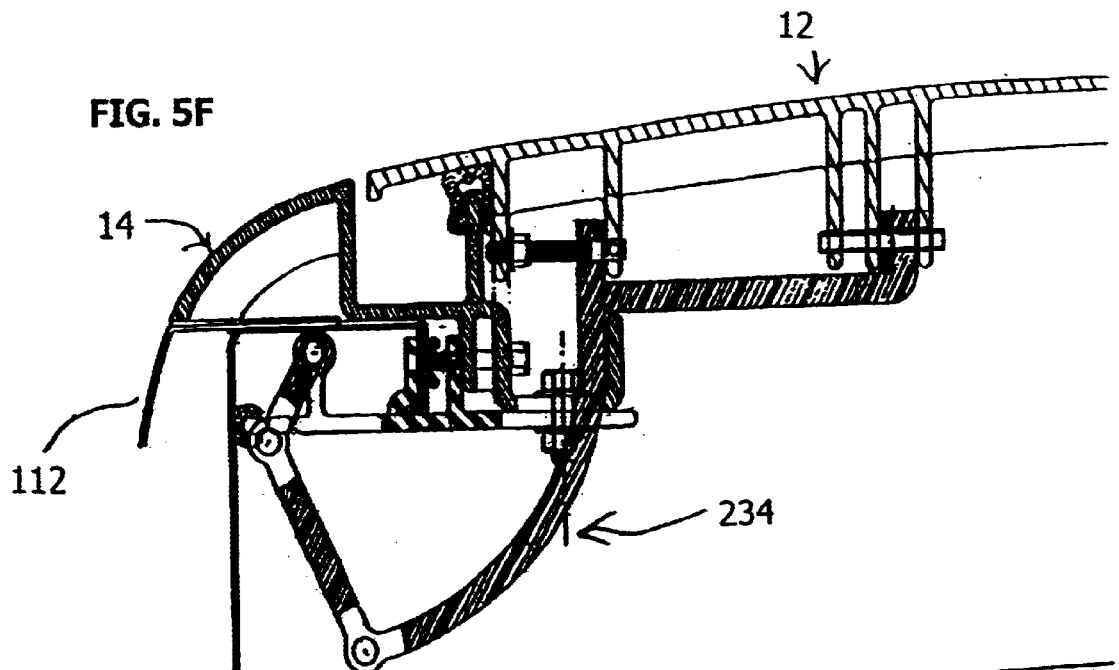
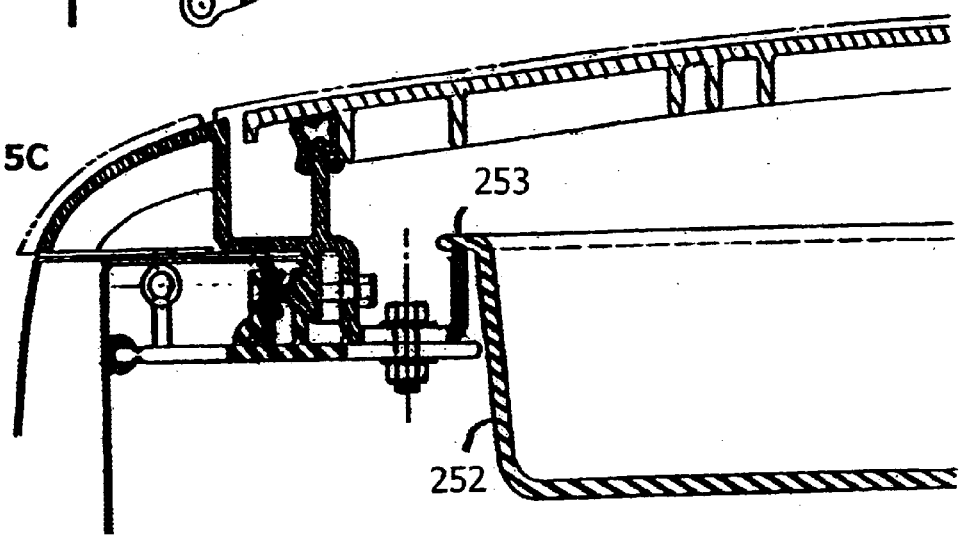

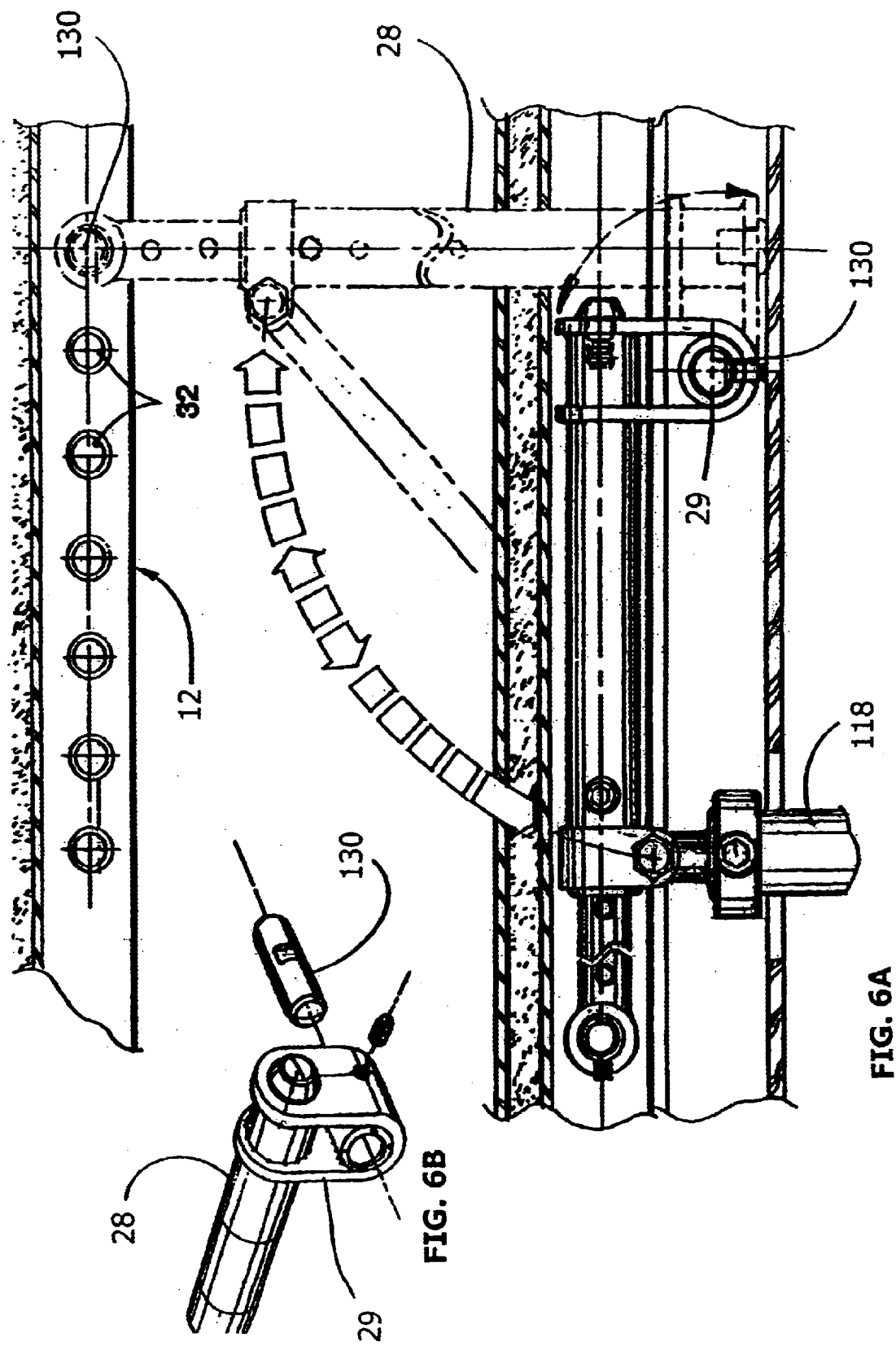

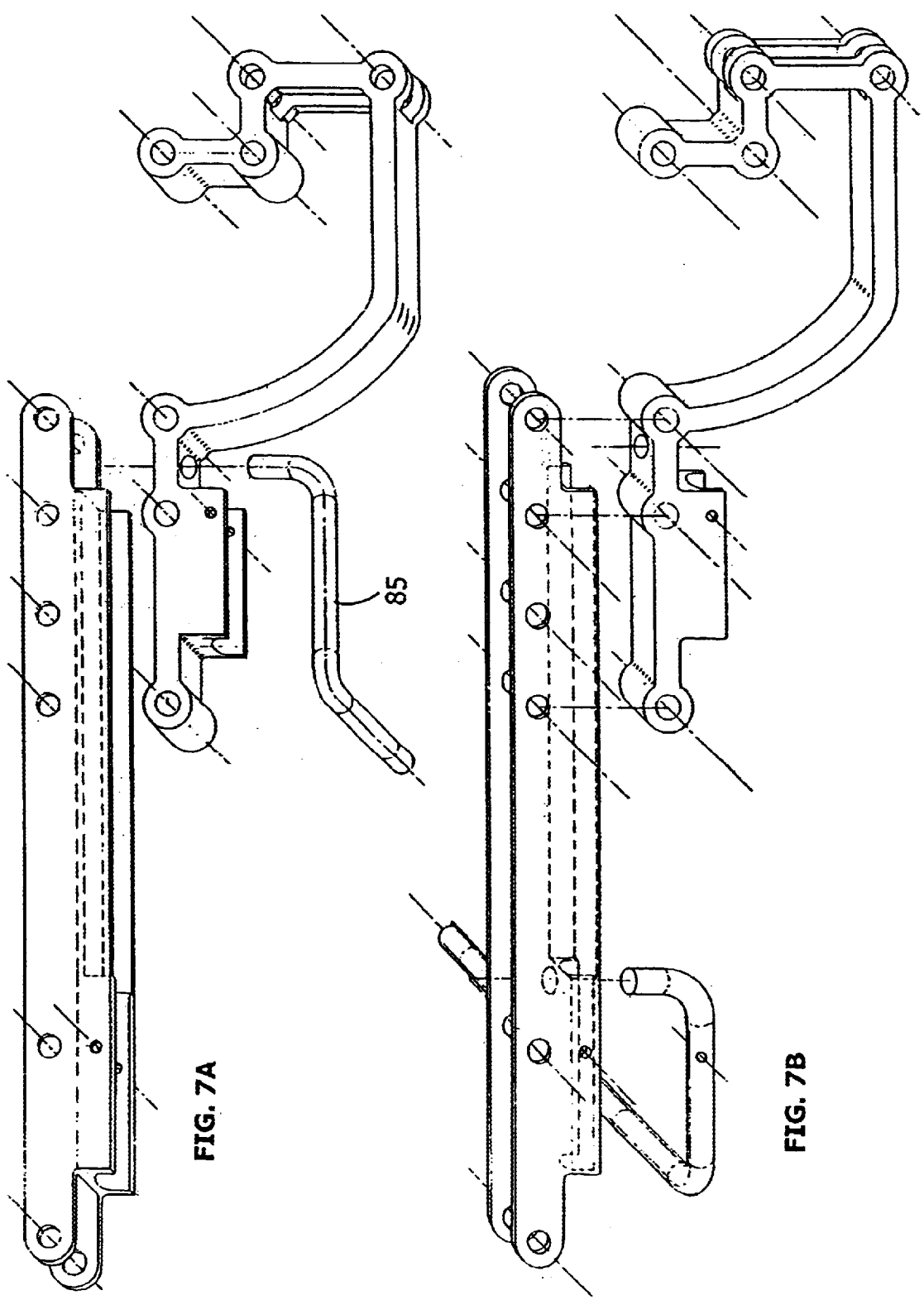

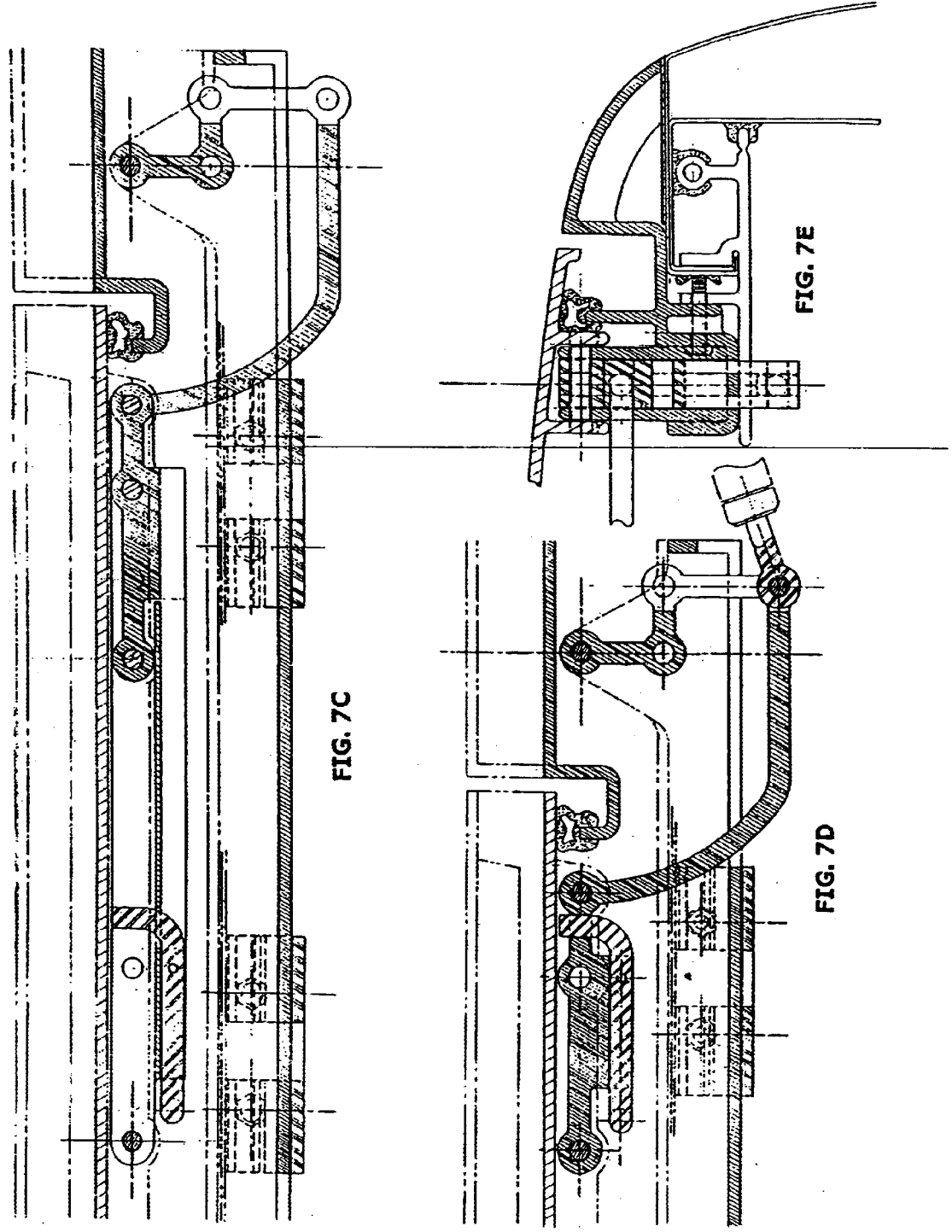

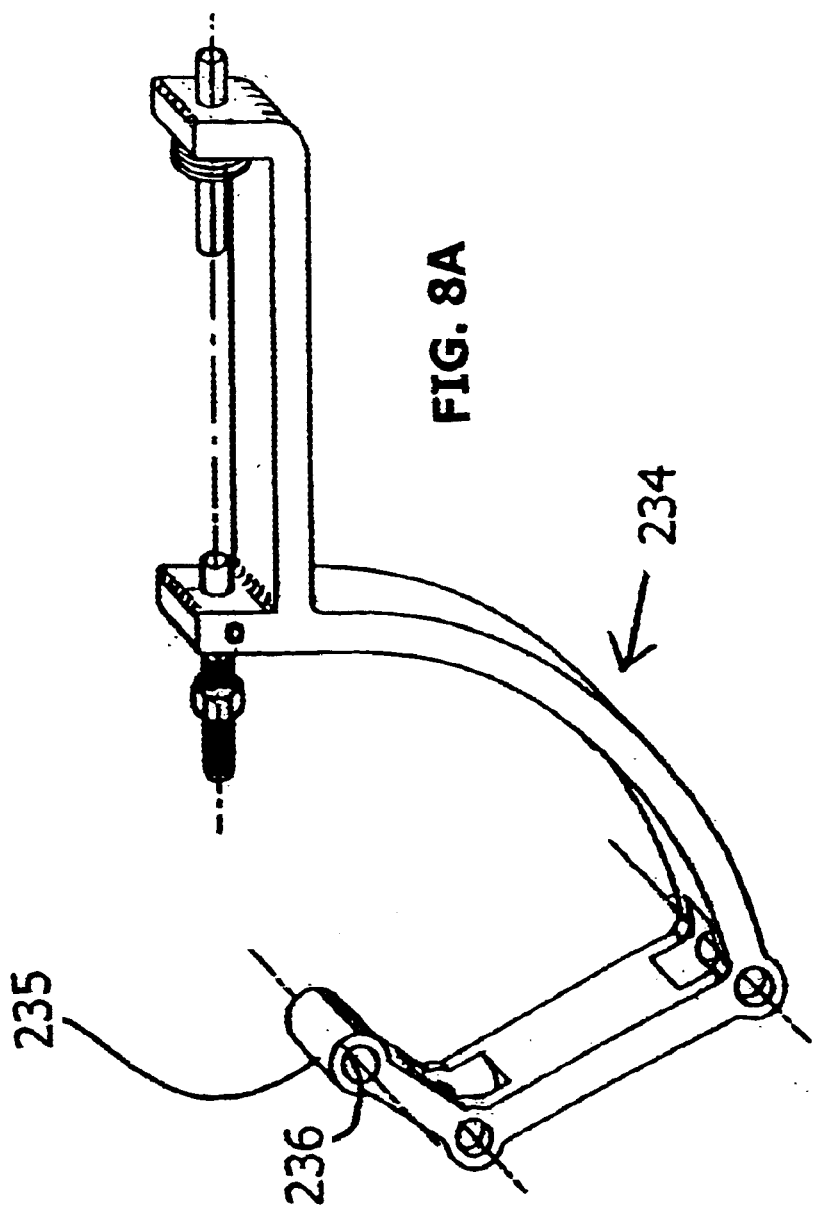

FIG. 11A
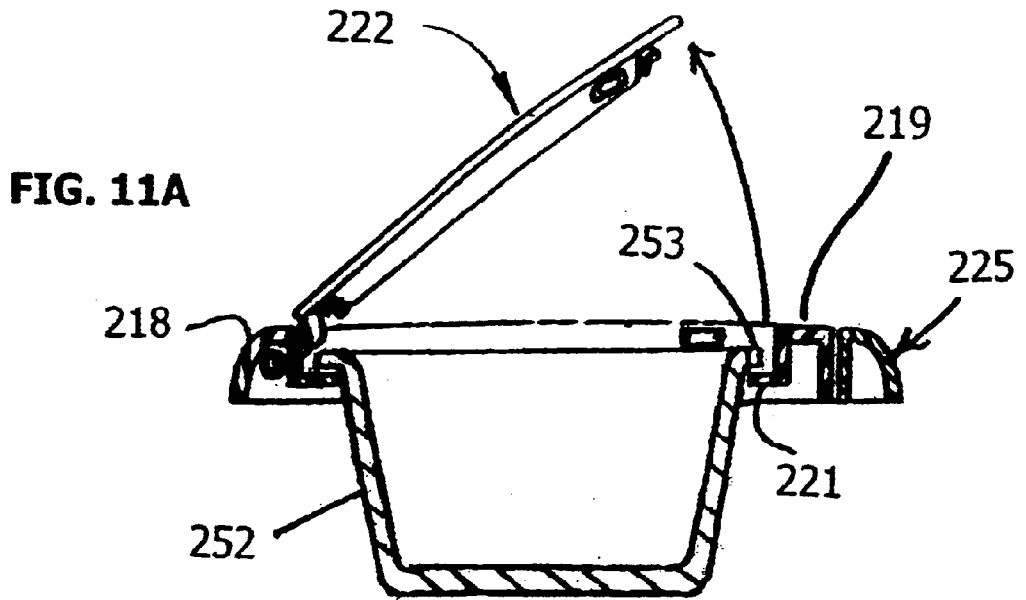
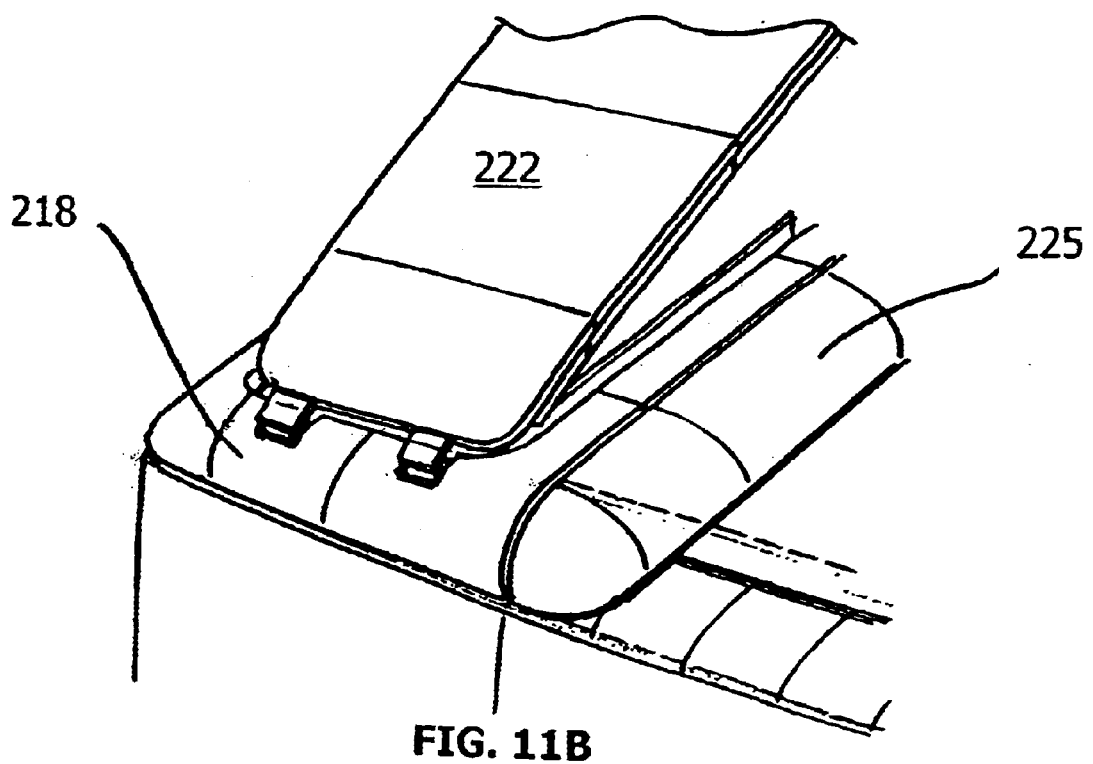
FIG. 11B

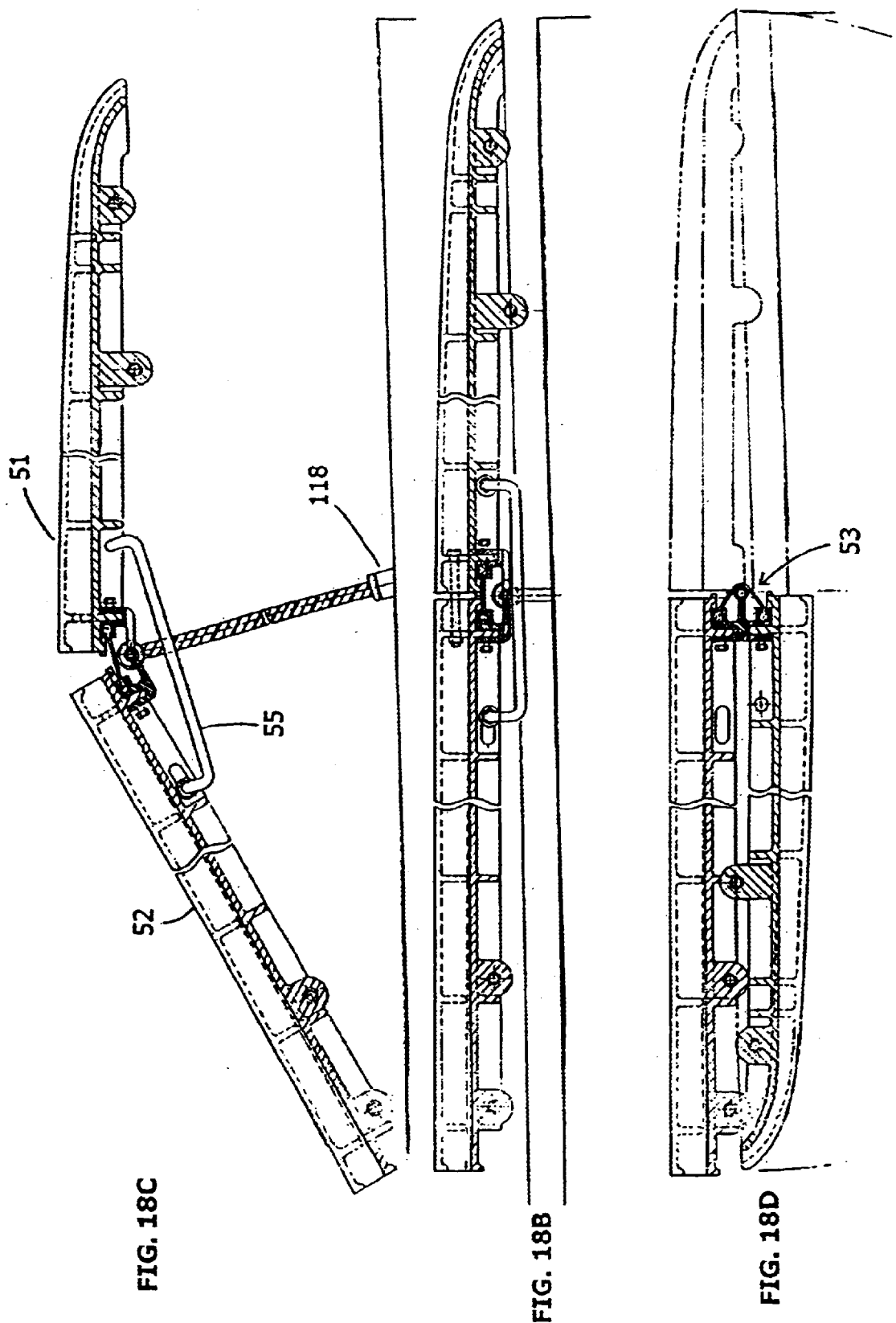

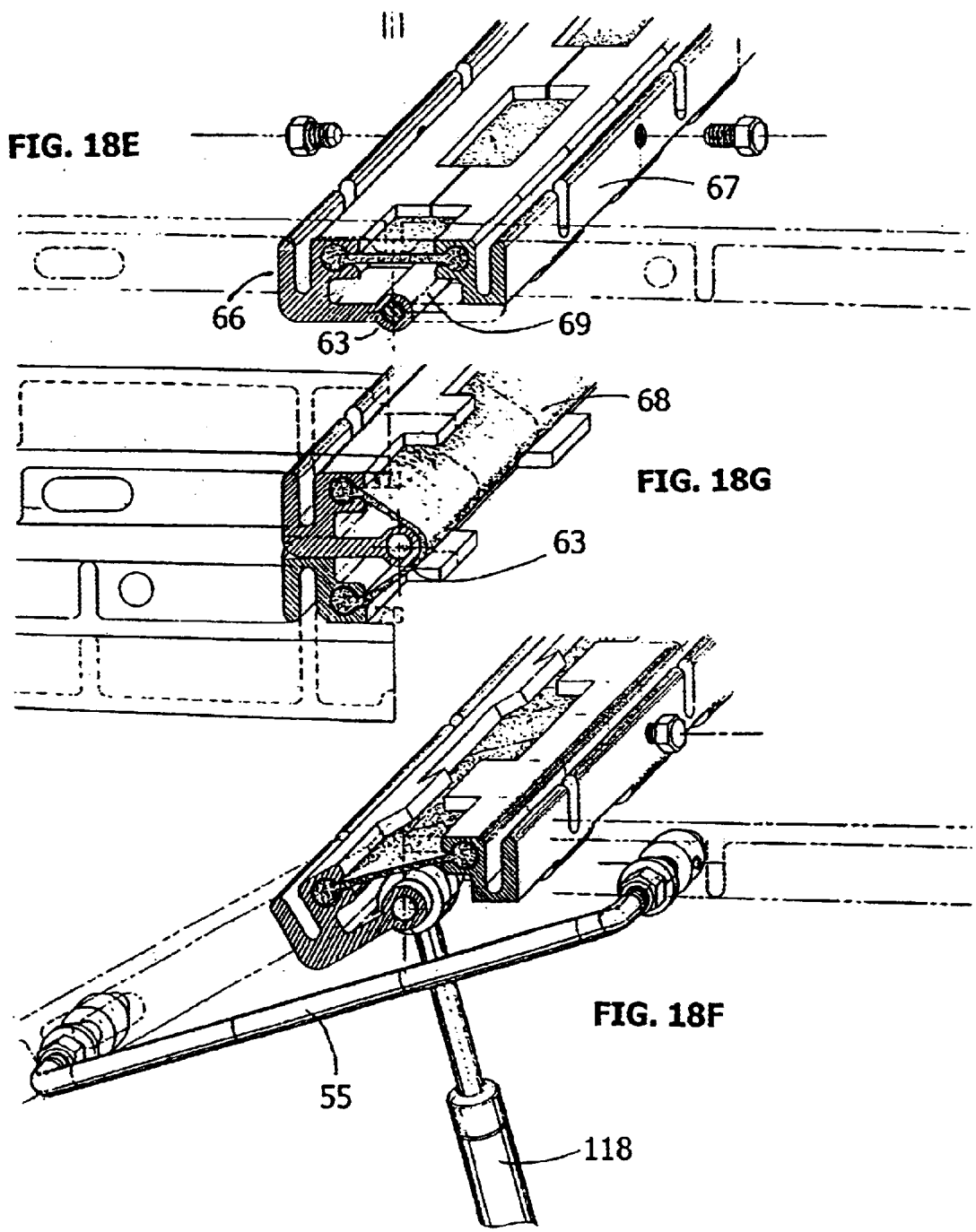

MODULAR SYSTEM AND APPARATUS FOR COVERING A TRUCK BED, AND METHOD OF USING SAME

CROSS-REFERENCE TO RELATED APPLICATIONS

This application claims priority under 35 USC §119 from U.S. Provisional Patent Application Serial No. 60/105,610, filed Oct. 26, 1998, and entitled "Tonneau Cover for Pick-Up Type Vehicle and Attachment Mechanism therefor". This application also claims CIP under 35 USC §120 from U.S. patent application Ser. No. 09/427,527, now U.S. Pat. No. 6,217,102 filed Oct. 26, 1999. The disclosure of each of the above-identified parent applications is incorporated herein by reference.

BACKGROUND OF THE INVENTION

1. Field of the Invention

The present invention relates to a system and apparatus for covering a rear cargo area of a pick-up type vehicle. More particularly, the present invention relates to a system and apparatus of the type described that is durable, lightweight, versatile in use, economical to manufacture, easy to install, easy to manipulate for accessing the rear cargo area, and easy to remove if desired.

2. Description of the Background Art

Many different types of tonneau covers are known and commercially available. Tonneau covers are generally classified as either soft, being constructed of a flexible, lightweight material such as canvas, or rigid, being constructed of heavier materials such as fiberglass. Soft covers are less expensive, but provide only minimal security and load-bearing ability. Rigid tonneau covers are favored for their durability, strength, security, and load-bearing ability, but rigid tonneau covers proposed in the past have limitations and disadvantages associated therewith.

For example, attachment of an existing rigid tonneau cover to a vehicle is relatively complicated. The known rigid tonneau covers typically include specialized hardware for attaching to the vehicle, or they require drilling into the vehicle body. Some use a piano-type hinge in the front, and gas shocks drilled for support into the vehicle body at the rear. Most of the known rigid tonneau covers pivotally open at one end, like an alligator mouth, but some of the known rigid covers are hinged in the middle, and open from each side.

Once attached, the conventional rigid tonneau covers, including the various attachment options, tend to limit access to the cargo area and to limit the size of what can be carried. In order to take full advantage of the cargo area, one must completely remove the cover. Complete removal of the conventional rigid cover is, however, typically almost as complicated as attachment.

The substantial weight of the conventional rigid cover further complicates removal as well as shipping and storage thereof. Many of these covers weight around 150 pounds or more. Between the awkward size of most covers and the complicated attachment mechanisms therefor, it is nearly impossible for one unassisted person to remove the cover.

Once removed, these covers are difficult to store due to their size and weight. Freight costs, related to size and weight of the known covers, tend to restrict the distribution thereof. Large retailers do not carry them because of the high shipping costs and storage difficulties associated therewith. Many are sold from outdoor lots, usually in a graveled and fenced enclosure, which limits public exposure and distribution.

Most of the conventional rigid covers are manufactured from fiberglass, aluminum, or steel. Steel and aluminum covers are easily dented or damaged and are limited in terms of design freedom, so fiberglass is used most often. Fiberglass covers are typically made with an open-face mold using resins and fiber cloth either laid in, blown in, or sprayed in with a gun that mixes resin and chops the glass. Since there is little internal strength to a fiberglass resin product, the covers are thick and therefore very heavy. They are also typically molded as a single piece. As a single piece, the cover must be manufactured for a particular model of pickup truck, which further adds to the manufacturing cost and creates additional inventory difficulties.

As a general matter, the conventional fiberglass tonneau covers are disadvantageous in terms of durability, because there is very limited 'give' between the covers and the truck beds to which they are attached. When the truck bed flexes, twists, bumps, etc. so too does the tonneau cover, and with limited give between the cover and the bed, peripheral edges, connection points, and other stressed portions of the cover become damaged.

Further, in conventional designs, when pneumatic or hydraulic cylinders are used to facilitate pivotal lifting of an end of the cover, the cylinders are conventionally connected to longitudinally intermediate side portions of the cover, rather than to the non-pivoted end of the cover, to enable the non-pivoted end of the cover to be raised a relatively large extent. Such intermediate location of the cylinders undesirably places a relatively large load on the cylinders because the distance (lever arm) from the cylinders to the pivot is relatively short, and also places a relatively large load on the portions of the cover to which the cylinders are attached, because of the distance from the free end of the cover. Thus it has been conventionally necessary to use cylinders of relatively large capacity, and to significantly reinforce the connecting portions of the cover, where they receive the cylinder ends.

Another problem with conventional rigid covers is the quality of appearance. When painted, conventional fiberglass covers in time fade, crack, and show what is called print through where one can see the woven cloth within the fiberglass resin. The underside typically has a rough texture as a result of the fiberglass molding and does not paint well, if painted at all.

Fiberglass covers, due to their paint problems, and aluminum or steel covers, due to their limitations is design freedom, tend to look like an afterthought rather than an integral part of the pickup truck. Appearance problems combined with access limitations, significant weight, attachment and removal problems, and shipping and storage problems, have severely limited the marketability and appeal of known tonneau covers. The following U.S. Patents disclose some specific, conventional tonneau covers.

Dirks, U.S. Design Pat. D 398,282 discloses a tonneau cover for a pickup truck bed having two wedge-shaped vertical side members which support a large flat substantially horizontal cover plate, which appears to be pivotally mounted with respect to the side members. Forward of the front edge of the cover plate are two more square auxiliary plates which are disposed side by side and which are smaller than the cover plate.

Friesen et al., U.S. Pat. No. 5,011,214 discloses a tonneau cover made in three panel segments which are pivotally and hingedly joined together, and which are arranged in a side-by-side orientation over the truck bed. The panel segments are connected together by levers and links, somewhat like the components of a convertible top. The hinges between the panel segments run parallel to the longitudinal axis of the vehicle. An actuator may be provided for moving the panel segments between an extended condition with the panel segments arranged side by side and substantially coplanar, and a folded condition with the panel segments arranged face to face at a side edge of the truck bed. Although this design provides the advantages of durability and strength gained from a rigid cover, it is somewhat complex, limits full access to the truck bed, and is difficult to remove.

Swenson et al., U.S. Pat. No. 5,018,777 discloses a hinge and connection assembly kit for a removable truck cap as opposed to a cover. Each hinge connection assembly grasps the channel rail of a box side wall, by clamping the truck rail with a tightenable threaded damping plate, and includes a hinge mounting bolt. The head of the hinge mounting bolt rests against the truck box side wall. This design provides the feature of easy removability, but is designed for use with truck cap or camper shell rather than a tonneau cover. Such a design yields a cap that is typically heavy and awkward to open or remove. It also limits access to the truck bed without full removal.

Wheatley, U.S. Pat. No. 5,121,960 discloses a rail attachment system for a flexible truck tonneau cover. The rail attachment system of Wheatley includes a pair of matching clamping members which clamps a rail to a truck bed side wall without drilling holes therein. A nut and bolt clamp the two clamping members together against the truck wall section. Although easy to remove, this design is limited to a flexible tonneau cover and does not provide the advantages of a rigid tonneau cover such as durability, strength, and load bearing characteristics.

Jordan, U.S. Pat. No. 5,183,309 discloses a rigid, low profile tonneau cover for a truck. The tonneau cover of Jordan is made in three sections which are hingedly and pivotally joined together. As in the Friesen reference, the hinges between the panel segments run parallel to the longitudinal axis of the vehicle. A framework is provided below and supporting the center section, and the side panels are attached to the center section using gas shocks, so they can be pivotally lifted upwardly for access to the contents of the truck bed. Although providing easy access, this design limits access to the truck bed, and is difficult to mount as well as to remove.

Isler, U.S. Pat. No. 5,322,336 discloses a hinged tonneau cover for a pickup truck. The tonneau cover of Isler is a framework covered by a soft top, which is attached to the front of the truck bed with a hinge, and which is attached at the back by a pair of gas shocks. Modified C-clamps are provided to connect the base of each gas shock to the truck bed, and the C-clamps mount onto the truck side wall without requiring drilling holes thereinto. Although easy to attach and remove, this design is limited to a flexible tonneau cover and does not provide the advantages of a rigid tonneau cover such as durability, strength, and load-bearing ability.

SUMMARY OF THE INVENTION

The present invention has been developed to overcome the foregoing limitations and disadvantages of conventional tonneau covers, and to generally fulfill a need in the art for a rigid, lightweight and versatile tonneau cover. The present invention provides a tonneau cover system and apparatus for covering a rear cargo area of a pickup truck. A covering system and apparatus according to the invention is easy to manipulate when installed on a vehicle, is easy to install and remove, provides selective access to the cargo area when needed, has a high quality appearance, and is inexpensive to ship, store, and manufacture.

A cover apparatus, according to a first embodiment of the invention, includes a center panel, two side panels, a front panel, related mounting hardware including specialized reinforcing support brackets, and support structure for movably supporting the center panel on a truck box. All of the above panels are made of rigid material.

When the system hereof is installed on a vehicle, the center panel may be vertically moved, relative to the truck box, between a closed position and an open position in which at least a portion of the center panel is above the side panels with a space therebetween.

Preferably, seals are provided on the inner longitudinal sides of the side panels, for engaging the side edges of the center panel in the closed position thereof, to resist moisture entering the cargo area of the truck box. Each side panel may include a drip rail.

It is further preferable that the center and side panels are molded of a durable and relatively lightweight plastic material.

According to a preferred embodiment of the invention, the center panel is made in a standardized generic and universal size for use on most pickup trucks, or at least on similar-sized pickup trucks. The provision of such a generic standard center panel, or a limited number of standard center panels, limits the number of variations which must be manufactured, thus significantly reducing manufacturing costs, inventory requirements, storage costs, etc.

Also, the center panel is preferably formed with a lightweight multi-layer construction, including a molded base layer, a foamed middle core bonded to the base layer with adhesive or the like, and a molded top layer bonded to base layer at peripheral edges thereof, but floatingly disposed above the foamed middle core. Optionally, in such multi-layer construction, the top layer (which is normally the only section of the panel exposed to view) may have special, ornamental projections, indentations and/or coloring molded therein, to enhance the appearance thereof, give manufacturer and/or vehicle line brand recognition, etc.

Further, optional accessories may be provided for attachment to the center panel, including specialized cargo racks such as a ladder rack, a ski rack, a luggage rack, etc. These accessories are preferably molded plastic components attached to the inner and top layers of the center panel at the peripheral surfaces thereof.

The side panels can be made in varying sizes, adapted for specific applications on different trucks.

It is also preferable that the center panel is capable of being disposed substantially parallel to the floor of the truck bed, in an open position thereof, to provide access to substantially the entire truck cargo area.

The support hardware for the apparatus preferably includes a plurality of specialized hinges, adapted to be fixed to the side walls of the truck box, for permitting the center panel to move between the open and closed positions thereof. The hinges may be adjustably extensible, to allow a user to raise the center panel to different heights, for providing varying degrees of access to the cargo area of the truck box.

In another alternative aspect of the invention, the center panel is pivotally attached to the front wall of the truck box and is pivotally movable about a hinge at the top edge of the front wall, from the closed position into an open position thereof. In this aspect of the invention, the support hardware preferably includes a plurality of hinges for permitting the center panel to rotate about the front wall of the truck box, between the closed position and an open position thereof.

The support hardware may also include a plurality of reinforcing support brackets, adapted to be fixed to the side walls of the truck box, and a number of adjustable and demountable supports for installation between corresponding reinforcing support brackets and rear lateral portions of the center panel, for raising the rear portion of the center panel to rotationally open the center panel. The demountability of the adjustable supports allows the cover to be opened beyond its normal range of motion, including a fully opened position perpendicular to the floor of the truck bed.

It is further preferable that each of the adjustable supports include a gas shock for raising the rear portion of the center panel, and that the gas shock is adjustably extensible, and placable into engagement with different portions of associated reinforcing support brackets for raising the rear portion of the center panel to different heights.

In another optional aspect of the invention, specialized delta brackets may be used to connect the gas shocks to the tailgate of the truck, such that opening and closing the tailgate correspondingly raises or lowers the center panel.

In still another aspect of the invention, a side edge of the center panel may be hingedly attachable to one of the side walls of the truck box, so that the center panel is able to rotate about such side wall of the truck box, between a closed position and a sideways open position thereof. With this aspect of the invention, the support means also preferably includes a plurality of hinges, a plurality of reinforcing support brackets, and a plurality of raising and lowering means, including demountable gas shocks, as described in the previous aspect of the invention.

According to yet another aspect of the invention, there is provided a reinforcing support bracket for supporting a tonneau cover on a truck box of a pickup type vehicle. Preferably, the reinforcing support bracket includes gripping structure for clamping on an upper lip of a side wall of the truck box, a support section adapted to support the tonneau cover thereon, and a stabilizing section adapted to engage an inner surface of the truck box side wall. It is preferable that the gripping structure comprises a pair of opposing gripping wall elements, adapted to clamp the upper lip of the truck side wall therebetween, and adjustable fasteners for adjusting a distance between the gripping wall elements. The stabilizing section is preferably made adjustable, so as to be capable of extending different distances away from the gripping structure. For example, the stabilizing section may include a plurality of removable segments to allow a user to adjust the projecting distance of the stabilizing section.

It is further preferable that the reinforcing support bracket include a cushion, on the stabilizing section thereof, for damping transmission of vibrations between the stabilizing section and the truck side wall, in order to protect the surface of the truck side wall.

According to yet another aspect of the invention, a tonneau cover, or a center panel thereof, may be provided with an auxiliary tailgate.

Where used, the auxiliary tailgate may replace the conventional tailgate at the rear of the pickup bed. Alternatively, where sidewall risers are used to create a truck cap above the bed, the auxiliary tailgate may be used in conjunction with the conventional tailgate. The auxiliary tailgate, where used, is able to pivot upwardly about the rear edge of the center panel, and may, optionally, be constructed with a multi-layer structure, similar to the center panel of the tonneau cover system.

In yet another aspect of the invention, there is provided a foldable tonneau cover for covering the truck box of a pickup type vehicle, including a front panel, a center panel hingedly connected to the front panel; a rear panel hingedly connected to the center panel, and connecting structure for restraining the hinged connections between each panel. In this embodiment, the front panel, the center panel, and the rear panel are normally restrained in a substantially coplanar configuration by the connecting structure. Hardware for removably attaching the cover to the truck box is also provided.

In this aspect of the invention, the cover may be unfolded from a folded configuration, in which the front panel, the center panel, and the rear panel are substantially parallel to one another, into a flat operative configuration in which the front panel, the center panel, and the rear panel are substantially coplanar, when attached to the truck box. This aspect preferably also includes a plurality of extruded clips, each clip adapted to be fixed on a top edge of one longitudinal wall of a truck box, for demountably attaching the cover to the top of a truck box.

It is an object of the present invention to provide a rigid tonneau cover which is lightweight and sturdy, yet has a high quality appearance and paintability.

Another object of the present invention is to provide a rigid tonneau cover which is easy to mount on the truck box, without the need for permanent alterations to the truck body, and is also easy to remove to provide full access to the truck box cargo area.

It is a further object of the invention to provide a highly versatile, rigid tonneau cover which may open in a variety of methods and a wide range of positions to provide different degrees of access to the truck box cargo area.

Another object of the invention is to provide a rigid tonneau cover comprising several independently moveable panels to facilitate storage and shipping, and to add design versatility.

Yet another object of the invention is to provide a rigid tonneau cover including many generic components to fit most truck models, thereby providing cost savings related to manufacture of generic components.

It is another object of the invention to provide a foldable tonneau cover to facilitate storage and shipping.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 4A is a perspective view showing a first embodiment of a reinforcing support bracket which is usable as part of the system hereof, and also showing part of the truck side wall.

FIGS. 4B–4C are broken away perspective views of the reinforcing support bracket of FIG. 4A, showing the manner in which the bracket is adjusted in size.

FIG. 5A is a perspective view of a second embodiment of a reinforcing support bracket which is usable as part of the system hereof, in place of the bracket of FIG. 4A.

FIG. 5C is a cross-sectional view of the bracket of FIG. 5A, installed on a truck bed together with other components of the system hereof.

FIG. 5E is a perspective view similar to FIG. 5A, and also showing the optional curbside hinge of FIG. 8A in cooperation therewith.

FIG. 5F is a cross-sectional view of the bracket and hinge of FIG. 5E, installed on a truck bed together with other components of the system hereof.

FIG. 6A is a side plan view showing the structure of a first hinge member, which is usable to pivotally attach the center panel to the support structure of FIGS. 4A–4E.

FIG. 6B is a detail perspective view of an end of the hinge member of FIG. 6A.

FIG. 7A is a perspective view of a second hinge member and optional extension therefor which can be used instead of the hinge member of FIG. 6A, shown from a vantage point to the side and slightly below the hinge member.

FIG. 7B is a perspective view of the second hinge member and optional extension of FIG. 7A, shown from a vantage point to the side and slightly below the hinge member.

FIGS. 7C and 7D are cross-sectional views of the hinge member of FIGS. 7A–7B, shown installed on a truck and interconnecting components of the system hereof FIG. 7E is a cross-sectional view of the hinge member of FIGS. 7A–7B, taken along a plane transverse to that of FIG. 7D.

FIG. 8A is a perspective view of a third (simple G) hinge member which is usable as an optional component of the system hereof.

FIG. 11A is a cross-sectional view of the storage system of the embodiment of FIG. 9, taken along a vertical longitudinal plane, and showing the filler plate hinged at the front and in an open position;

FIG. 11B is a perspective view, partially cut away, of the storage system of the embodiment of FIG. 9, showing the filler plate hinged at one side and in an open position;

FIGS. 18B–18D are side plan views, partially in cross-section, of three possible orientations of the foldable cover structure of FIG. 18A.

FIGS. 18E–18G are perspective views, partially in cross-section, of three possible orientations of the hinge member of the foldable cover structure of FIG. 18A, also showing part of the foldable cover sections in phantom.

DETAILED DESCRIPTION OF THE PREFERRED EMBODIMENTS

I. Introduction & 1st Preferred Embodiment

Overview

The present invention provides a system and apparatus for constructing a modular cover for a truck bed, using a plurality of modules selected from a group of options. The modules used to construct the system are selected from the group consisting of front panels, side panels, sidewall risers, front wall risers, center panels, storage trays, and auxiliary tailgates. Each of these modules may have a number of different possible variations, as will be discussed in detail herein. The modules are selected based on the function that a user wishes the truck cover to perform. If the needs of the user change over time, the cover system may be modified to meet the changing needs, while still retaining the use of some of the original modules.

Figure 2:
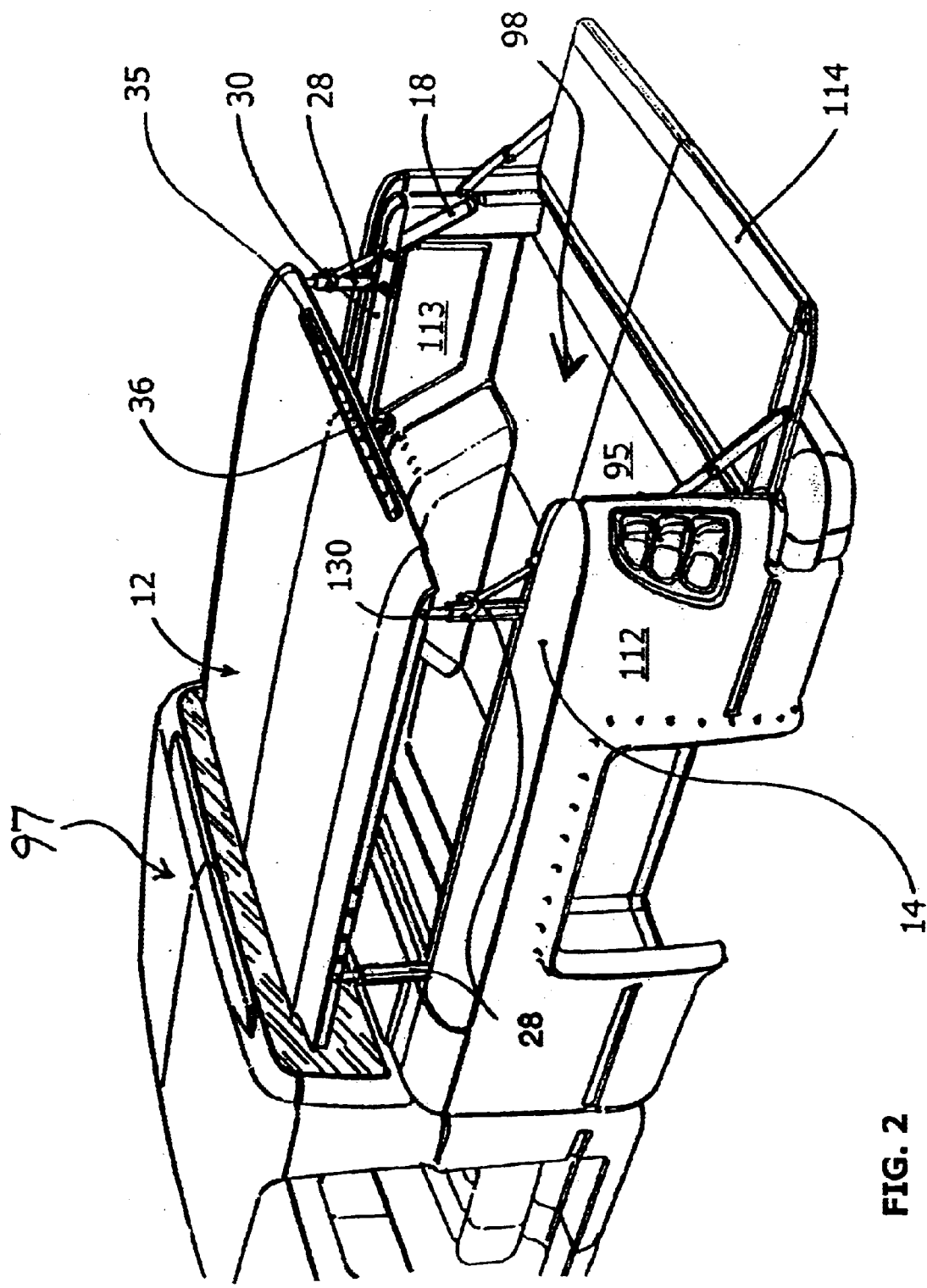
FIG. 2 is a perspective view of the cover sysyem of FIG. 1, installed on a truck bed.

The selected modules are attached to a cargo area of a truck bed 98 (FIG. 2) using appropriate attachment and support hardware, as will be further detailed herein.

First Preferred Embodiment

Referring to FIGS. 1–4, a modular system and apparatus for protectively covering a pickup truck box or bed 98 (FIG. 2), according to a first preferred embodiment of this invention, is shown generally at 10. (The terms 'truck bed' and 'truck box' will be used interchangably throughout the present description, and have the same meaning herein).

The cover system 10 of the first preferred embodiment, generally, includes a center panel 12 and two rigid side panels 14, 16.

The center panel 12 is provided to fit centrally on top of the truck bed 98, and to be substantially parallel to the floor 95 of the truck bed when the center panel is in a closed position thereof. The center panel 12 is made in a size and shape to fit in between the side panels 14, 16 so as to present a unified, substantially continuous upper surface appearance to the observer when in the closed position thereof, interrupted only by the narrow gaps between adjacent panels.

Figure 4D:
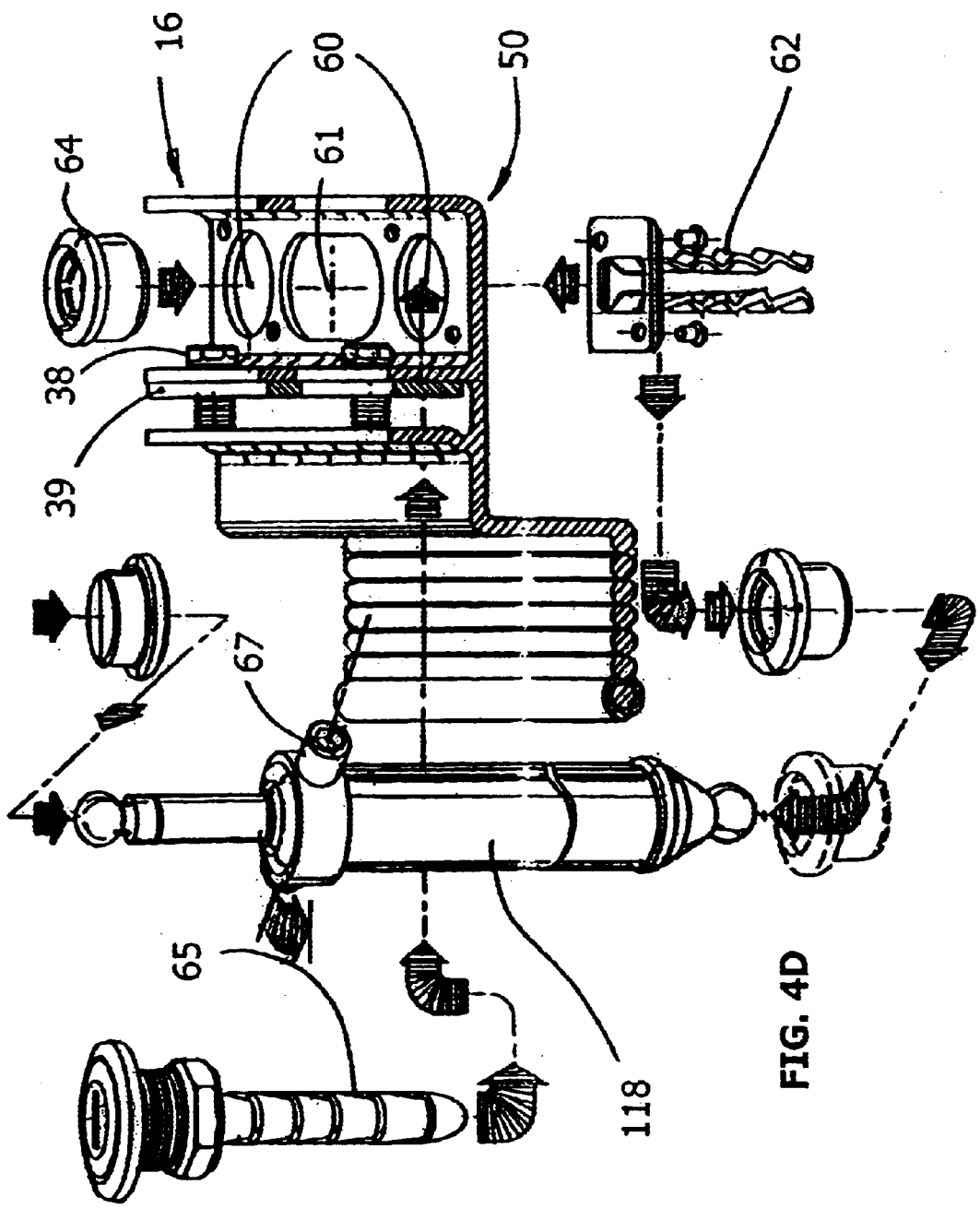
FIG. 4D is an exploded perspective view of the reinforcing support bracket of FIG. 4A, showing its relationship to several related components.
Figure 4F:
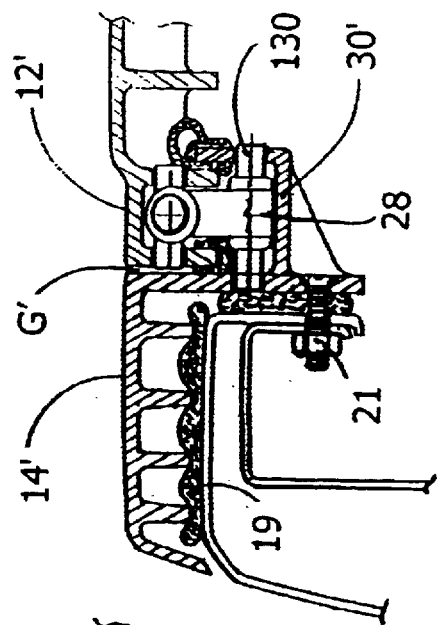
FIGS. 4F and 4G are side sectional views similar to FIG. 4E, but showing an optional modified structure.
Figure 4G:
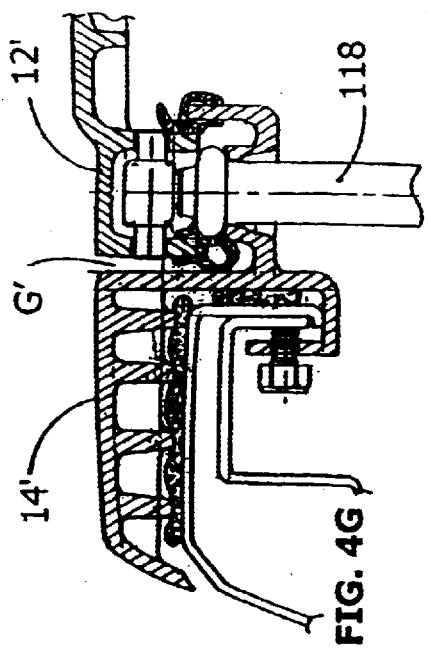
Figure 4E:
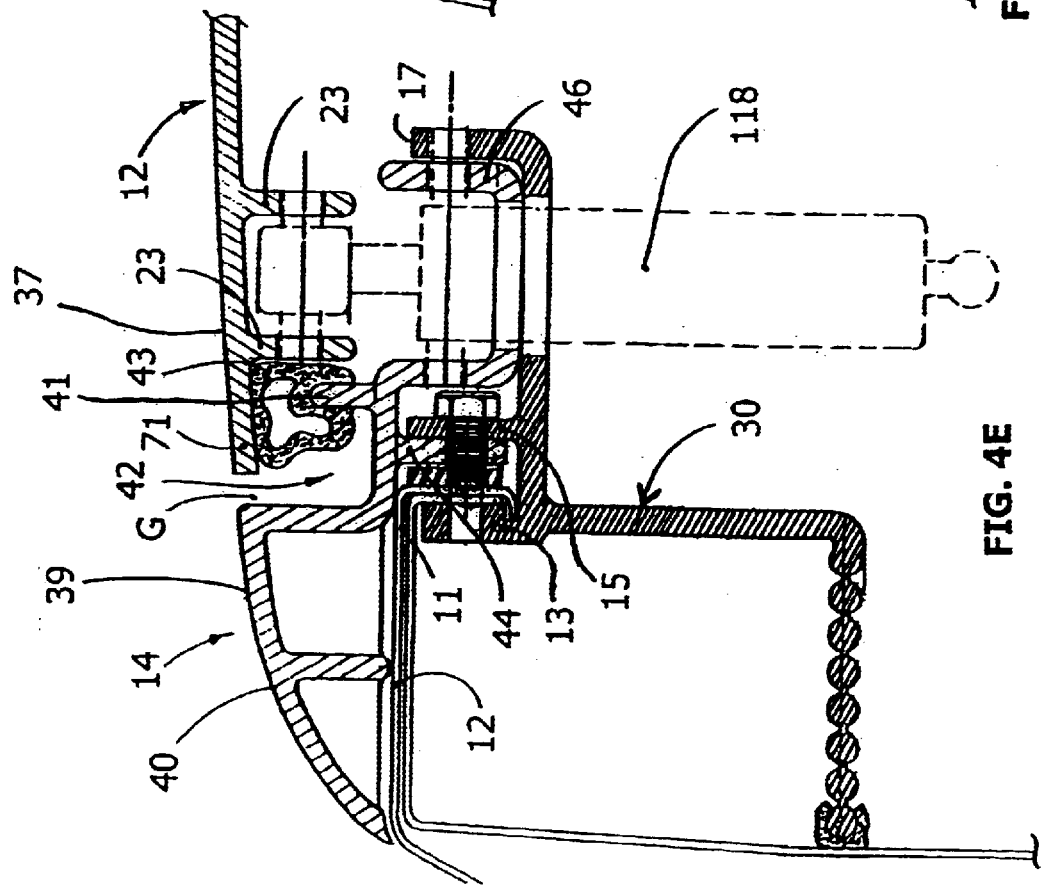
FIG. 4E is a side sectional view of the reinforcing support bracket of FIG. 4A, also showing engagement between one of the side panels and a side portion of the center panel in the closed position thereof.

The center panel 12 includes outer side edge portions, such as that shown at 21 in FIG. 4E, which are configured to rest on top of a recessed part of an adjacent side panel. For example, the outer side edge portion 21 of the center panel 12 may rest upon a truncated vertical wall 41 of the side panel 14 as shown in FIG. 4E, and as will be further discussed herein. This resting relationship aligns the top surface 37 of the center panel 12 with the top surface 39 of the side panel 14 when the center panel is closed, and provides the unified appearance discussed above.

Each of the side panels 14, 16 is adapted to be attachable to a top edge of a longitudinal side wall 112, 113 of a truck box 98. The side panels 14, 16 are provided for placement on top of the truck side walls 112, 113 on opposite sides of the center panel 12. The inboard edge of each of the side panels 14, 16 preferably includes a function rail section 46, as will be further discussed herein.

Figure 9:
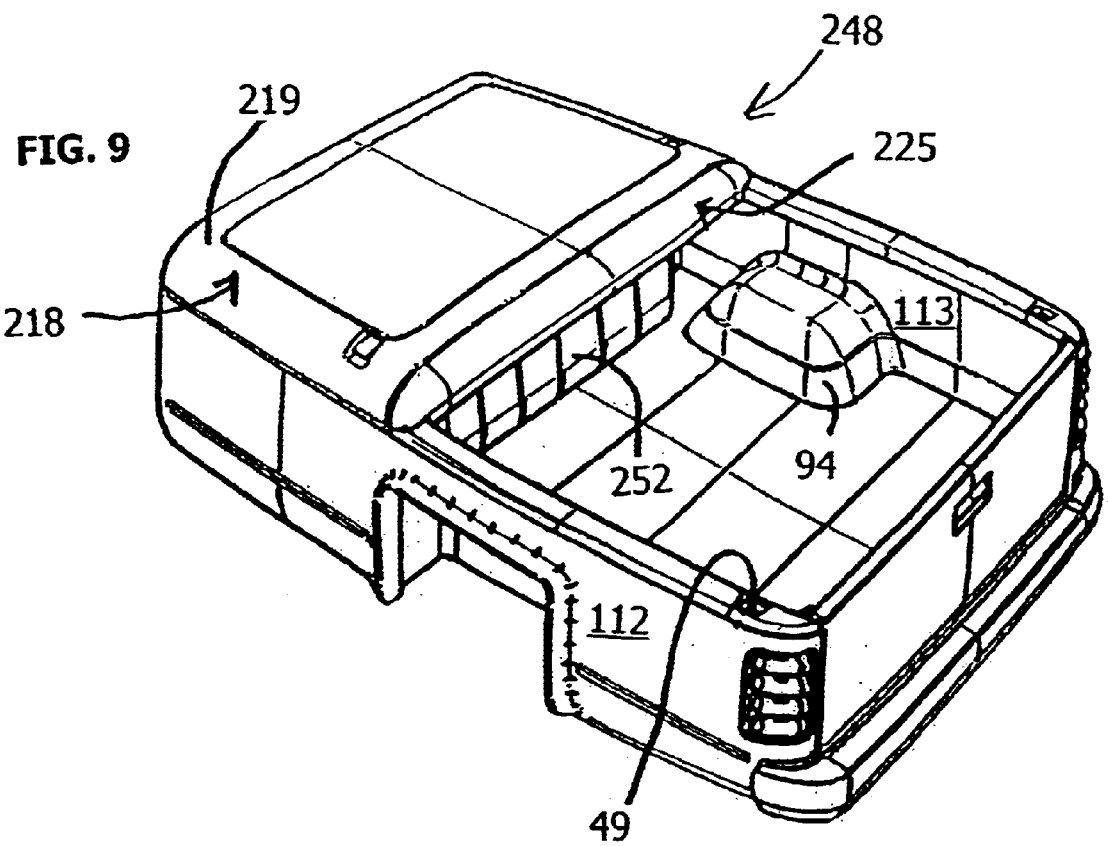
FIG. 9 is a perspective view of a bed portion of a pickup truck with a minimal installation of a storage system according to the invention installed thereon, including a storage tray installed in the front panel.
Figure 5K:
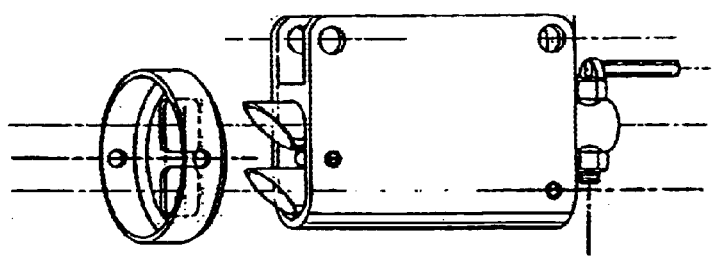
FIG. 5K–5L are perspective views of the optional latch member of FIG. 5H.
Figure 5L:
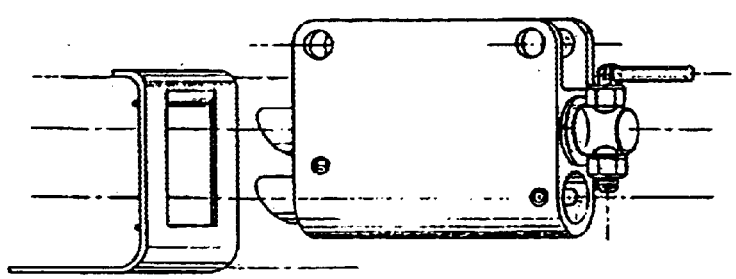
Figure 12A:
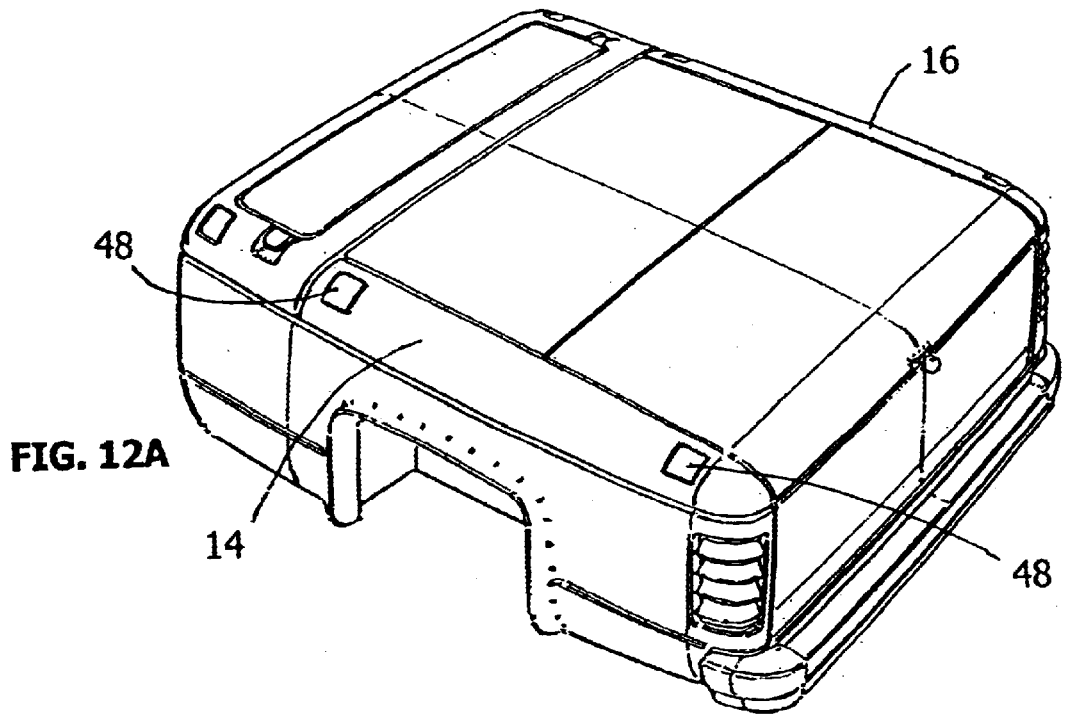
FIG. 12A is a perspective view of a bed portion of a short-bed truck with a tonneau cover according to the invention installed thereon and shown in a closed and secure orientation.
Figure 13:
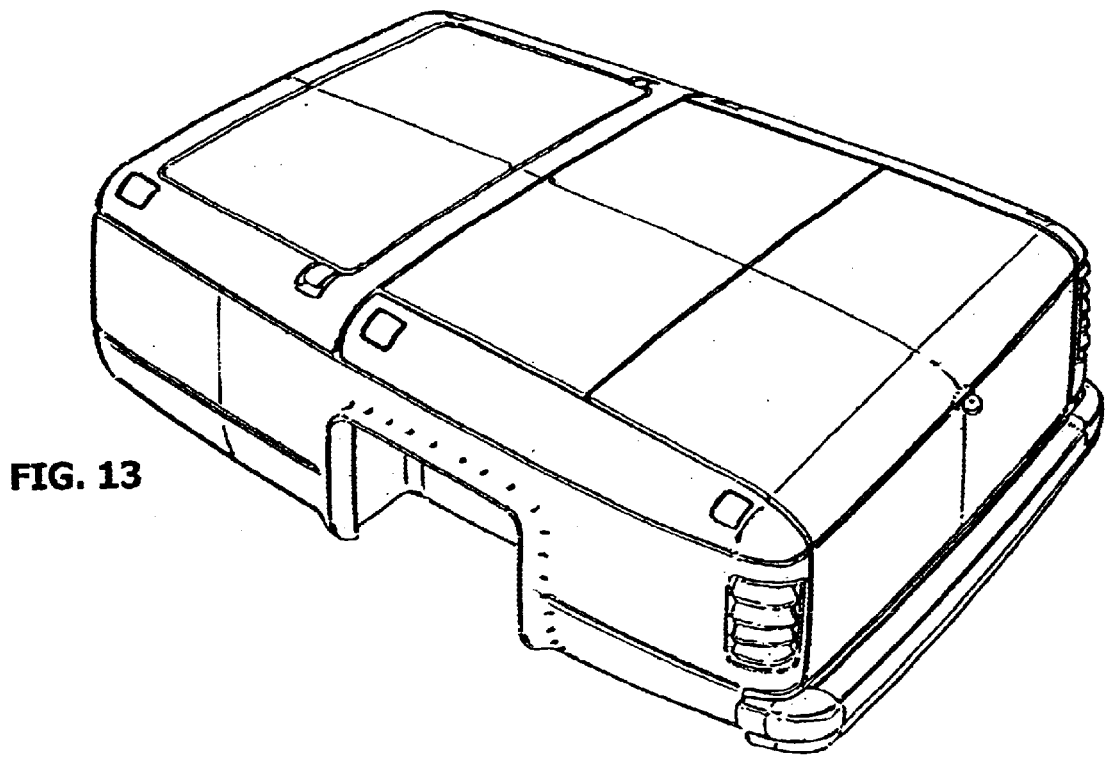
FIG. 13 is a perspective view of a bed portion of a long-bed truck, with a tonneau cover according to the invention installed thereon and shown in a closed and secure orientation.

Preferably, each of the side panels 14, 16 has a plurality of hollow pockets 48 (FIG. 12A) formed therethrough, to allow a user of the cover system 10 to have access to stake pockets 49 (FIG. 9) formed in the truck side walls 112, 113. This allows a user of the system 10 to make use of the stake pockets 49 to attach ladder racks or other cargo racks to the truck bed 98 even with the inventive system 10 installed thereon.

Figure 1A:
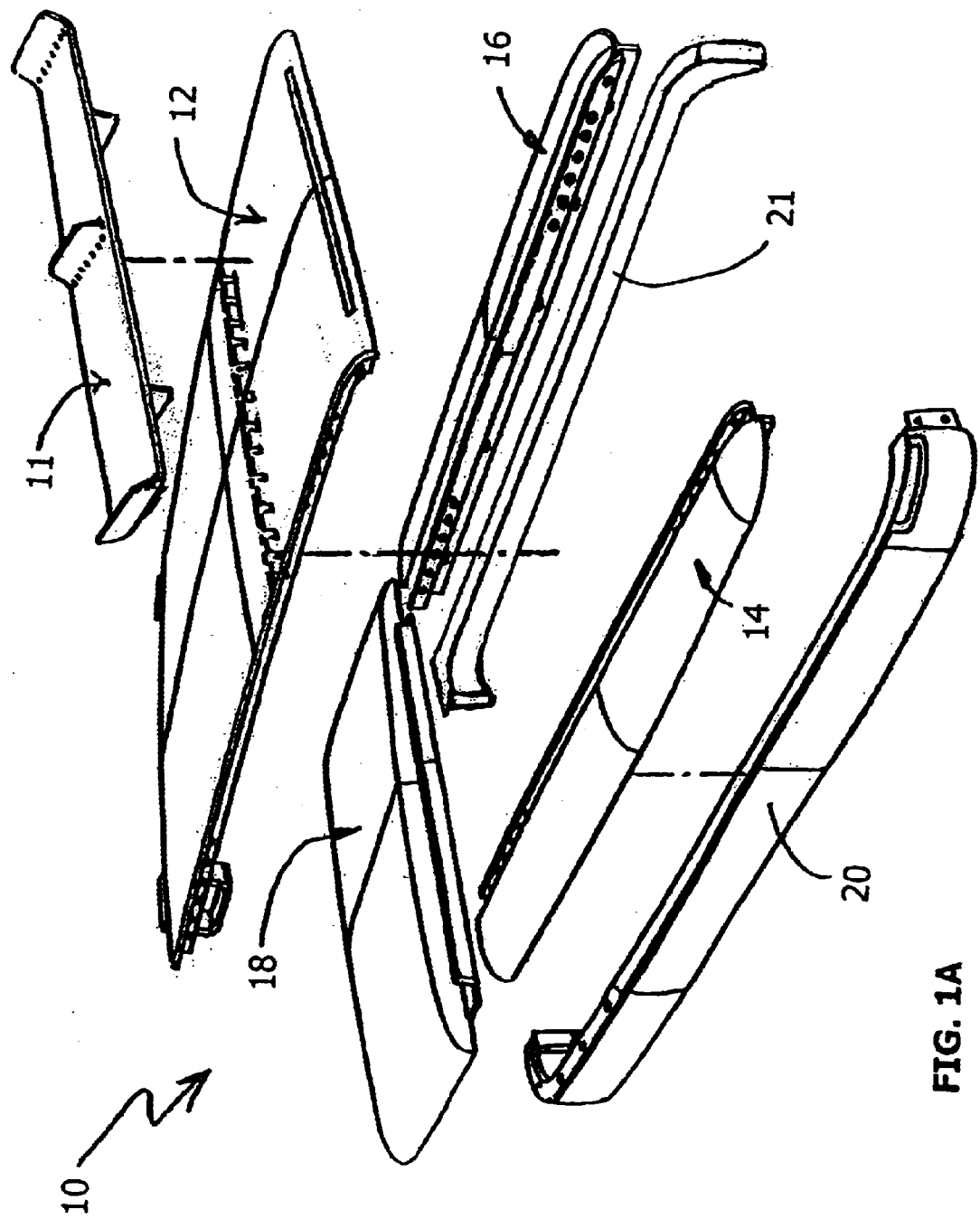
FIG. 1A is an exploded perspective view of selected primary components of a modular truck cover system and apparatus according to a first embodiment of the present invention.
Figure 1B:
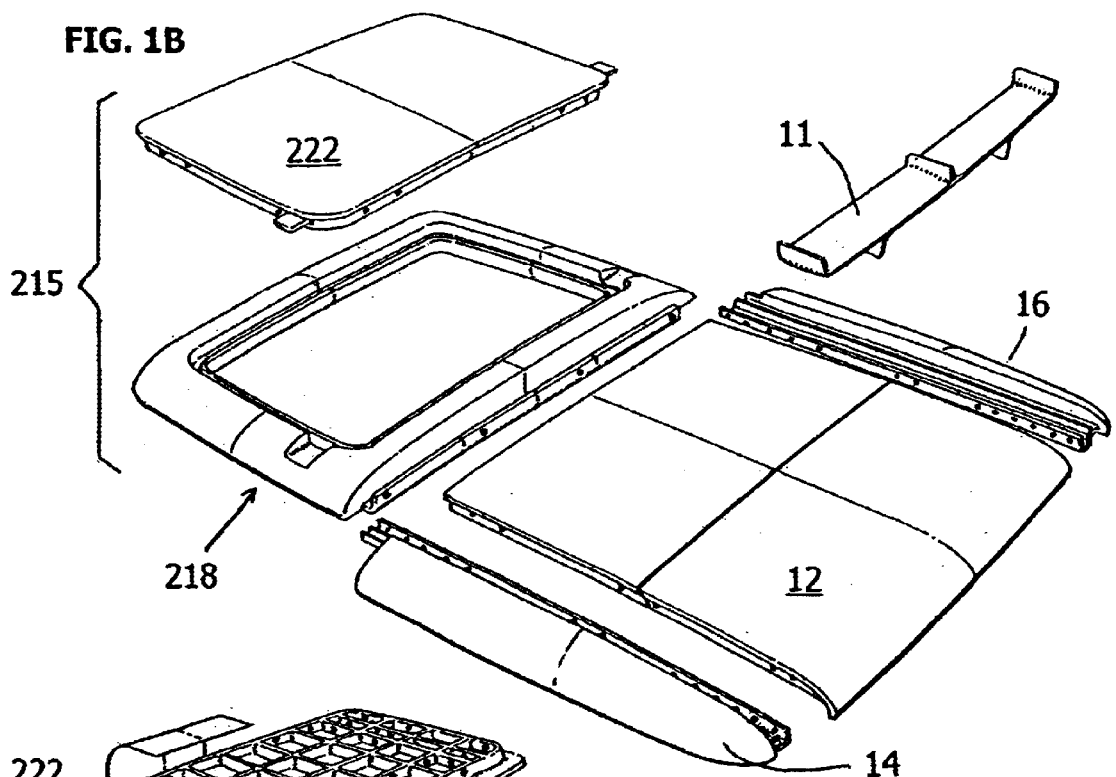
FIG. 1B is an exploded perspective view of selected primary components of a modular truck cover system and apparatus according to a second embodiment of the present invention.

Preferably, but not necessarily, in a number of the most preferred embodiments of the invention, the system 10 may also include a front panel 18 or 215. The front panel 18, where used, is provided for substantially horizontal placement extending across the width of the truck bed 98, forward of the side and center panels, and immediately behind the truck cab 97.

Where used, the front panel may be a one-piece solid integral part 18, as shown in FIG. 1A, or alternatively, may be a subassembly 215, including two main pieces 218, 222 as shown in FIG. 1B, and as will be farther described below.

Where used, the front panel 18 is adapted to have lateral side edges thereof also secured to the respective side walls 112, 113 of the truck box, forward of the side panels.

In applications where the front panel 18 is not used, the center panel 12 and each of the respective side panels 14, 16 extends the full length of the truck bed 98, from the tailgate 114 all the way up to the area just behind the truck cab 97.

Also shown in FIGS. 1A–1B is an optional air dam or spoiler 11, which could be connected to the rear part of the center panel 12, if desired, using adhesive, fasteners or the like. The air dam 11, where used, is provided primarily for decorative purposes.

The system 10 hereof is also preferred to include mounting hardware such as, for example, reinforcing support brackets 30 (FIGS. 4A–4E) for supportive placement below the side panels 14, 16. Mounting hardware for the system 10 may further include hinge members 28 and pneumatic gas shocks 118, as will be further described herein.

Such multi-piece construction of the tonneau cover system 10 is an important feature of the present invention, because it permits each of the panels to have a relatively small size facilitating storage, handling, transportation, and the like.

Another important advantage of the multi-piece construction according to the invention is that it permits at least the center panel 12 to be made in a standardized generic or universal size and shape for use on many different vehicles. The multi-piece construction also permits the system 10 to have significantly improved flexibility and 'give' relative to the truck box, for greater durability and longevity.

Another advantage of the modular system 10 hereof is that it allows customization of the side rails 14, 16 to fit a particular truck application, while retaining the generic nature of the center panel 12, and this provides a better overall fit and appearance to the specific truck model.

As noted, the center panel 12 is preferably made in a generic size and shape, to allow applicability and use on most truck models, while the respective side panels 14 and 16 (which are mirror images of each other) and the front panel 18 are preferably adapted for particular models. However, the side and front panels could also be made somewhat generic, so as to be mountable on many truck models having standardized truck bed dimensions.

Front and Side Panel Construction

The front panel 18, the side panels 14, 16, the air dam 11, the sidewall risers 20, 21 and other similar accessories discussed below may be manufactured of a plastic resin through an injection molding process, such as reaction injection molding (RIM) and/or vacuum formed sheet molded compound (SMC).

As a result of the above processes, the front panel 18 and the side panels 14, 16, in the embodiment of FIGS. 1–4, are preferably comprised of substantially solid members. These types of molding processes create sturdy, lightweight panels that can be made in various design shapes, and can also be painted to match or exceed the visual appearance of steel panels.

Appropriate plastic resins include ABS, polypropylene, PETE, HDPE, and other suitable resins known to those in the art.

Furthermore, the exact composition of the front and side panels may be varied and adjusted for a particular application and use thereof. For example, strength is important to the side panels 14, 16, and therefore, the materials used to form the side panels should be selected to provide high strength to these panels. Composite and/or reinforced materials may be appropriate for the side panels. Similarly, high-strength materials should be used for the sidewall risers 20, where used.

Structure and Features of the Center Panel

The center panel 12 may also be formed from a solid material in an injection molding process, as discussed above in connection with the front and side panels. For high-volume generic applications, or for high-stress applications of the center panel, such solid construction is preferred for the high quality it provides. The material used for the center panel 12 may be selected to fit the intended use of the panel. If the center panel 12 is intended to be a load-bearing surface, such as to support a bicycle rack or cargo rack, then premium high-strength materials should be used. SMC is a preferred material for high-volume generic applications of the center panel 12.

Alternatively, and optionally, instead of being made as a solid member, the center panel 12 may be constructed as a skeletal grid frame structure (not shown) having a durable weather-resistant cloth stretched thereacross and attached thereto.

Preferably, where the center panel 12 is formed from a rigid plastic or the like, it includes integrally formed spaced-apart ribs, such as those shown at 23 in FIG. 4E, extending downwardly on the underside thereof, to add strength and to provide a structural component for allowing attachment of support hardware thereto.

Figure 1C:
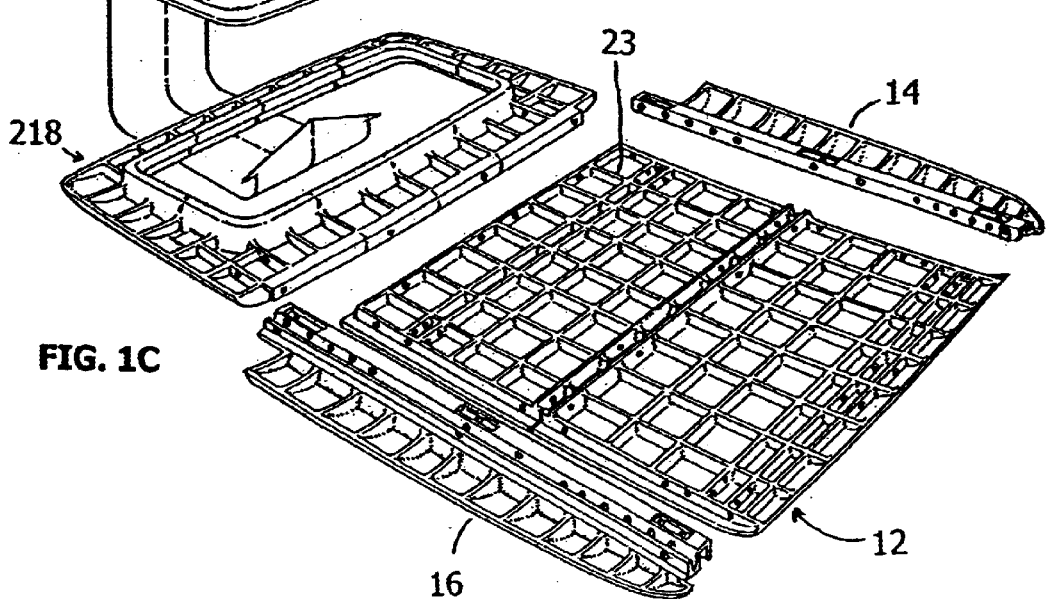
FIG. 1C is an exploded perspective view of the modular truck cover system components of FIG. 1B, shown in an inverted orientation to show the underside thereof.

In one particularly preferred embodiment of the invention, and as shown in FIG. 1C, the underside of the center panel 12 may have a plurality of integral spaced apart downwardly extending longitudinal ribs 23 thereon, extending in a direction parallel to the longitudinal axis of the vehicle, and may also have a plurality of integral spaced apart downwardly extending lateral ribs 25 thereon, extending in a direction perpendicular to the longitudinal axis of the vehicle. These intersecting longitudinal and lateral ribs 23, 25, where used, are provided to strengthen and reinforce the underside of the center panel, as well as to allow attachment of accessories thereto. This transverse rib adaptation is referred to in the present specification as "egg-crate construction".

Folding Center Panel

Referring now to FIGS. 18A–18F, it will be seen that in an optional embodiment, the center panel may be made in two individual sections 51, 52 pivotally joined together by a hinge 53. Where the system of the invention includes the center panel made in at least two individual pieces 51, 52 a brace 55 may also be provided for interconnecting the two sections.

As seen best in FIGS. 18E–18G, in the embodiment of FIG. 18, the hinge member 53 includes a first rigid hinge segment 66 for attaching to the first section 51 of the center panel 12, a second rigid hinge segment 67 for fixedly attaching to a second section of the center panel 12, and a flexible membrane 68 for hingedly interconnecting the first and second hinge segments. Preferably, the first and second hinge segments 66, 67 are formed from the same mold, are identical to one another, and are reversed 180 degrees with respect to one another. The first and second hinge segments 66, 67 each have a plurality of spaced apart hollow cylindrical bosses 69 which meshingly interalign with one another in a manner akin to the construction of a typical door hinge, and the cylindrical bosses receive a hinge pin 63 therethrough. Preferably, the flexible membrane 68 includes enlarged edges, as shown, to allow retentive engagement thereof in recessed channels formed in the respective hinge segments 66, 67.

Figure 18A:
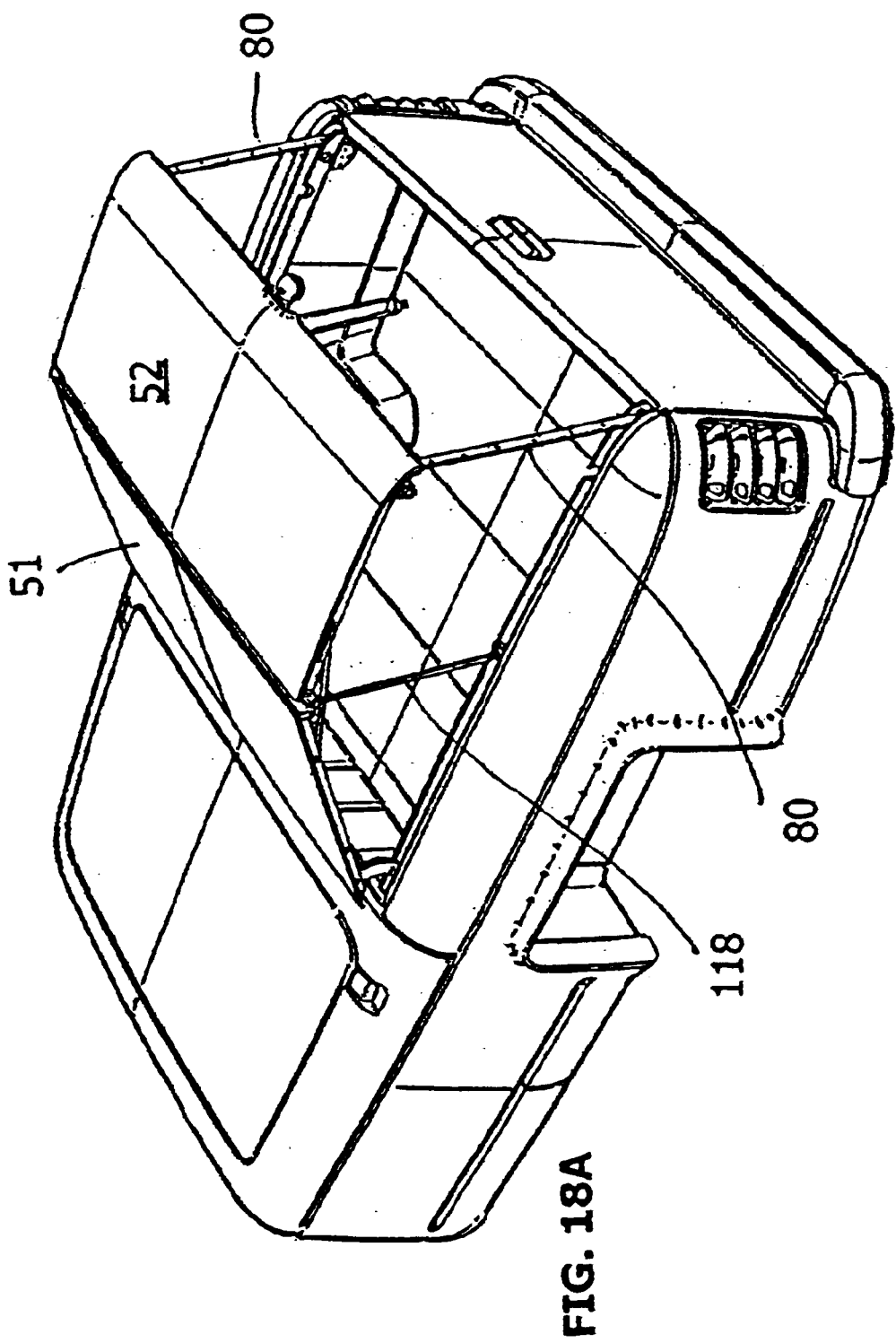
FIG. 18A is a perspective view of a bed portion of a long-bed truck with a cover system according to the invention installed thereon, in which the center panel is made in separate pieces with a foldable structure.
Figure 20B:
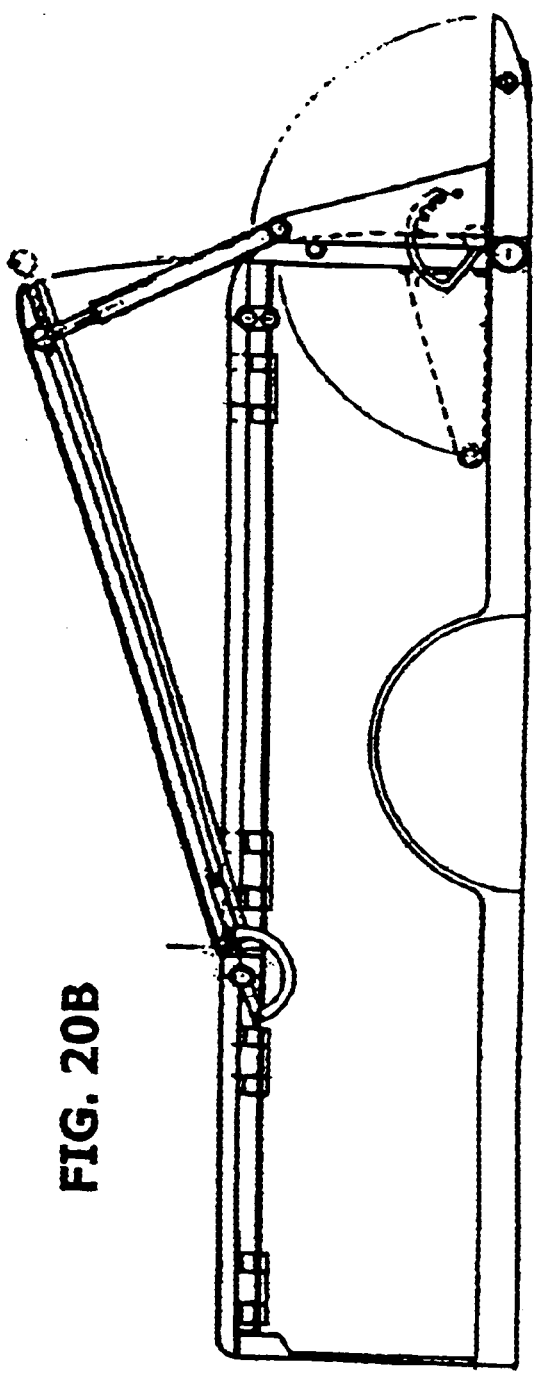
FIG. 20B is a side plan view of the inside of the truck bed of FIG. 20A, partially in cross-section, and showing a closed position of the delta bracket in phantom.
Figure 20C:
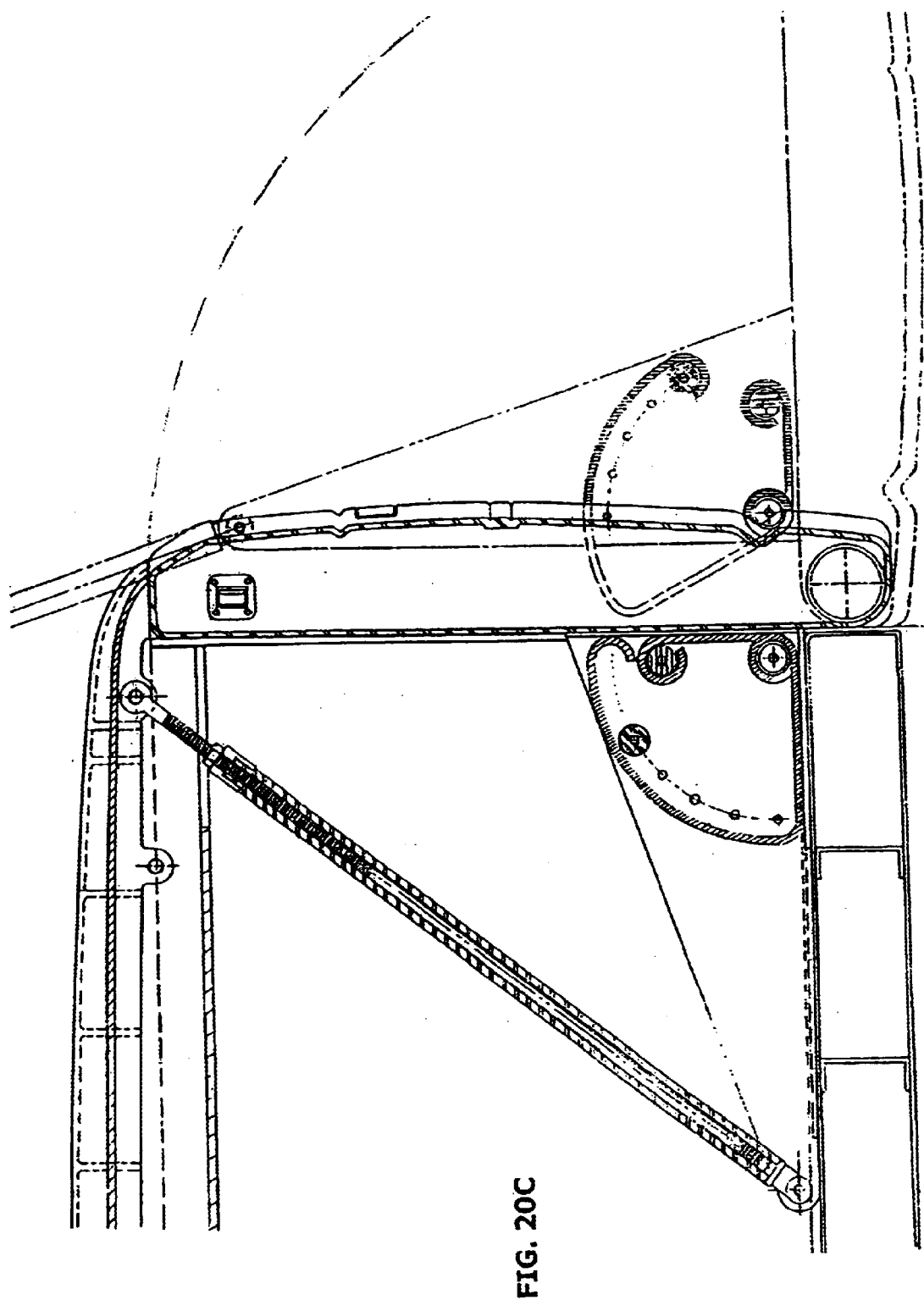
FIG. 20C is a detail cross-sectional view of the tailgate and delta bracket structure of the embodiment of FIG. 20A, showing the tailgate in a closed position.

It will be understood from a review of FIGS. 18A–18F that if the brace 55 is removed or disconnected, the above-described structure of the hinge 53 allows folding pivotal movement of the second section 52 of the center panel 12. Where desired, the second section 52 may be folded and stowed below and parallel to the first section 51, as seen in FIG. 18D.

Where the two-piece version of the center panel 12 is used, it is preferred that pneumatic gas shocks 118 be used medially in the function rails 46 of the side panels to lift the rear edges of the first section 51.

A negator spring assembly 80 is also preferably provided, in each of the rear corners of the truck bed 98, for attachment to the back corners of the center panel second section 52, where the two-piece version of the center panel is used. The negator spring assemblies 80 are very similar to the well-known conventional ratcheting spring-loaded seat belt assemblies for vehicles, and include woven cloth belts similar to those used for seat belts.

One advantage of the described two-piece construction of the center panel 12 is that it allows each section 51, 52 thereof to be made in a size which is within the acceptable shipping size guidelines of many common couriers such as UPS, FedEx, and the like. For this reason, and as shown in FIG. 1B, it is preferred that even where a one-piece construction is used for the center panel 12, a portion of the panel be provided that is intended to be a convenient separation point.

For an installation of the system 10 hereof where sidewall risers 20 of a moderate height are used, the back edge of the center panel 12 may, optionally, be extended downwardly to form a center panel having an inverted L-shaped cross-sectional shape, in a manner similar to that commonly used for vehicle trunk lids, so that there is no gap created between the center panel and the upper surface of the tailgate 114.

Optional 3-layer Sandwich Construction for Center Panel

Optionally, for a low-cost embodiment of the invention, the center panel 12 may be constructed differently from the other panels of the system, with a multi-layer 'sandwich' construction as shown in FIGS. 3 and 3A–3C.

Figure 3A:
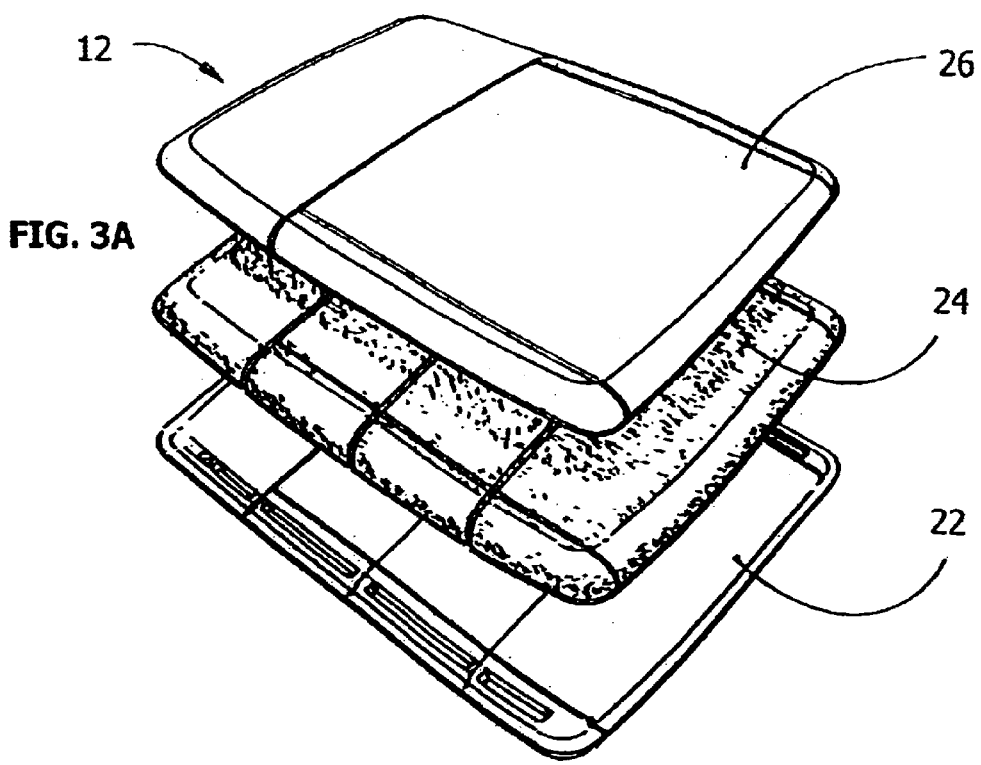
FIG. 3A is an exploded perspective view of a center panel of the cover system of FIG. 1, showing showing one possible construction thereof.
Figure 3B:
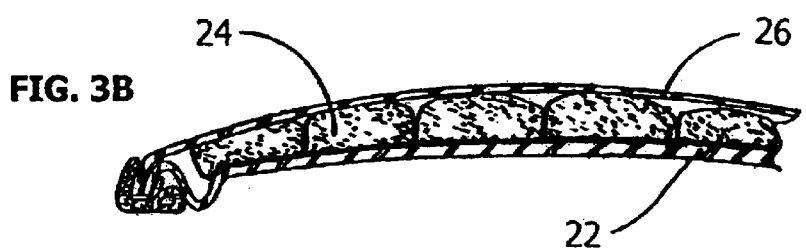
FIG. 3B is a front sectional view of the center panel of FIG. 3A.
Figure 3C:
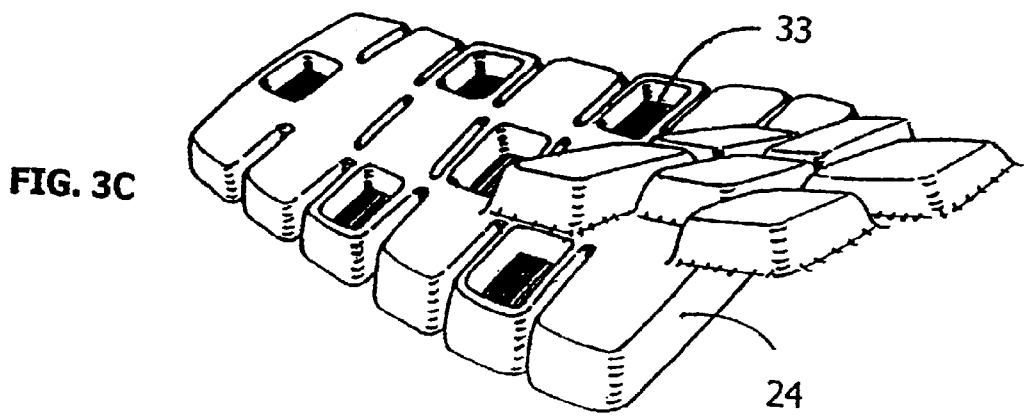
FIG. 3C is a perspective view of the foamed core of the center panel of FIG. 3A, showing various recesses or pockets defined therein.

In the embodiment of FIGS. 3A–3C, the preferred construction of the center panel 12 is in a three-part sandwich including a molded base layer 22, a foamed middle core 24 and a molded top layer 26.

The foamed middle core 24 is preferred to be bonded to the base layer with adhesive or the like, and the top layer 26 is bonded to the base layer at the peripheral edges thereof, but is floatingly disposed above the middle core. Such floating disposition of the top layer 26, above the middle core 24, minimizes warpage or separation of the center panel, and also resists damage to the core if the top layer shifts during use.

The base and top layers 22, 26, respectively, are also preferably made of a plastic resin similar to the side and front panels, or may be vacuum-formed in open molds, while the foamed core 24 is constructed of polystyrene, polyurethane or the like.

Most preferably, the foamed core 24 will be formed with multiple longitudinally extending portions, in a barrel stave-like configuration, so that when it is bonded to the base layer 22, it tends to pull up on the base layer, thus giving enhanced strength to the center panel. Also, recesses, pockets or the like, such as those indicated at 33 in FIG. 3B, may be readily cast into the foamed core 24, where appropriate, to accommodate portions of latch mechanisms and other hardware used with the tonneau cover system 10.

Other Optional Modifications of the Center Panel

In the depicted multi-layer construction of the center panel 12, the top layer 26 (which is normally the only section of the panel exposed to view) may be modified from the smooth surface shown in the drawings. In particular, the top layer 26 may include ornamental projections, indentations and/or coloration molded therein, to enhance appearance, to provide manufacturer and/or vehicle line brand recognition, or for other appropriate reasons.

The air dam 11 or other optional accessories, such as a ladder rack, ski rack, luggage rack, etc. may be molded as parts of the outer panel, if desired for a specific application, but are preferably provided as separate components for attachment to the center panel 12. Where used, these accessories are preferably attached to the peripheral surfaces of the center panel. This construction adds strength and rigidity to the center panel 12.

Molded panels according to the invention may have a smooth, paintable surface on the underside thereof, matching the exterior painted appearance of the vehicle, which gives the panels a very pleasing appearance, unlike conventional fiberglass tonneau covers.

Alternatively, where desired, the outermost surface of the side and center panels 12, 14, 16, which is exposed to view, may be formed with an integrally formed molded texture thereon, such as simulated leather or other animal skin, cloth, or the like.

Structure and Features of the Side Panels

Referring to FIG. 4E, the structure of a first preferred embodiment of the side panel 14 and a side edge of the center panel 12 is shown in lateral vertical cross-section. An attachment bracket or reinforcing support bracket 30, for attaching the side panel 14 to the truck box side wall 112 is also shown in cross-section (The reinforcing support bracket 30 is described in detail below). While only a first side panel 14 and a first support bracket 30 are shown in the drawing, it will be understood that a mirror-image of the identical structure is provided for the opposite side panel 16.

Optionally, the side panels 14, 16 may have holes formed vertically therethrough, to allow a truck owner to have access to, and to make use of stake pockets formed in the truck side walls 112, 113 for cargo racks such as ladder racks, glass racks, lumber racks, or other cargo racks.

The side panel 14 includes a curved outer section 40 which covers the upper surface of the truck side wall 112, and which is adapted to continue the shape of the center section 12 out to the truck side wall, to create a pleasing visual appearance. The outer section 40 may have a plurality of vertical reinforcing ribs provided on the underside thereof, at spaced apart intervals.

The side panel 14 also includes a water drainage section 42, integrally attached to the outer section 40. The water drainage section 42 has a reverse J-shaped cross-section, as shown, to provide a channel therein for allowing water flow towards the back of the truck. The drainage section 42 channels rainwater to drain from the rear end of the cover, at the rear end of the side panel, and to drain in a sideways direction from the front end of the side panel, where it meets the front panel 18. The water drainage section 42 includes a truncated vertical wall 41, which serves as a rest to support the outer edge 71 of the center panel 12 thereon. This ensures proper alignment of the center panel 12 with the side panels 14, 16.

A flexible weather seal 43 is preferably provided on the top edge of the truncated vertical wall 41, as shown, on the inboard side of the water drainage section 42. Alternatively, the weather seal 43 could be attached to the lower surface of the center panel 12, below the outer edge 71 thereof.

The side panel 14 further includes an integral mounting flange 44, extending downwardly from the bottom of the water drainage section 42 for cooperative engagement with the reinforcing support bracket 30, and a function rail section 46, for receiving hinges and/or gas shocks therein.

As noted, the side edge portion of the center panel 12 includes a peripheral edge 71. The side panel peripheral edge 71 is spaced away from the side panel 14, to define a gap G therebetween that leads into the drainage section 42 of the side panel.

The provision of the gap G, between the center panel 12 and the side panel 14, permits the cover system 10 have some flexibility or 'give' relative to the truck box for enhanced durability thereof.

Front Panel Operation The front panel 18 of the cover is preferably pivotally connected to the side walls 112, 113 of the truck box, such that the panel 18 is fixed in relation thereto.

Preferably, as shown in FIG. 7C, the front panel has an integral attachment rail formed along the back edge thereof, having a U-shaped cross-sectional shape similar to the structure of the side rails, to allow for optional pivotal attachment of the center panel thereto.

Optionally, the front panel 18 may be modified to have a large opening 220 (FIG. 17) formed therein which receives a removable plate 222, as will be further described herein. As another optional feature, a storage box, rack, resevoir for storing a liquid, and/or other receptacle could be provided below the front panel 18 and be connected thereto. Further, the front panel 18 could have a multi-layer construction similar to the center panel.

Where the front panel is modified to have the opening 220 formed therein, it may be described as a frame panel 218. The frame panel 218, where used, may also receive one or more of a variety of accessories therein.

Sidewall Risers

Referring again to FIG. 1A, sidewall risers 20 provide additional, optional modules that may be used in constructing a system 10 in accordance with the present invention. Sidewall risers 20 of various different heights may be used, as desired and according to the particular needs of a user of the system 10, to raise up the level of the center and side panels 12, 14, 16. The sidewall risers may be made in a multi-part construction, similar to that discussed in connection with the two-piece center panel, in order to make them reducible to a size which will fit within the acceptable shipping guidelines of many couriers.

Figure 21A:
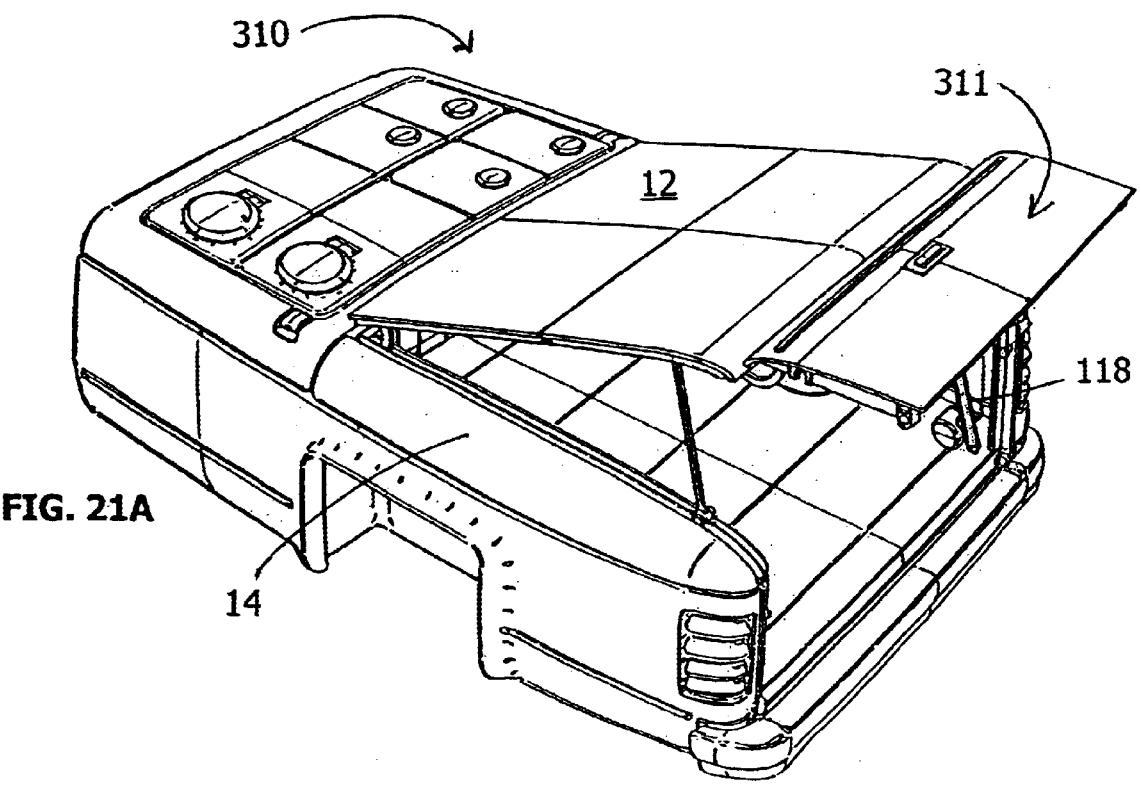
FIG. 21A is a perspective view of a bed portion of a long-bed truck with a cover system according to the invention installed thereon, including an auxiliary tailgate.
Figure 12C:
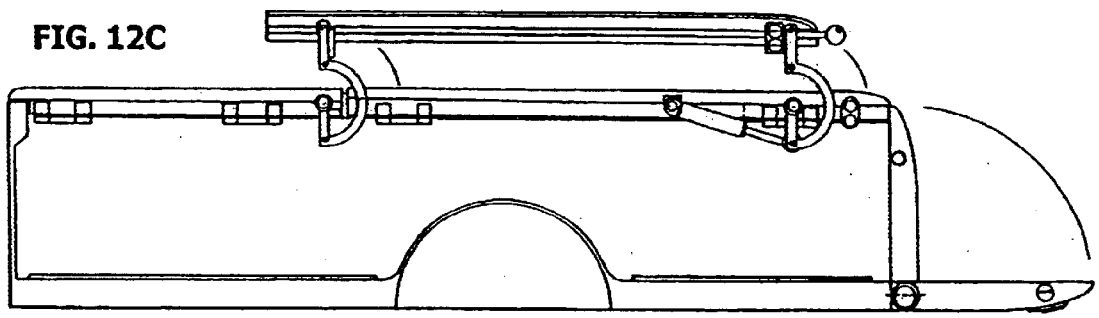
FIG. 12C is a side plan view of the inside of the truck bed of FIGS. 12A–12B, partially in cross-section.
Figure 16C:
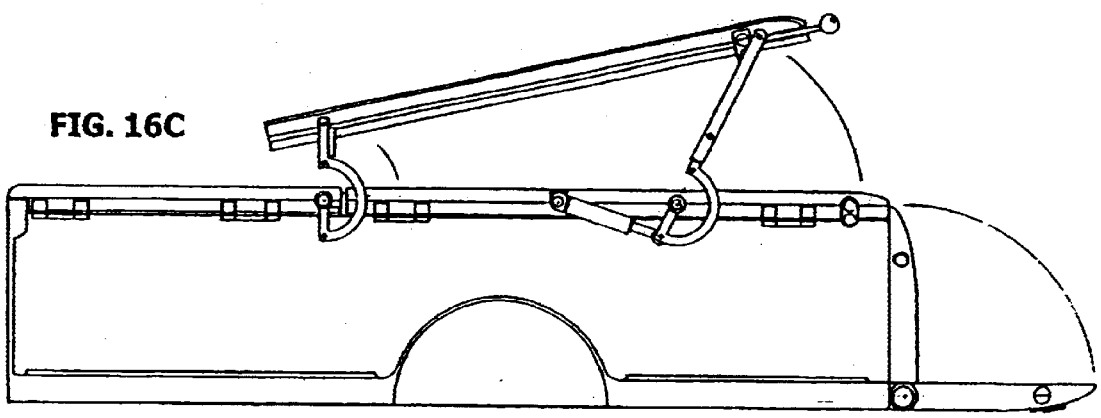
FIG. 16C is a view similar to that of 16B, with the ladder rack removed and with the front of the center panel lowered part way.
Figure 16B:
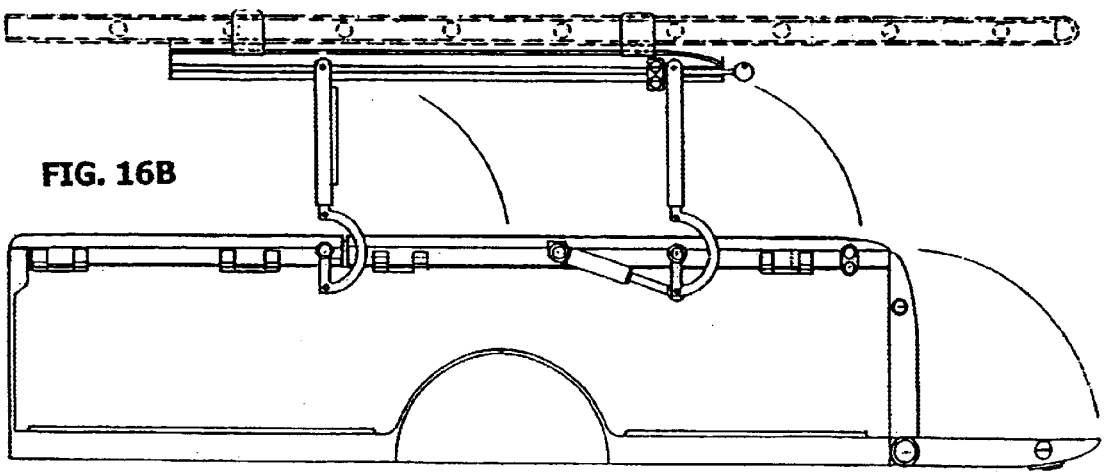
FIG. 16B is a side plan view of the inside of the truck bed of FIG. 16A, partially in cross-section, and showing a ladder in phantom on the ladder rack.
Figure 12D:
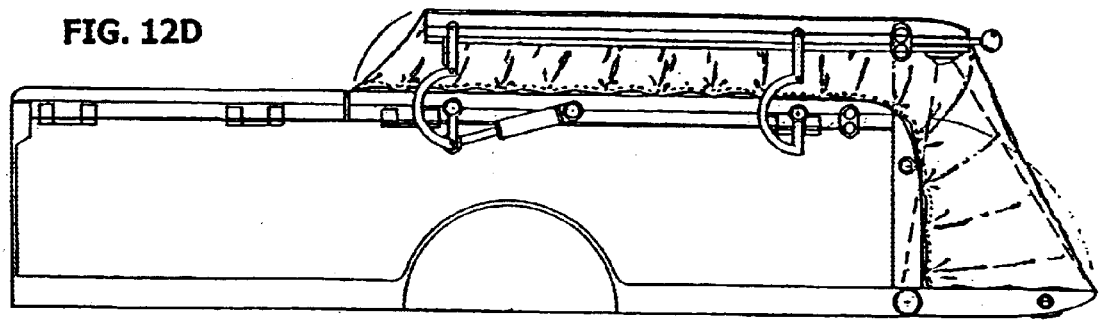
FIG. 12D is a side plan view of the inside of a truck bed similar to that of FIG. 12C, with an optional fabric cover also shown thereon.
Figure 16D:
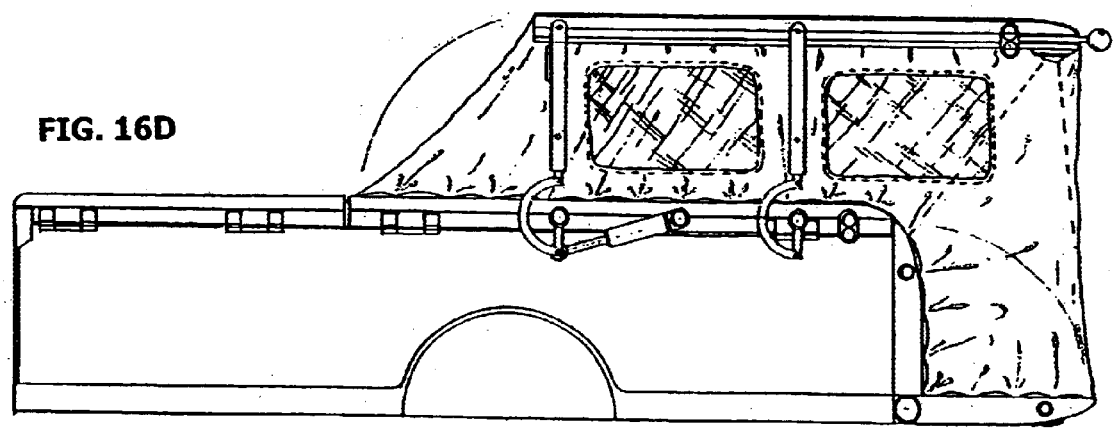
FIG. 16D is a view similar to that of FIG. 16B, but with the hinge members rotated 180 degrees from the previous orientation, and also showing a first optional fabric tent structure attached to components of the inventive system.
Figure 21B:
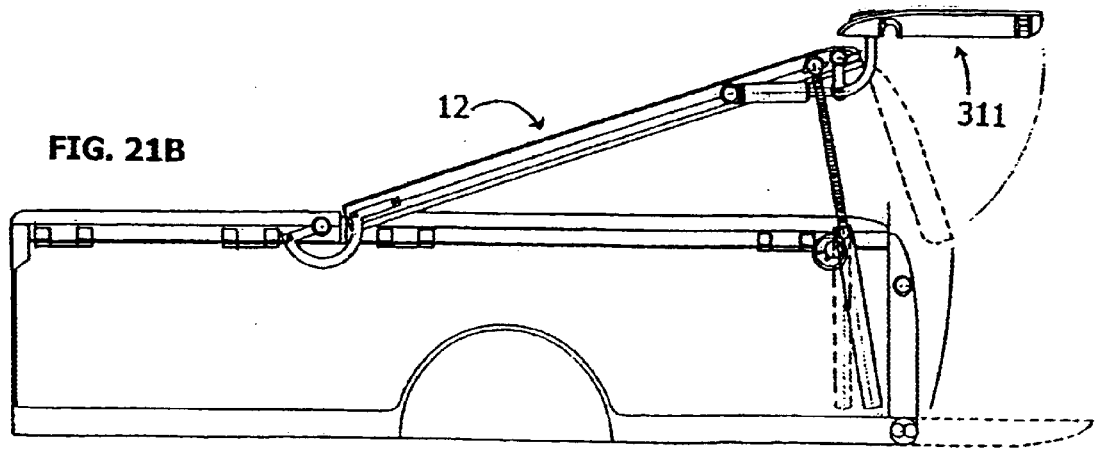
FIG. 21B is a side plan view of the inside of the truck bed of FIG. 21A, partially in cross-section, and showing a closed position of the auxiliary tailgate in phantom.
Figure 14A:
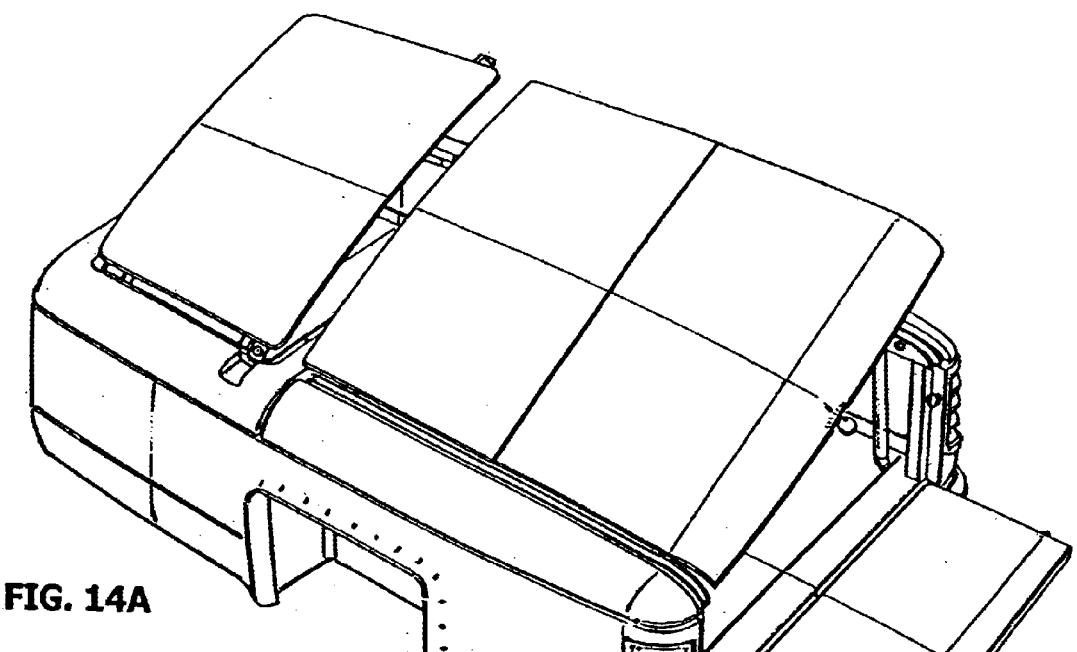
FIG. 14A is a view of the installation of FIG. 13, with side hinges on both the center and filler panels and showing the panels in an open configuration thereof.
Figure 15A:
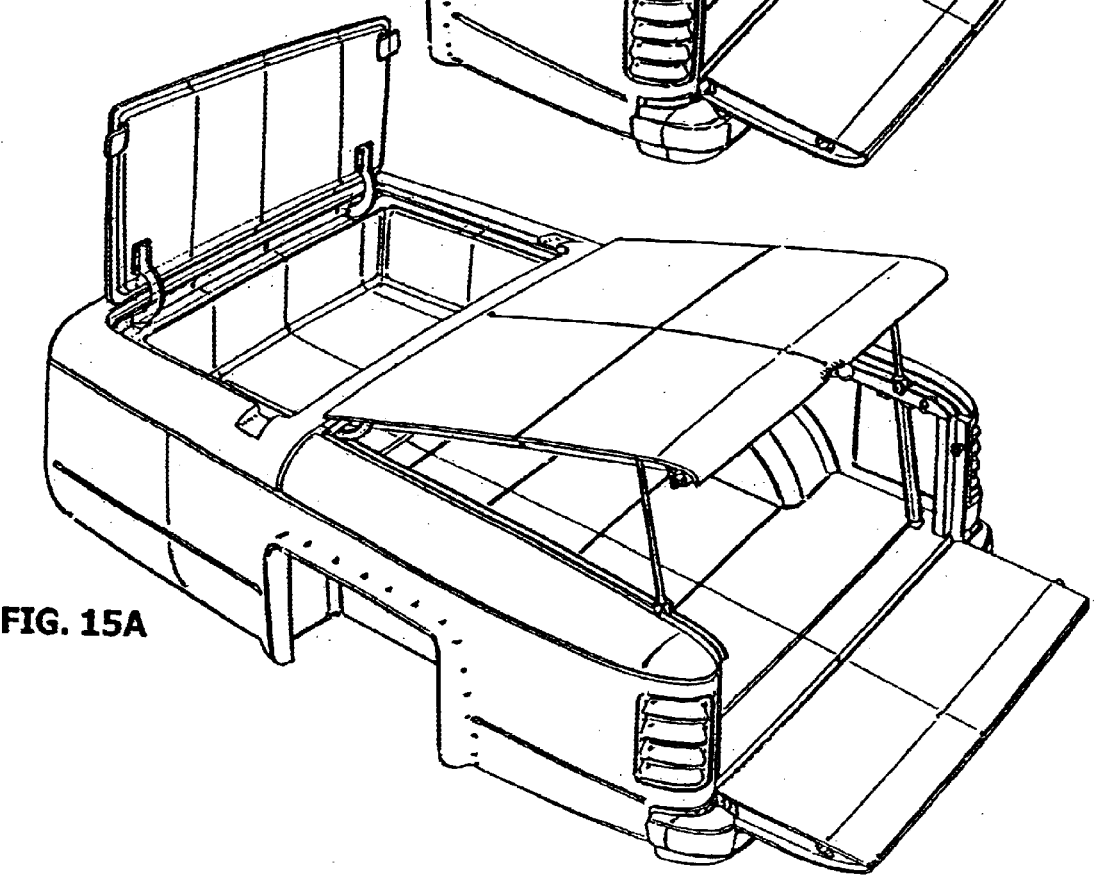
FIG. 15A is a perspective view of the truck bed of FIG. 13, with both the center panel and the filler panel hingedly attached at the respective front ends thereof and in an open position, and showing the tailgate opened and the pneumatic lift members in their fully extended base position.
Figure 14B:
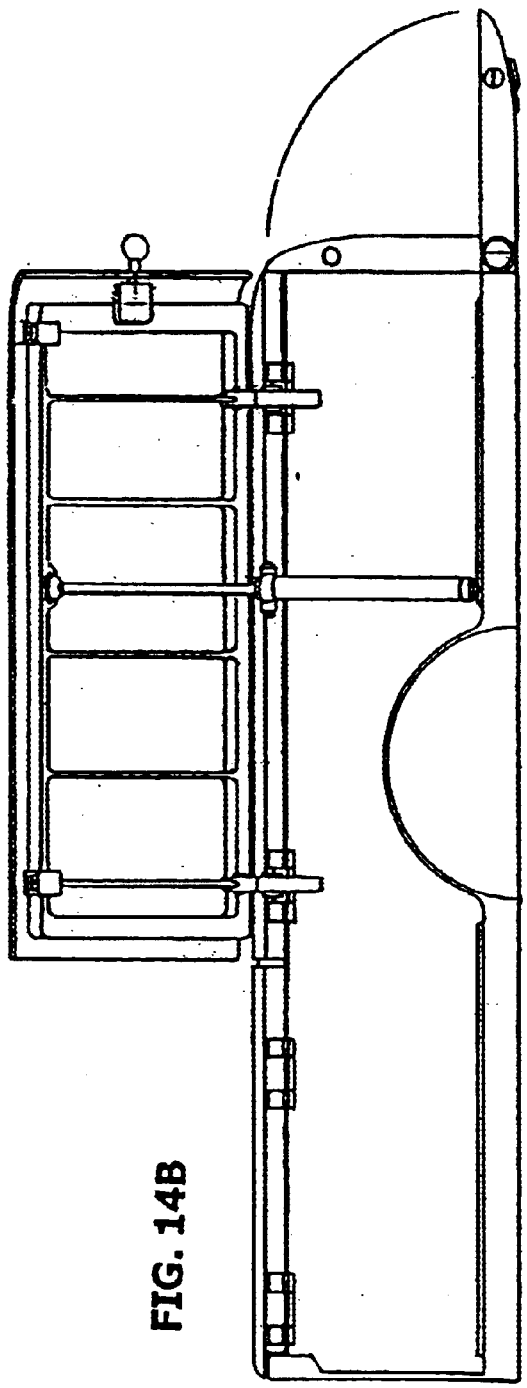
FIG. 14B is a side plan view of the inside of the truck bed of FIG. 14A, partially in cross-section.
Figure 14C:
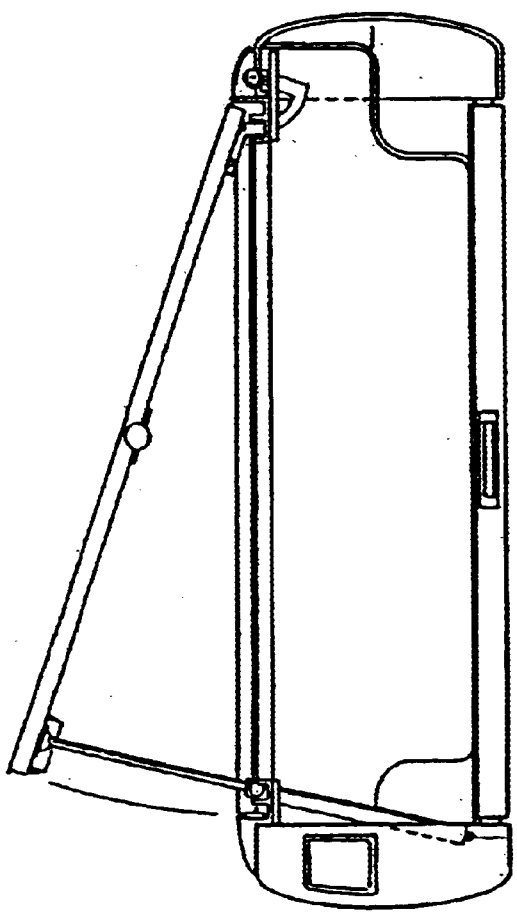
FIG. 14C is a rear plan view of the inside of the truck bed of FIGS. 14A–14B, partially in cross-section.
Figure 15B:
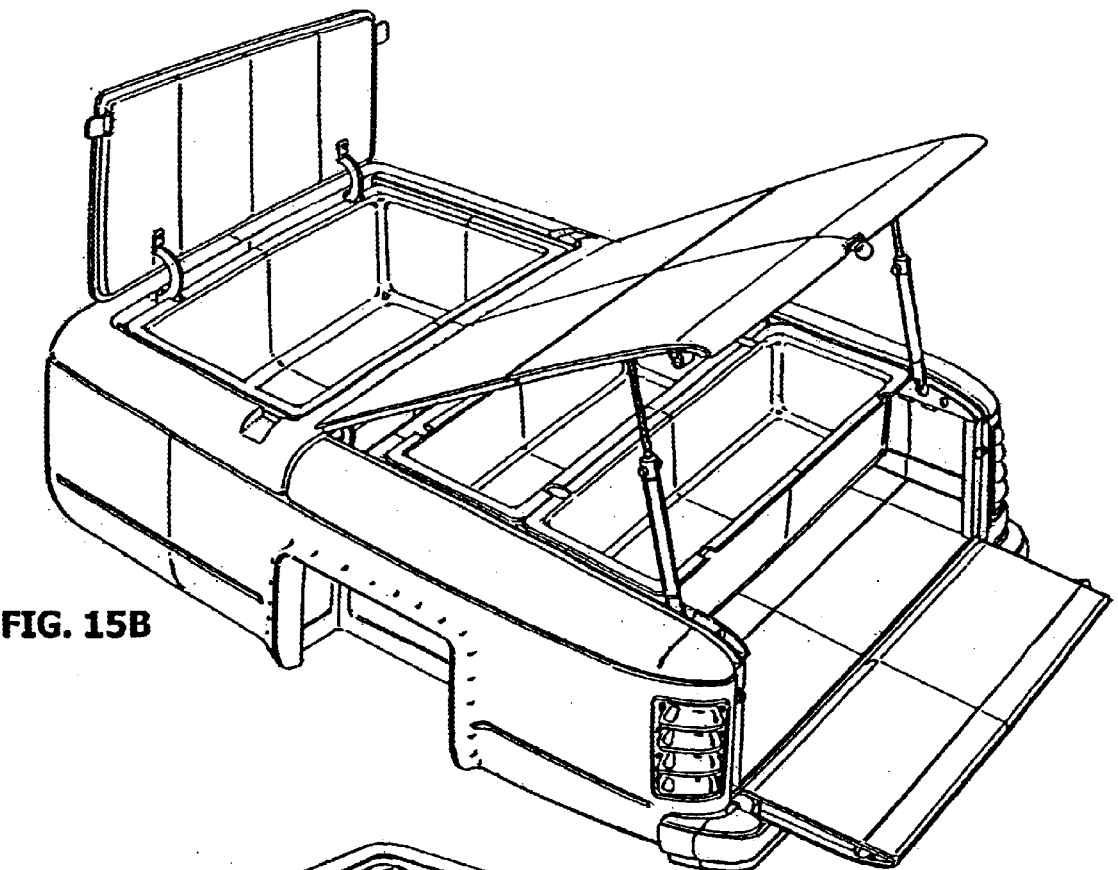
FIG. 15B is a perspective view of a truck bed similar to FIG. 15A, also showing three storage trays in the truck bed suspended on the modular panels of the invention.
Figure 21C:
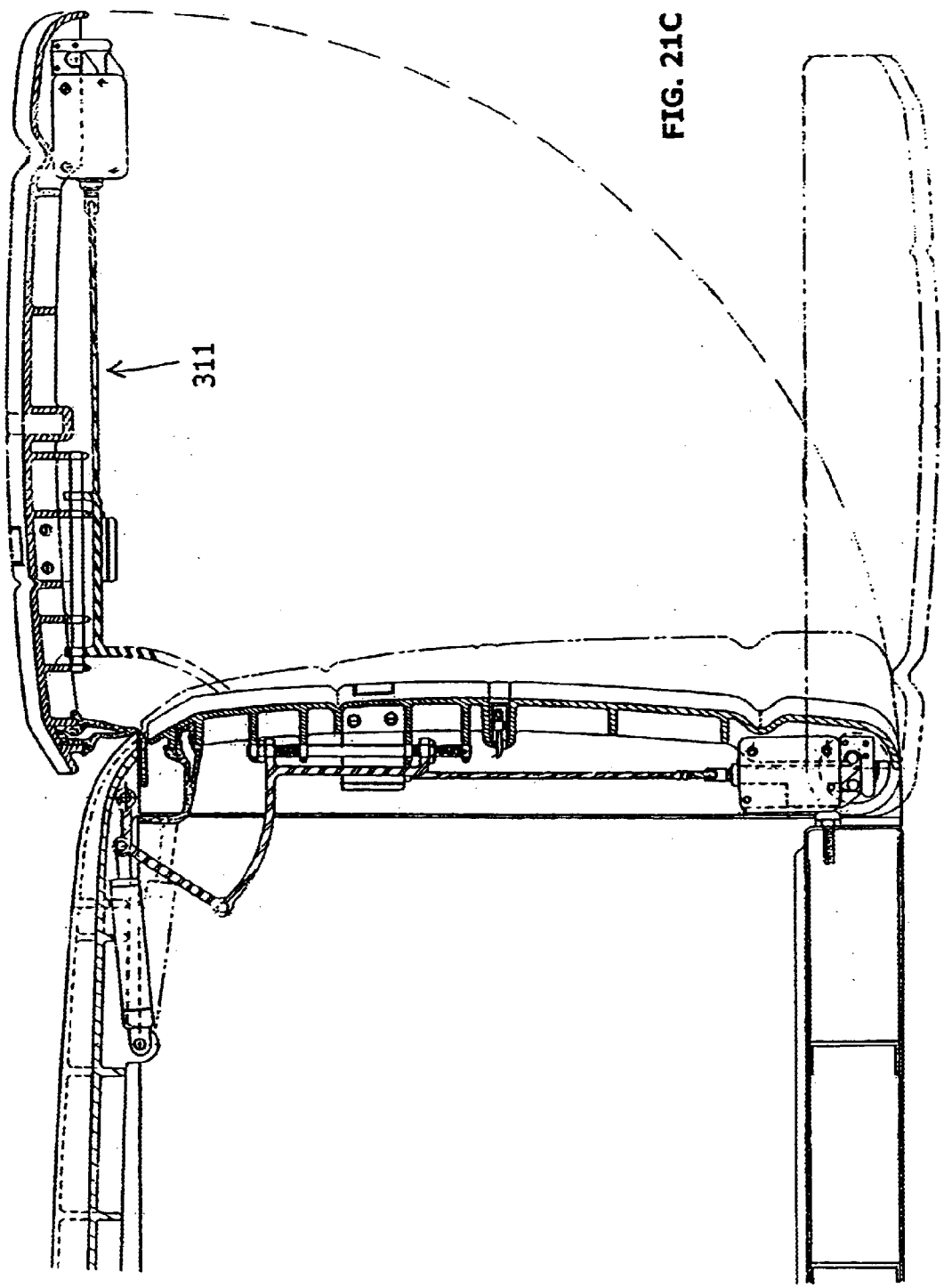
FIG. 21C is a detail cross-sectional view of the auxiliary tailgate of the embodiment of FIG. 21A, showing the tailgate in both open and closed positions, and showing an open position of the primary tailgate in phantom.
Figure 21E:
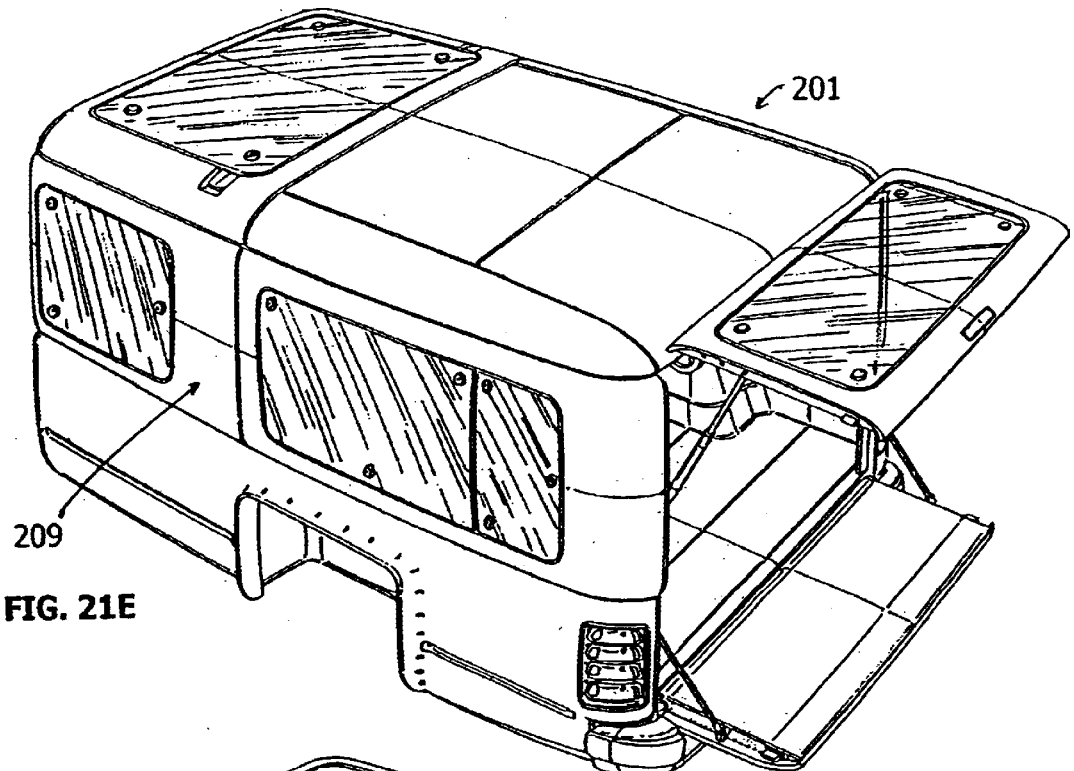
FIG. 21E is a perspective view of a bed portion of a long-bed truck with a cover system according to the invention installed thereon, including taller sidewall risers, as well as a large auxiliary tailgate.
Figure 21D:
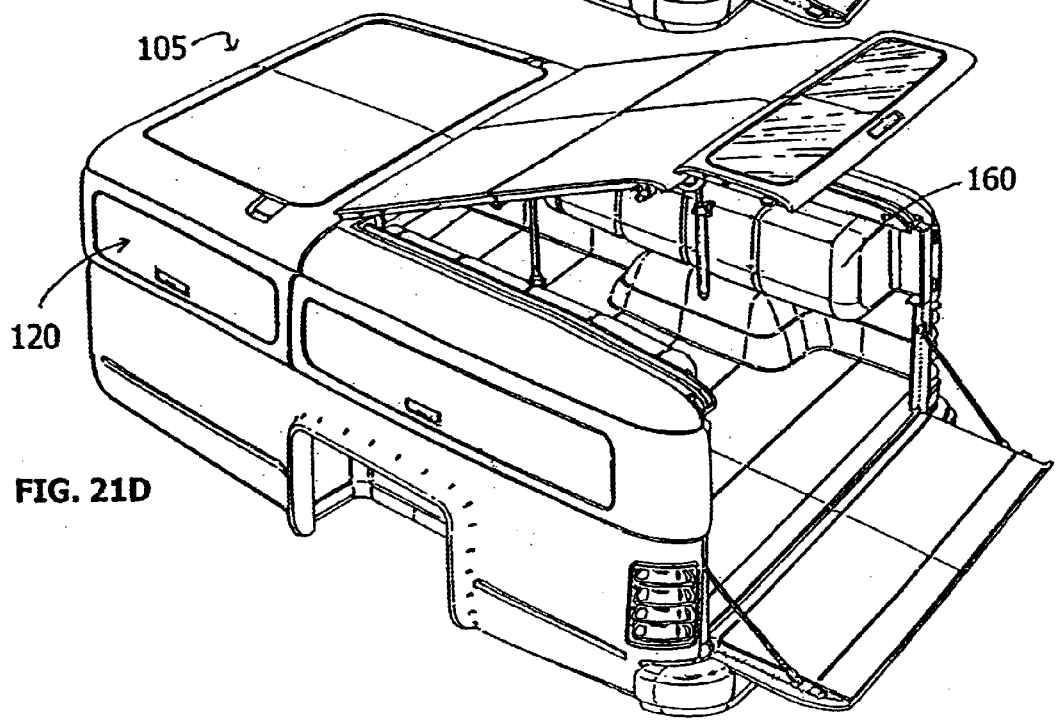
FIG. 21D is a perspective view of a bed portion of a long-bed truck with a cover system according to the invention installed thereon, including medium-height sidewall risers, as well as an auxiliary tailgate.
Figure 22A:
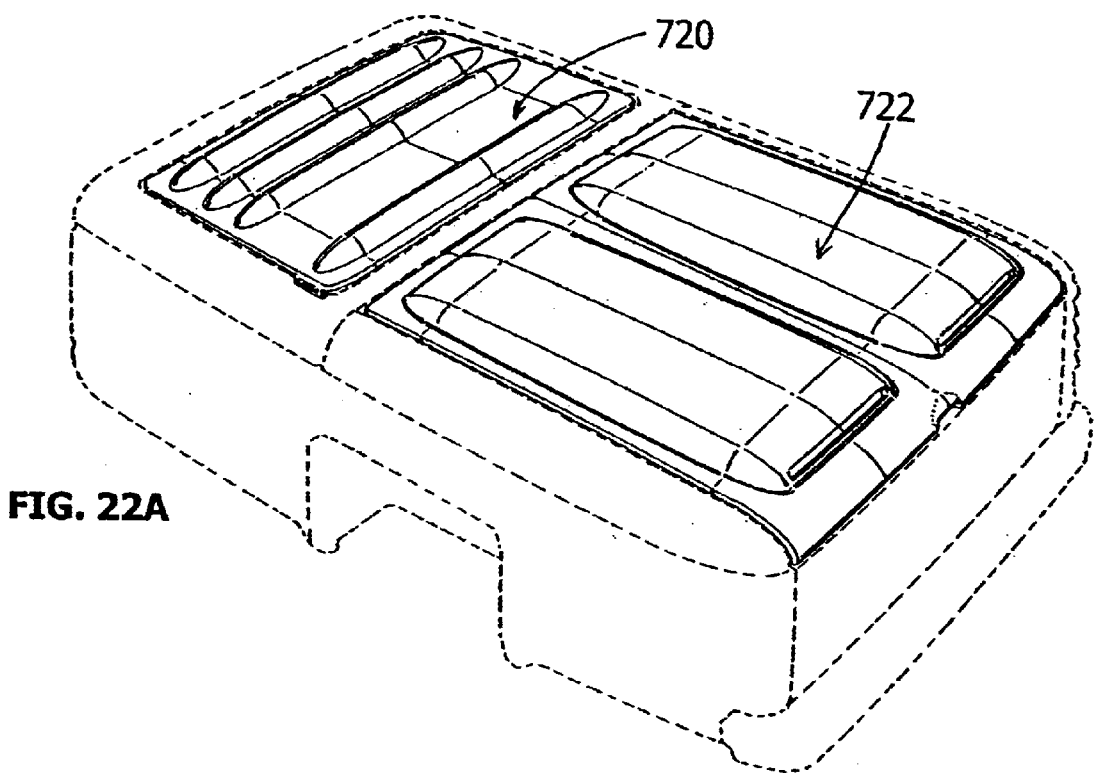
FIG. 22A is a perspective view of two optional decorative appliques, which may be used in connection with the cover system of the present invention.
Figure 22B:
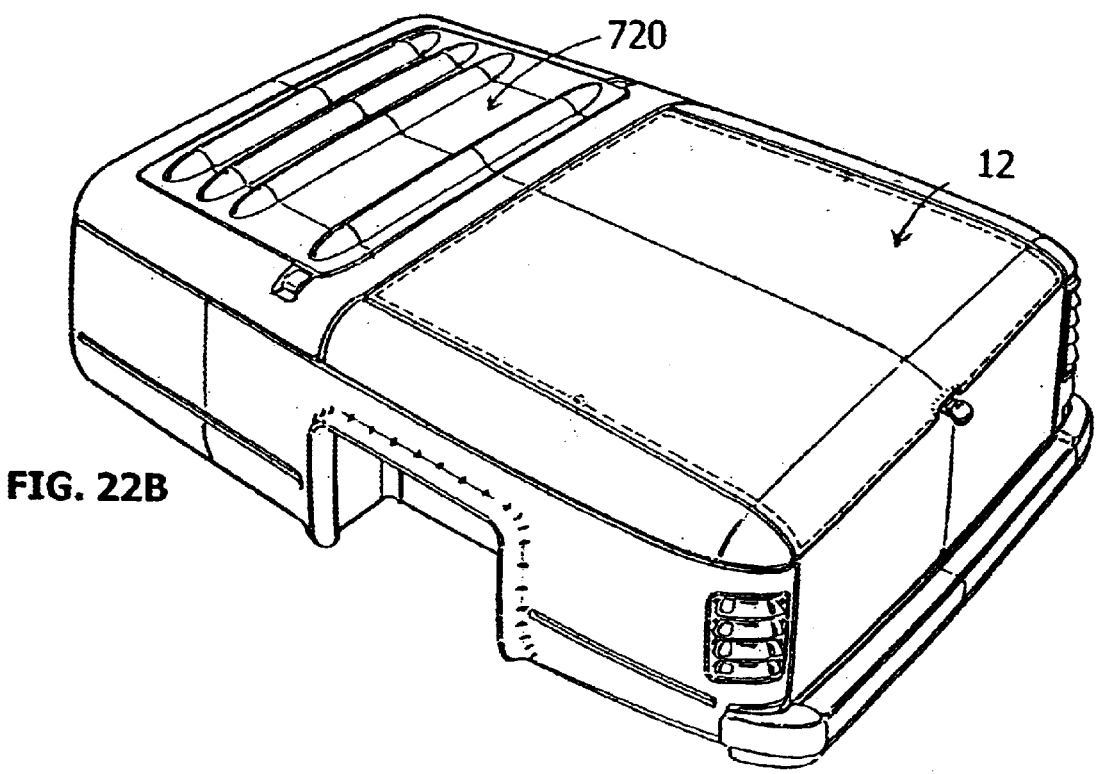
FIG. 22B is a perspective view of a bed portion of a long-bed truck with a cover system according to the invention installed thereon, similar to the embodiment of FIG. 13, and with a first applique of the embodiment of FIG. 22A applied to the filler panel thereof.
Figure 22C:
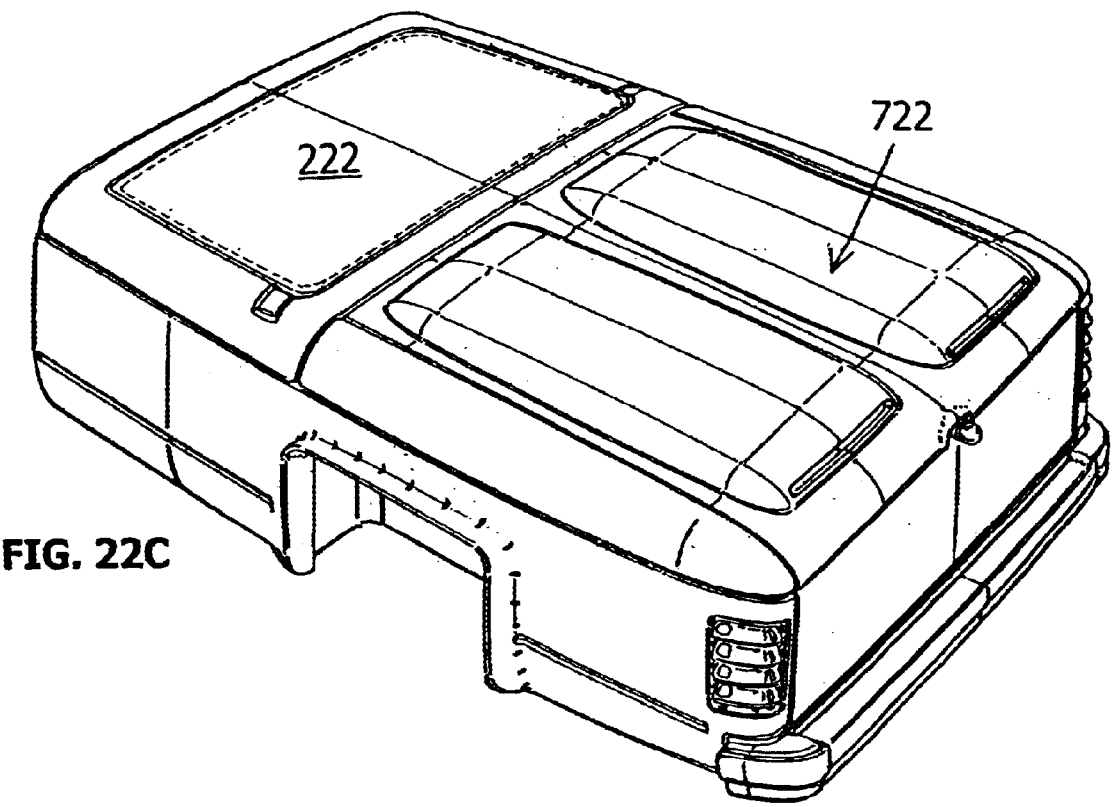
FIG. 22C is a perspective view of a bed portion of a long-bed truck with a cover system according to the invention installed thereon, similar to the embodiment of FIG. 13, and with a second applique of the embodiment of FIG. 22A applied to the center panel thereof.
Figure 22D:
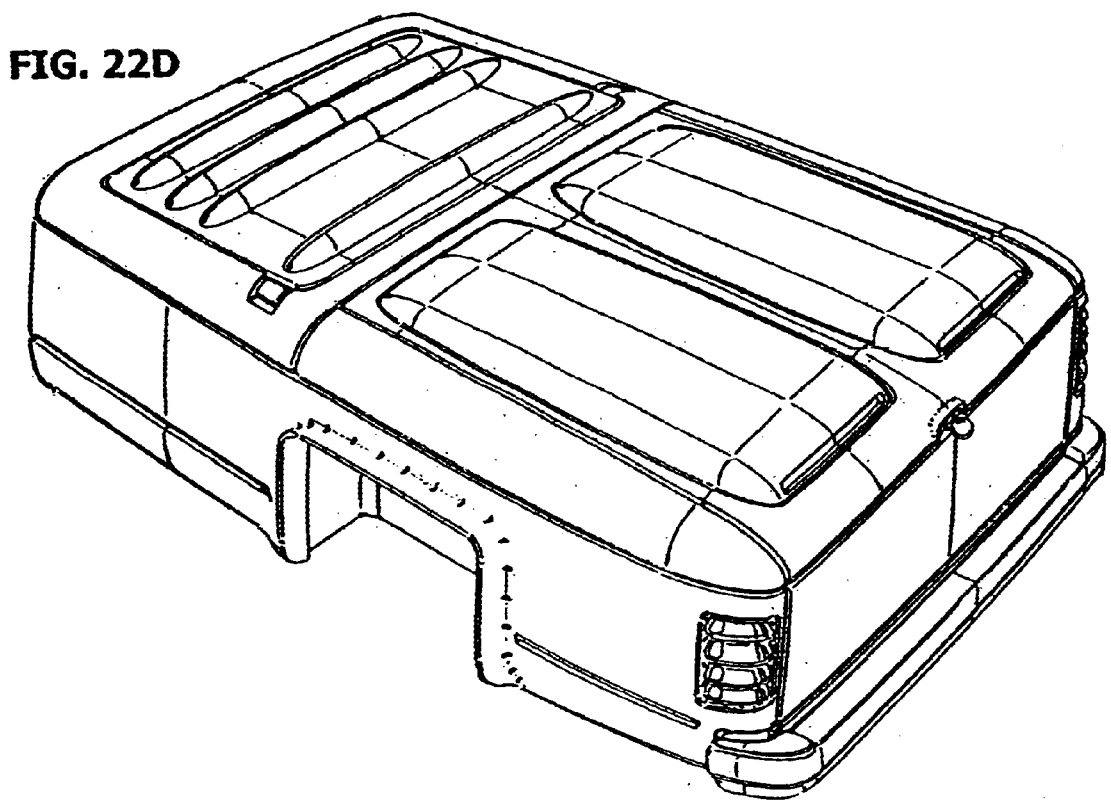
FIG. 22D is a perspective view of a bed portion of a long-bed truck with a cover system according to the invention installed thereon, similar to the embodiment of FIG. 13, and with both appliques of the embodiment of FIG. 22A applied thereon.

As will be appreciated from a review of the embodiments of FIGS. 21D and 21E, the number of applications that can be made using the various components of the inventive system is almost unlimited. The described modular components of the system 10 hereof may be combined and assembled to create a truck cap 105 including medium-height risers 120 having hollow storage compartments 160 formed therein.

Alternatively, different modules of the system 10 hereof may be combined and assembled to create a camper shell 201 including tall risers 209 having openings formed therein and windows attached thereto.

Auxiliary Tailgates

An auxiliary tailgate 311, which is pivotally attachable to the trailing edge of the center panel 12, is another optional module that may be used as part of a system 310. In the embodiment shown in FIG. 21A, the conventional tailgate 114 has been removed from the vehicle, and the auxiliary tailgate 311 has been substituted therefor.

In some embodiments of the present invention, for specialized applications where sidewall risers of a medium 120 or tall height 209 are used, as shown in FIGS. 21D and 21E, an auxiliary tailgate 311 may be used together with the conventional tailgate 114. In such applications, the auxiliary tailgate 311 is located vertically above the conventional tailgate, and cooperates therewith.

The auxiliary tailgate 311 is advantageous for some applications because cargo, such as grocery bags and the like, does not need to be lifted over the conventional rear tailgate in this embodiment. Instead, the auxiliary tailgate 311 pivots upwardly around the trailing edge of the center panel 12, and the center panel is also pivotally liftable by the use of the gas shocks 118 placed at the rear corners of the function rails 46 on the side panels 14, 16. Suitable coil springs (not shown) or other appropriate hardware may be provided, if desired, to bias the auxiliary tailgate 311 upwardly and make it easier to use.

Structure and Function of the Reinforcing Support Brackets

As noted, a reinforcing reinforcing support bracket 30 may be used to secure the side panel 14 to the truck side wall 112, and which otherwise provides support for the tonneau cover on the vehicle, as discussed further below. In the embodiment of FIGS. 4A–4E, the reinforcing support bracket 30 is a part of the tonneau cover system, in accordance with the invention. The reinforcing support bracket 30 is preferably constructed of metal such as aluminum, steel, or the like. Alternatively, the reinforcing support bracket 30 may be made of a high-strength plastic which is suitable for a load-bearing application, such as polyacetal or similar material. The mounting flange 44 of the side panel is preferably clamped to the inner lip 111 of the truck side wall 112 between two upstanding parallel members 13, 15 of the bracket 30, using set screws or other threaded fasteners.

Preferably, as shown in FIG. 4E, a separate clamping bar 45, having threaded holes formed therein, is provided, and fits between the upstanding parallel members 13, 15 of the bracket 30, and receives threaded fasteners 47 therein. When the threaded fastener 47 is theadably engaged in the clamping bar 45 and tightened down, it serves to tightly clamp the mounting flange 44 against one of the upstanding parallel members 15, thereby disengagably attaching the side panel 14 to the reinforcing support bracket 30. While the clamping bar 45 is shown spaced away from the mounting flange 44 in FIG. 4E, it will be understood that when the fasteners 47 are fully tightened therein, the clamping bar 45 will be pressed up against the mounting flange 44.

Preferably, the first upstanding parallel member 13 has a lateral horizontal groove formed in the base of the inboard side thereof, to receive a rolled flange of the truck box inner panel 111 therein. This engagement, between the reinforcing support bracket 30, the side panel 14 and the rolled flange, helps to fix the side panel 14 in place on the truck side wall 112.

Such construction advantageously does not require any permanent modifications to the truck side walls, such as holes drilled therethrough.

Gripping Section

Referring to FIGS. 4A–4E, the reinforcing support brackets 30 are shown in greater detail. Again, these brackets attach to the inner lip 111 of truck box walls 112, 113 by means of a gripping section 117 without the need for drilling into the truck box walls or other permanent modifications to the truck, thus providing for easy installation. The gripping section 117 clamps onto the inner lip 111 of a truck box wall 112, preferably by means of threaded fasteners 38 extending through openings formed in the walls of gripping section.

Support Section

The support section 50 is integrally formed with the gripping section 117. The support section 50 of each reinforcing support bracket 30, adapted to support a tonneau cover thereon, includes a plurality of substantially parallel upstanding flanges such as those shown at 15, 17, with each of these flanges having a recess 54 defined in an upper edge thereof for detachably and pivotally receiving support hardware therein for the cover system 10. In this preferred embodiment, the recess 54 is U-shaped to receive a pivot pin, rod, or the like (indicated at 67 in FIG. 7) positioned perpendicularly through the hinge member 28 or gas shock 118 as in this embodiment, and permit same to pivotally and removably rest on the support section 50.

Stabilizing Section

A stabilizing section 56 of the reinforcing support bracket 30 in this preferred embodiment engages the inner surface of a truck side wall 112, to provide lateral support and stability to the cover apparatus.

The stabilizing section 56 is integrally formed with the support section 50 and the gripping section 117. It is also preferably readily modifiable to fit most pickup models, but could be specifically dimensioned to fit particular models. In the preferred embodiment, the stabilizing section 56 comprises multiple segments 58, having indentations formed therebetween, as shown. Selected segments 58 may be removed to adjust the width of the stabilizing section. A bolt cutter 57 or similar tool could be used to simply clip off excess segments 58 of the stabilizing section, as shown in FIG. 4B, resulting in adjustment of the stabilizing section 56 to the proper box width to fit a desired application. FIG. 6b illustrates a few possible widths of the stabilizing section 56, shown side by side for comparison.

Alternatively, the width of the stabilizing section 56 could also be adjustable by means of a scissors-jack type design, by the provision of adjustably sliding members, or by other appropriate adjustment method.

In order to protect the inner surface of truck side walls 112, and to prevent squeak, rattle, or other similar noises, a rubber or elastomeric end cap 59 is preferably disposed around the end of the outermost segment(s) 58 of the stabilizing section 56 for damping vibrations. Thus disposed, the end cap 59 will be located between the inner surface 111 of the truck side walls 112 and stabilizing section 56. As an alternative to being formed from a rubber or elastomeric material, the end cap 59 could be made from formed foam, foam tape, or other materials.

Bracket Manufacture

The reinforcing support bracket 30 could easily be manufactured by extruding aluminum or steel. Such manufacturing would be inexpensive to tool and process, would not require welds, and would allow the bracket 30 to be made as a single unit. It would also allow for easy manufacture of the removable segments 58 of the stabilizing section 56. The bracket 30 could alternatively be made by stamping and welding processes, a casting process, or extruded from a sufficiently strong plastic, or other methods and materials.

Bracket Operation

As also shown in FIG. 4D, the bracket 30 has a pair of spaced openings 60 and a central opening 61 formed through the support section 50. The central opening 61 receives the rod of the gas shock 118 therethrough, while openings 60 function to respectively receive therein a latch bracket 62 and a support grommet 64. The latch bracket 62 receives the lower end of a lockable multi-position latch 65 therein, while the upper end of the latch is fixed through the center panel 12. In use, a key would be inserted into the latch and turned, for either locking it to the bracket 62 or releasing it therefrom. The grommet 64 is used together with the gas shock 118 according to another aspect of the invention as shown in FIGS. 6F–6I. Particularly, the lower end of the gas shock is not fixed in place, but can be selectively disposed in a floating manner, such that it either hangs below the bracket 30 (in normal use as in FIGS. 6G, 6H), or else can be lifted from the bracket and supported in the grommet (for raising the center panel to a greater extent above the bracket 30, as in FIG. 6I).

Alternate Reinforcing Support Bracket

Referring now to FIGS. 5A–5I, it will be seen that an alternate reinforcing support bracket is shown at 230. This alternate reinforcing support bracket 230 is usable in place of the reinforcing support bracket 30 of the first embodiment, and functions similarly thereto.

The alternate reinforcing support bracket 230 may be used to secure the side panel 14 to the truck side wall 112, and to otherwise provide support for the cover system hereof on the vehicle, as discussed further below. In the embodiment of FIGS. 5A–5I, the reinforcing support bracket 230 is a part of the cover system, in accordance with the invention. The reinforcing support bracket 230 is preferably constructed of metal such as aluminum, steel, or the like. Alternatively, the reinforcing support bracket 230 may be made of a high-strength plastic which is suitable for a load-bearing application, such as polyacetal or similar material. The mounting flange 44 of the side panel is preferably clamped to the inner lip 111 of the truck side wall 112 between two upstanding parallel members 213, 214 of the bracket 230, using set screws or other threaded fasteners 211.

Figure 5B:
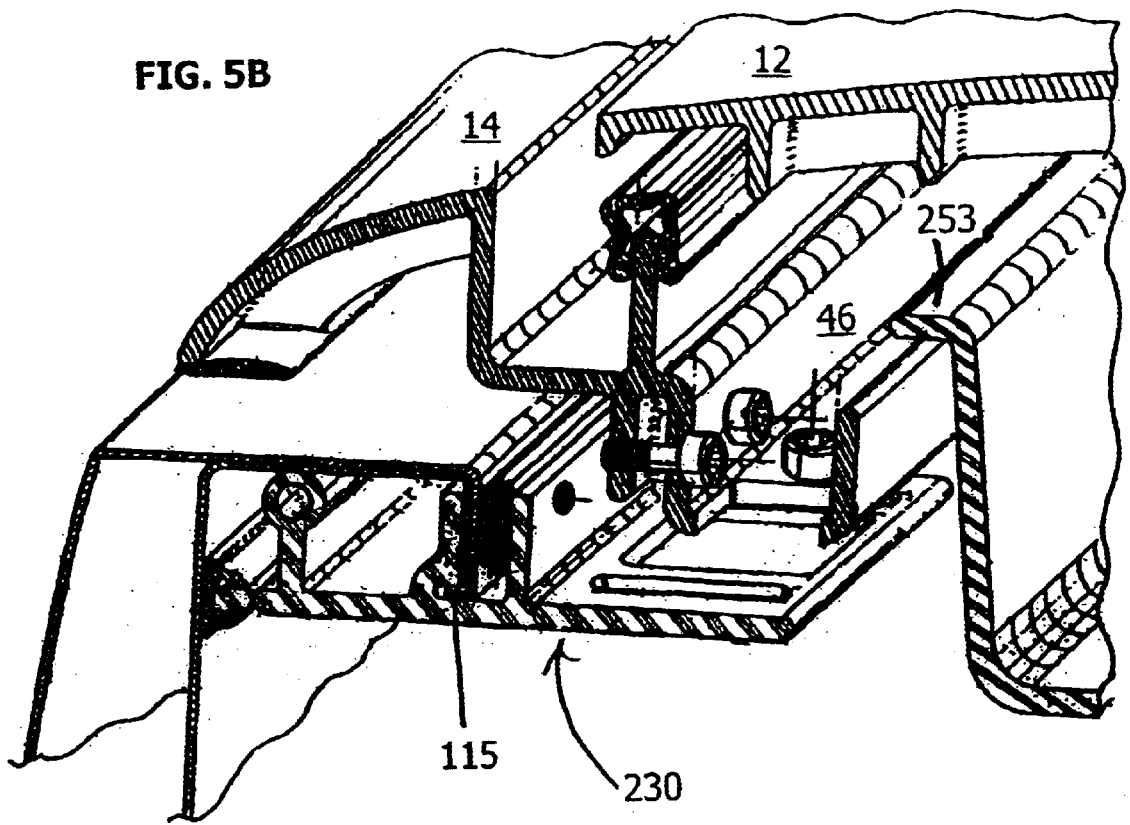
FIG. 5B is a broken away perspective view, partially in cross-section, of a truck side wall showing several components of the system hereof installed thereon, including the reinforcing support bracket of FIG. 5A.
Figure 5D:
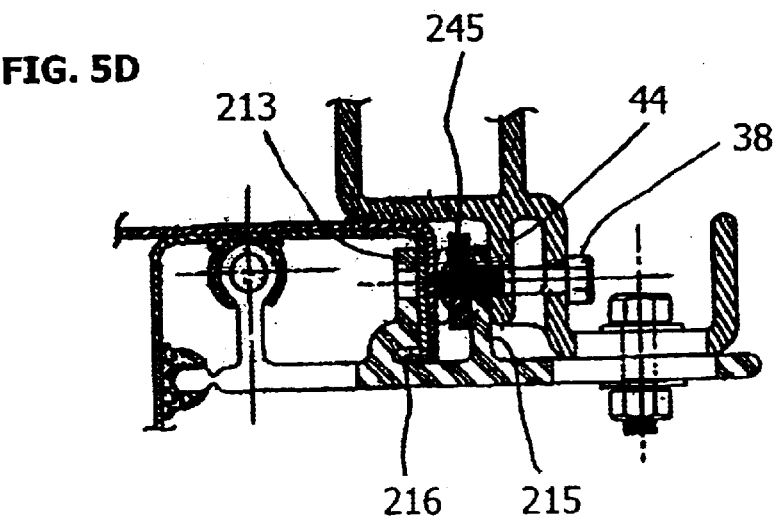
FIG. 5D is an enlarged detail view of part of the structure shown in FIG. 5C.
Figure 5G:
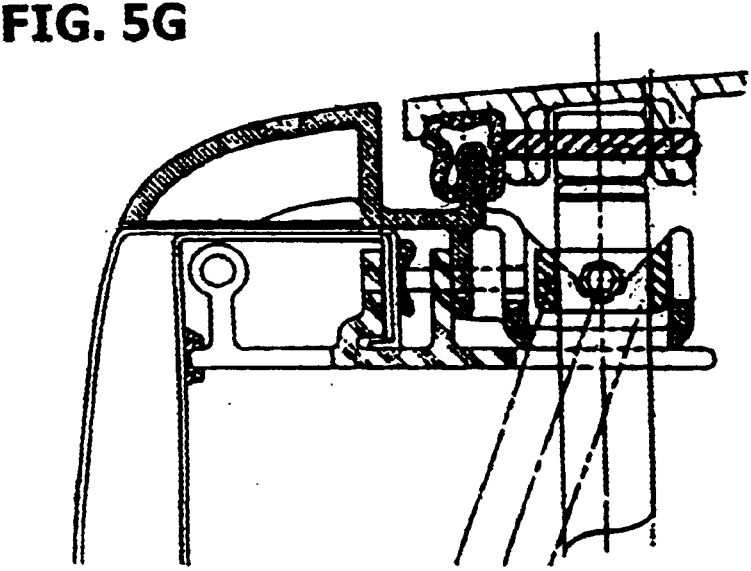
FIGS. 5G–5I are cross-sectional views similar to FIG. 5C, showing various possible configurations of a gas shock in cooperation with the side panel and the reinforcing support bracket.
Figure 5H:
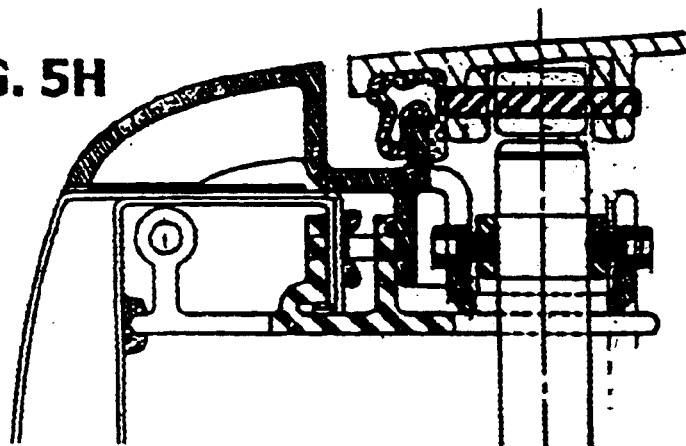
Figure 5I:
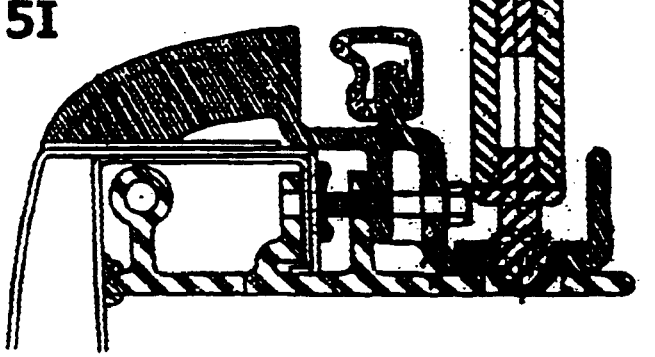
Figure 5J:
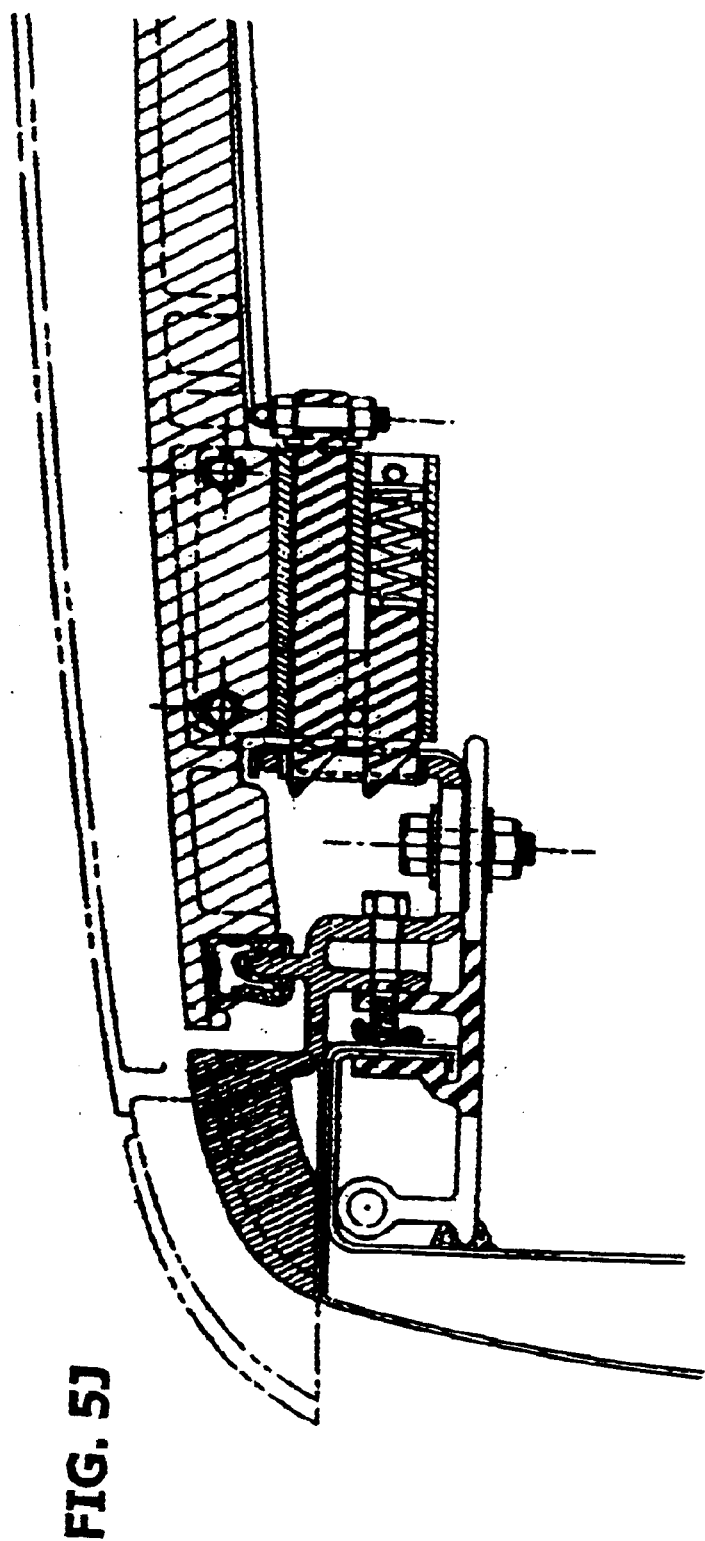
FIG. 5J is a cross-sectional view similar to FIG. 5B, also showing an optional latch member.

Preferably, as shown in FIG. 5D, a separate clamping bar 245, having threaded holes formed therein, is provided, and fits between the upstanding parallel members 213, 214 of the bracket 30, and receives threaded fasteners 211 therein. When the threaded fastener 211 is theadably engaged in the clamping bar 245 and tightened down, it serves to tightly clamp the mounting flange 44 against one of the upstanding parallel members 214, thereby disengagably attaching the side panel 14 to the reinforcing support bracket 230. When the fasteners 211 are fully tightened therein, the clamping bar 245 will be pressed up against the mounting flange 44, as shown in the detail view of FIG. 5D.

Preferably, the first upstanding parallel member 213 has a lateral horizontal groove 216 formed in the base of the inboard side thereof to receive a rolled flange 115 of the truck box inner panel 111 therein. This engagement between the bracket 230 and the rolled flange 115 helps to fix the side panel 14 in place on the truck side wall 112.

Such construction advantageously does not require any permanent modifications to the truck side walls 112, 113, such as holes drilled therethrough.

Gripping Section

Referring to FIGS. 5A–5D, the reinforcing support brackets 230 are shown in greater detail. Again, these brackets attach to the inner lip 111 of truck box walls 112, 113 by means of a gripping section 217 without the need for drilling into the truck box walls or other permanent modifications to the truck, thus providing for easy installation. The gripping section 217 clamps onto the inner lip 111 of a truck box wall 112, preferably by means of threaded fasteners 211 extending through openings formed in the walls thereof.

Support Section

The support section 250 is integrally formed with the gripping section 217. The support section 250 of each reinforcing support bracket 230, adapted to support a tonneau cover thereon, consists of a substantially horizontal plate extending outwardly from the gripping section 217, and having holes formed strategically therein, as shown, to allow the passage of hinge members and fasteners therethrough.

Stabilizing Section

A stabilizing section 256 of the reinforcing support bracket 230 in this alternate preferred embodiment engages the inner surface of a truck side wall 112, to provide lateral support and stability to the tonneau cover.

The stabilizing section 256 is integrally formed with the support section 250 and the gripping section 217. It is also preferably readily modifiable to fit most pickup models, but could be specifically dimensioned to fit particular models. In the preferred embodiment, the stabilizing section 256 comprises multiple segments 258, having indentations formed therebetween, as shown. Selected segments 258 may be removed to adjust the width of the stabilizing section. A bolt cutter 57 or similar tool could be used to simply clip off excess segments 258 of the stabilizing section, as shown in FIG. 4B, resulting in adjustment of the stabilizing section 256 to the proper box width to fit a desired application.

In order to protect the inner surface of truck side walls 112, and to prevent squeak, rattle, or other similar noises, a rubber or elastomeric end cap 259 is preferably disposed around the end of the outermost segment(s) 258 of the stabilizing section 256 for damping vibrations. Thus disposed, the end cap 259 will be located between the inner surface 111 of the truck side walls 112 and stabilizing section 256.

Another feature of this alternate embodiment of the reinforcing support bracket 230 is that the bracket has an integral raised boss 232 thereon. The raised boss 232 of the bracket 230 has a horizontal cylindrical bore 233 formed therethrough to receive a hinge pin. A slot 257 is formed in the engaging section of the support bracket 230, and an end portion 235 of a curbside hinge member 234 (FIG. 8A) is alignable with the slot. When the curbside hinge member 234 is lined up with the slot 257, as shown in FIG. 5E, a hinge pin 228 may pass through the cylindrical bore 233 of the raised boss 232, and also through an eyelet 236 formed through the end of the curbside hinge member 234, to pivotally attach the hinge member 234 to the bracket 230.

Alternative Side Panel Attachment

Referring to FIGS. 4F–4G, some possible modifications of the side panel 14 and the peripheral edge of the center panel 12 are shown, which are variations of the basic design shown in FIG. 4E and discussed above. In the embodiments of FIGS. 4F–4G, the modified side panels 14' are not clamped to the inner lip 111 of the truck bed side wall 112. Instead, in these modified embodiments, the side panels 14' are temporarily affixed to the truck side wall 112 using double-sided foam tape 19 or the like, typically used to mount truck caps. In these embodiments, the reinforcing support bracket 30 is not used, but instead, the side panel 14' is attached directly to the truck side wall 112.

Threaded fasteners 121, clamps or the like typically used to mount truck caps may also be used, either alone or in conjunction with a snap-fit, or double-sided foam tape 19 or the like, to attach the modified side panel 14' to the truck bed side wall 112, but are not preferable since they require permanent modifications to the truck body. The peripheral edge 71 of the center panel 12' is, again, spaced from the side panel with a gap G therebetween to function as a rain channel, although the channel is not as wide as that in FIG. 4E.

The Basic G-hinge

Figure 8B:
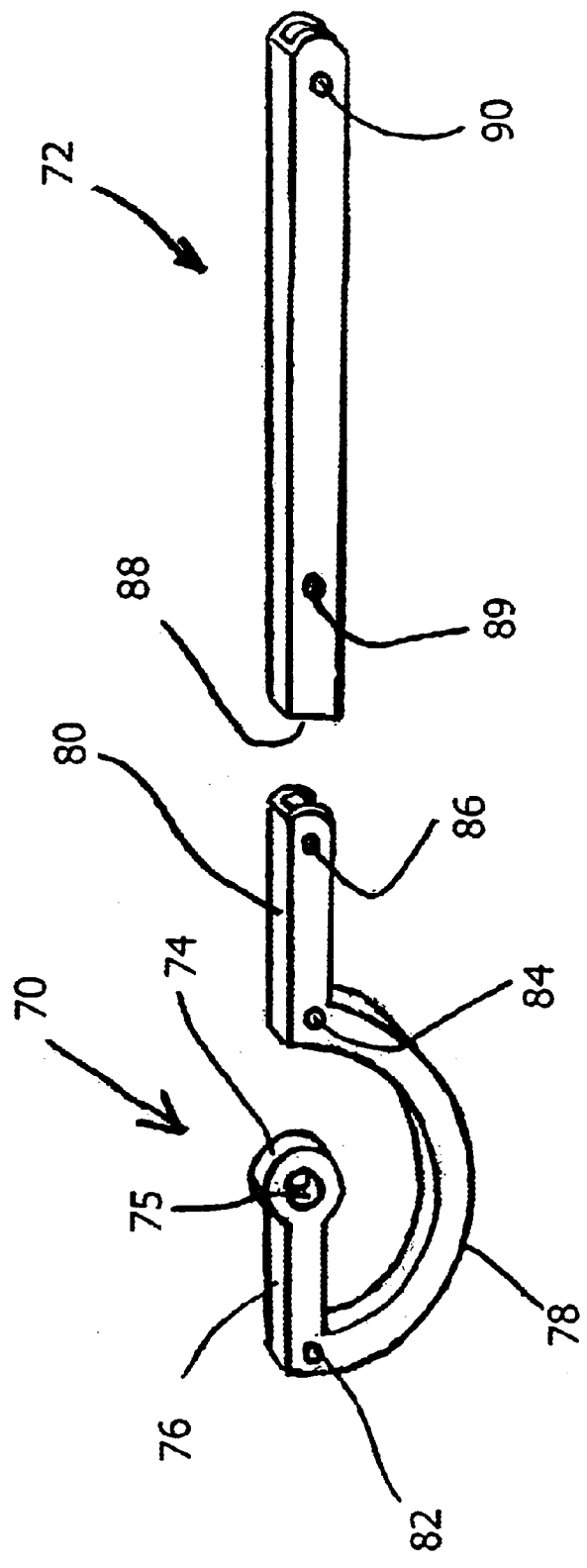
FIG. 8B is a perspective view of a fourth (curbside) hinge member which is usable as an optional component of the system hereof.

One suitable type of hinge member, which is suitable for use in the practice of the present invention, is shown at 70 in FIG. 8B, along with an extension member 72, which is usable therewith.

Throughout the present description, for the sake of brevity, this hinge member 70 will be referred to as a 'basic G-hinge', because when viewed from a particular orientation, it resembles the letter G. The basic G-hinge 70 is preferably extruded from engineered plastic-based reinforced composite material. The G-hinge begins at a circular eyelet 74 having a pivot aperture 75 therein to receive a pivot post (not shown). A first straight segment 76 extends outwardly away from the eyelet 74, and at the end of the first segment 76, the G-hinge continues in a semi-circular bow 78, as shown. At the end of the bow 78, a second straight segment 80 extends in a direction away from the eyelet 74. The first and second segments 76, 80 are lined up with one another such that the top and side surfaces thereof are coplanar. A number of through holes such as those shown at 82, 84 and 86 are formed through the hinge 70 to receive threaded fasteners such as bolts or screws therethrough. At times, two of these hinges 70 may be used cooperatively together to provide a greater range of motion of a part.

When the G-hinge 70 is used to pivotally mount a movable member to a support piece, a hole is usually made in the support piece for the bow 78 to pass through. This allows a considerable degree of movement, but when the first straight segment 76 contacts the support, it acts as a stop to block further movement of the movable member.

The extension 72 is also formed from the same type of material as the hinge 70, of a slightly larger diameter so that the second straight segment 80 of the hinge fits slidably within the open end 88 of the extension. The extension also has through holes 89, 90 formed therethrough to receive fasteners. The extension 72 may be made in different lengths to fit specific applications. Preferably, a torsion bar 85 is used together with the extension to stabilize the center panel 12 in a fully extended configuration thereof. Where used, the torsion bar 85 preferably extends across the entire width of the truck bed.

The Improved G-hinge

Referring now to FIGS. 7A–7B, a modified and improved version of the G-hinge is shown at 170. This modified G-hinge 170 includes a

The Curbside Hinge Member

Referring now to FIG. 8A, it will be seen that another hinge is usable with the practice of the present invention, to allow pivotal opening of a selected panel member about a top surface of one of the truck side walls. This hinge is referred to herein as a curbside hinge member 234, because it permits sideways pivotal opening of the movable panel members 12, 222, which facilitates curbside loading and unloading of the truck bed 98. This same hinge member 234 may be used to pivotally attach the front edges of the movable panel sections 12, 222 to their respective adjacent supports.

Compact Embodiment for Tool or Cargo Storage

In one compact embodiment of the invention, and as shown in FIGS. 9–11B, the frame panel 218 may be used, without the center panel 12 or the side panels 14, 16 to provide a cargo storage system 248 for placement on a cargo area or bed 98 of a truck. The cargo storage system 248 fits into the truck bed 98 in front of the rear wheel wells 94, and immediately behind the truck cab 97.

Where used in this way, the cargo storage system 248 includes the frame panel 218 for substantially horizontal attachment atop and interconnecting the two side walls 112, 113 of the truck cargo area, as shown. The frame panel 218 has an upper surface 219 with the hollow opening 220 formed therethrough. The frame panel 218 also includes one or more recessed support flanges 221 extending inwardly thereon below the upper surface 219, to limit downward movement of the filler panel 222 so that the respective upper surfaces of the filler panel and the frame panel align with one another in a closed position of the filler panel 222, to provide a substantially continuous surface.

The filler panel 222 fits in and covers the hollow opening 220 of the frame panel 218. The filler panel 222 is removable from, and replacable into the frame panel 218, to allow substituting placement of an accessory module in the hollow opening 220 thereof.

The cargo storage system 248 also includes a tray 252 defining a storage area therein. The tray 252 is dimensioned to fit removably into the opening 220 in the frame panel 222. The tray 252 has a substantially horizontal lip 253 extending outwardly thereon, for supporting placement on the support flanges 221 of the frame panel 218.

Preferably, the cargo storage system 248 further includes a finishing strip 225 for abutting placement across the truck cargo area 98, rearwardly behind the frame panel 218 and spaced away from the truck cab 97. The finishing strip 225, where used, covers and smooths over the end face of the frame panel 218. The finishing strip has sideways V-shaped notches formed in the ends thereof, to allow it to be seated snugly between the truck side walls 112, 113.

Another optional feature of the cargo storage system 248 hereof, is that it may further include a liquid storage tank which fits inside, and is supported by the tray.

Parallel Opening

Referring once again to FIG. 2, the tonneau cover system 10 according to the first preferred embodiment is shown with the center panel 12 raised fully above the truck box 98, in a configuration which is parallel to the floor of the truck box, through the first preferred support mechanism.

The first preferred support mechanism supports each side of the center panel 12 at two points spaced longitudinally from each other on the truck box 98, such that the center panel 12 may be moved vertically relative to the truck box, between open and closed positions thereof. The center panel 12 is movable between a closed position flush with the side panels 14, and various open positions in which the center panel is disposed above the side panels.

In one embodiment hereof, the support structure for the center panel 12 includes a plurality of pivotally movable hinge members 28, a plurality of pneumatic gas shocks 118, and the above-mentioned reinforcing support brackets 30. Alternatively, instead of the hinge members 28, the G-hinges 70 may be used.

The pivoting hinge members 28 are versatile and may attach between the reinforcing support bracket 30 and the center panel 12 in any number of different ways, to provide different configurations of the center panel relative to the truck bed 98. For example, the hinge members 28 may be attached, at an upper end thereof, to the support bosses 23, 25, on the underside of the center panel 12, by means of a pin 130 (FIGS. 6A, 6B) passing through selected holes 32 formed in the support bosses. (Those in the art will realize that other appropriate structure may be used to form a pivotal attachment between the upper end of the hinge member 28 and the center panel 12).

The lower end of each pivoting hinge member 28 includes a U-shaped flange 29 transversely attached thereon, as shown. The U-shaped flange 29 is preferably attached to the body of the hinge member 28 by welding, gluing, or by interference fit thereon, and supports a cylindrical sleeve 31 in the crook thereof. The lower end of the hinge member 28 is pivotally attached to the reinforcing support bracket 30 by means of another pin 130 or the like, passing through the sleeve 31 and extending outwardly from opposite ends thereof, into openings formed in the sides of the function rails 46 on the reinforcing support brackets 30. At the bottom of the hinge member 28, the pin 130 is journaled in a selected one of a number of holes 32 formed in the reinforcing support bracket 30 to allow each hinge member 28 to pivotally move relative to its corresponding reinforcing support bracket 30.

Figure 6C:
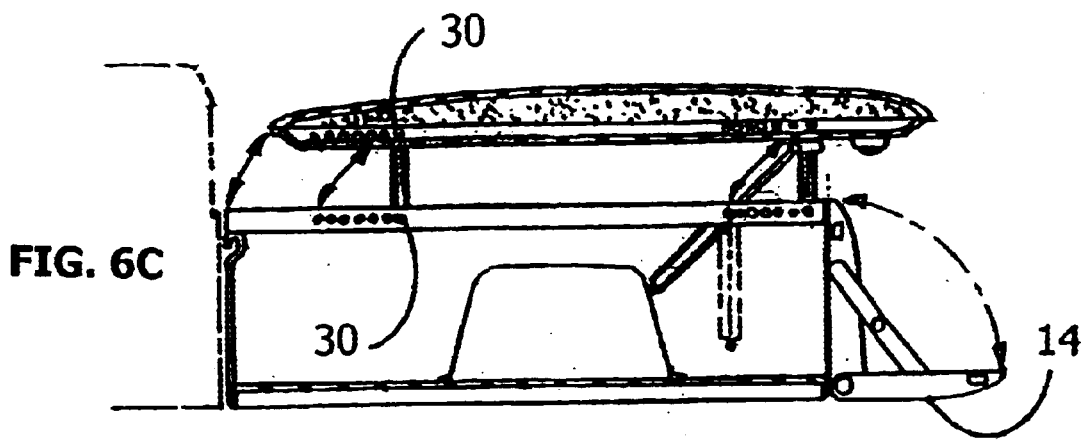
FIGS. 6C–6E are cross-sectional views of a truck bed with the system of FIGS. 1–4 installed thereon, taken through a vertical longitudinal plane, and with the center panel shown in various open positions thereof.
Figure 6D:
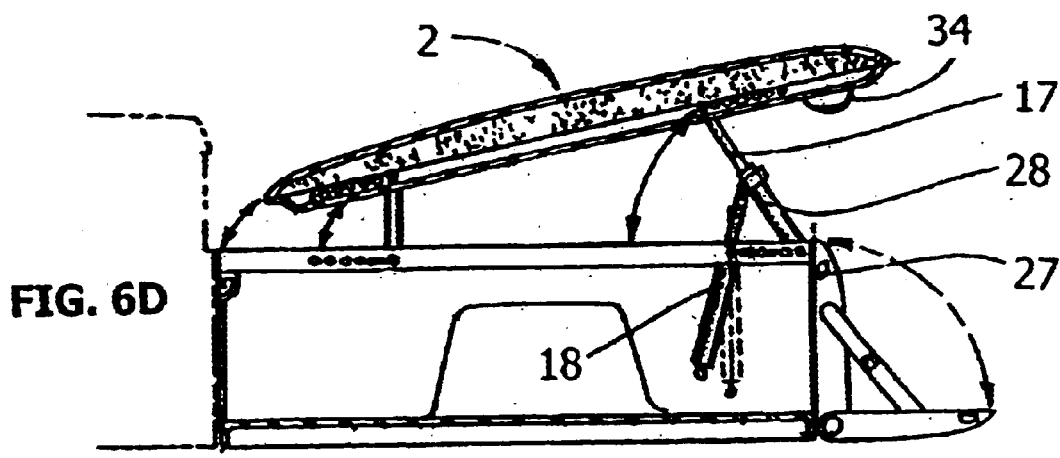
Figure 6E:
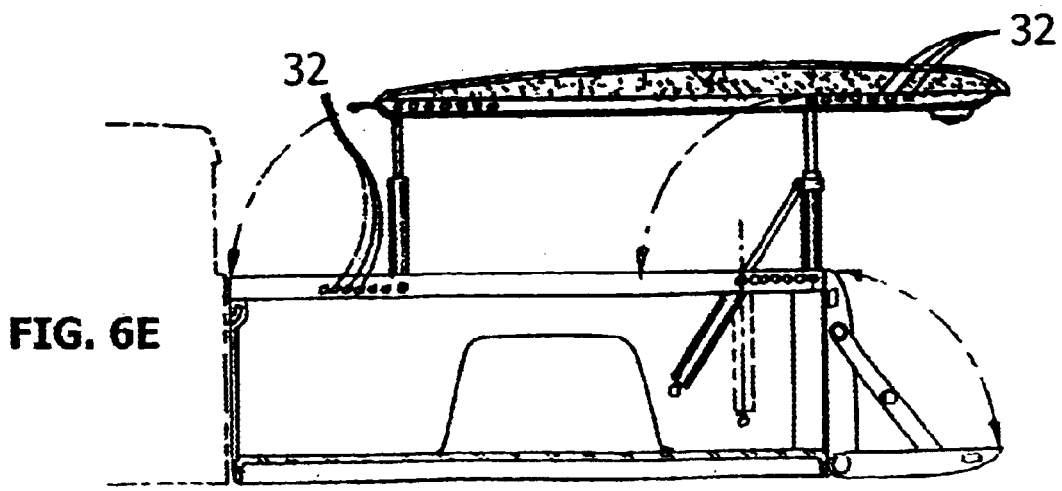
Figure 6F:
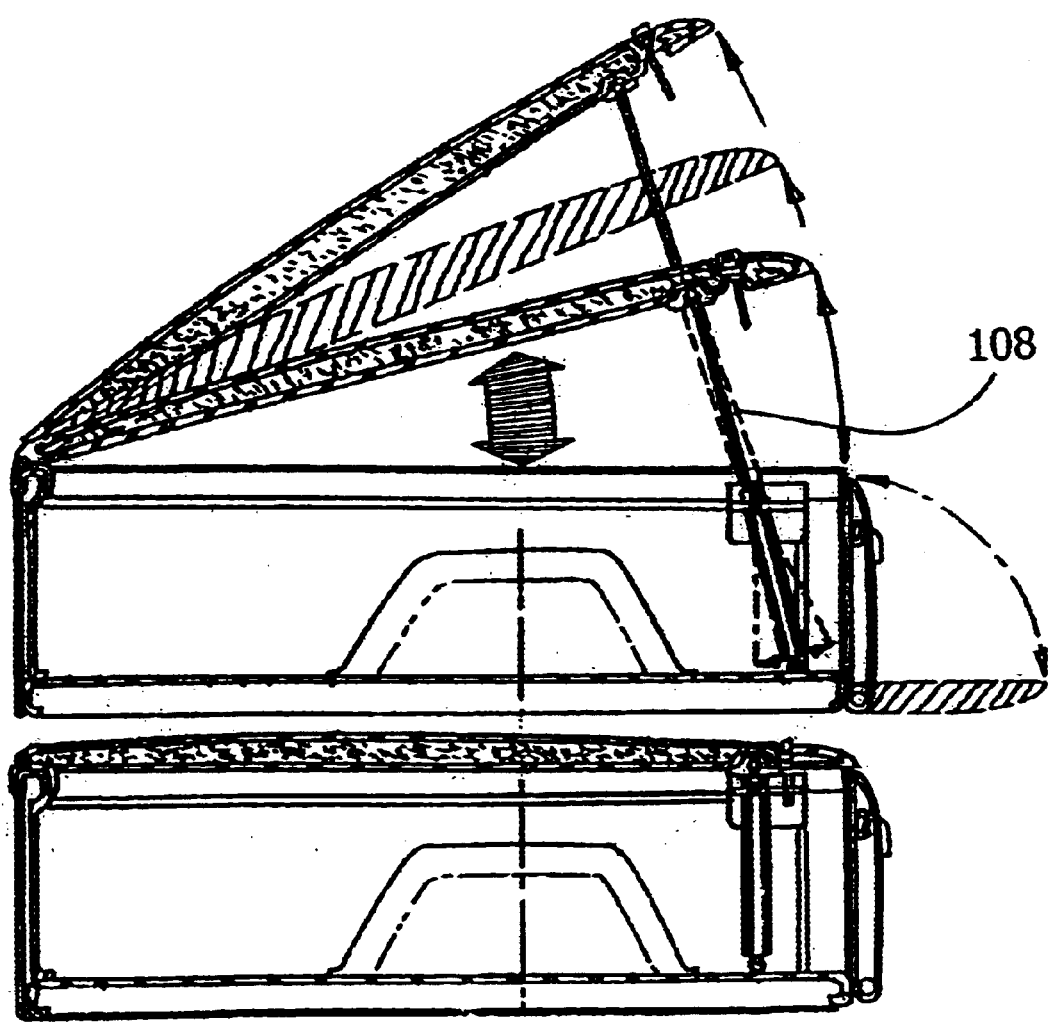
FIG. 6F is a cross-sectional view of a truck bed with the system of FIGS. 1–4 installed thereon, taken through a vertical longitudinal plane, and with the center panel pivotally attached at the front and shown in various open positions thereof.
Figures 6G, 6H, 6I:
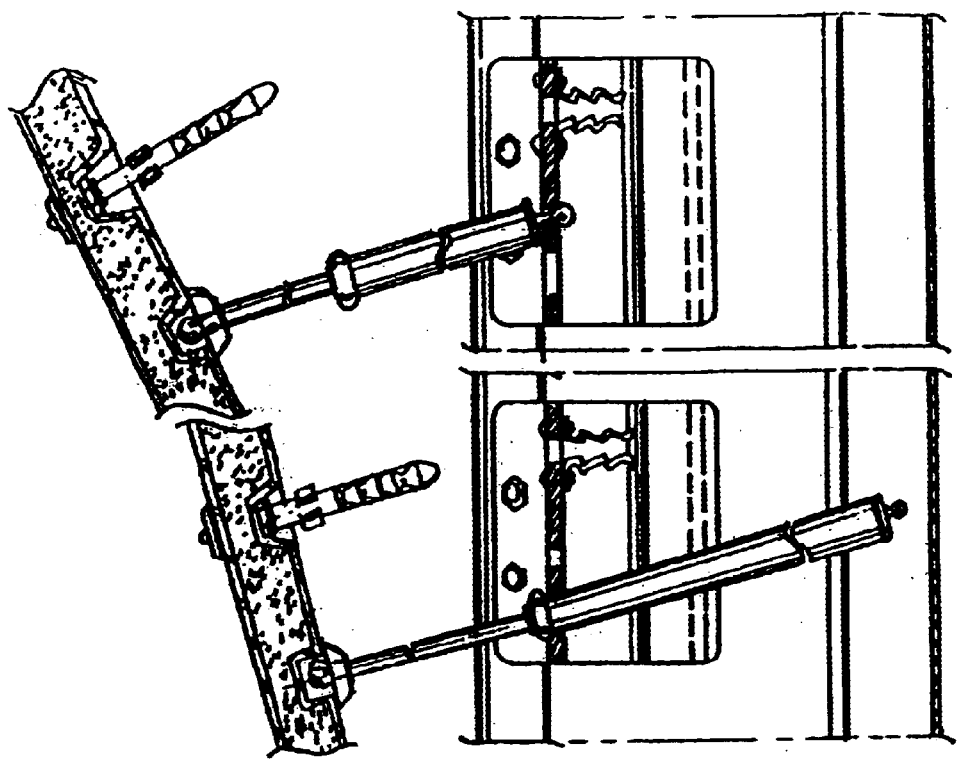
FIGS. 6G–6I are alternative side plan views, partially in cross-section, of how a gas shock may be configured on the side rail in raising the center panel.

Gas shocks 118 are preferable for use in cooperation with the pivoting hinge members 28, to facilitate lifting of the center panel 12 as it is pivotally rotated into various open positions as shown in FIGS. 6C–6E.

As best shown in FIGS. 6A–6E, the pivoting hinge members 28 may be adjusted to different effective lengths, by having ends thereof connected to the center panel 12 and the side panel at different positions therealong. This adjustment is permitted by placing the pivot pins 130 into different openings 32, and by connecting the rod of the gas shock 118 to different openings formed in the pivoting hinge members 28. Thus in FIG. 6C, the center panel 12 is raised up and disposed substantially parallel to the floor of the truck bed 98 for increased cargo space.

Figure 19:
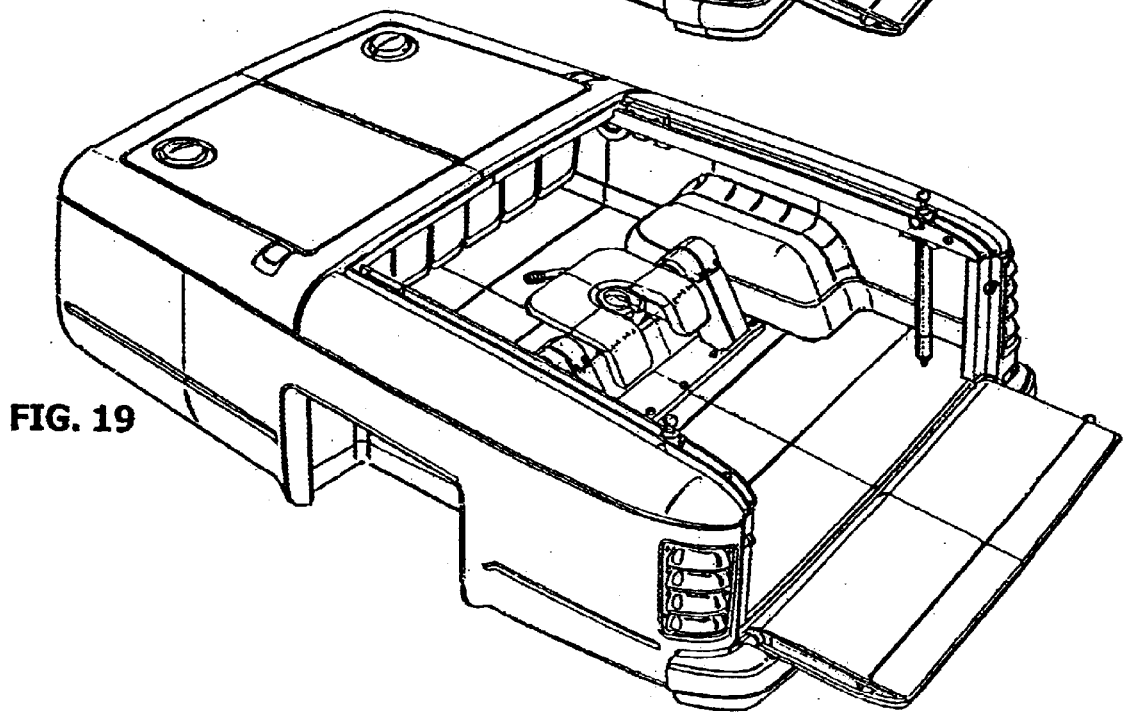
FIG. 19 is a perspective view of a bed portion of a long-bed truck with a cover system according to the invention installed thereon, including a storage tray, an auxiliary fuel tank within the storage tray, and a fifth-wheel trailer hitch installed in the truck bed.
Figure 15C:
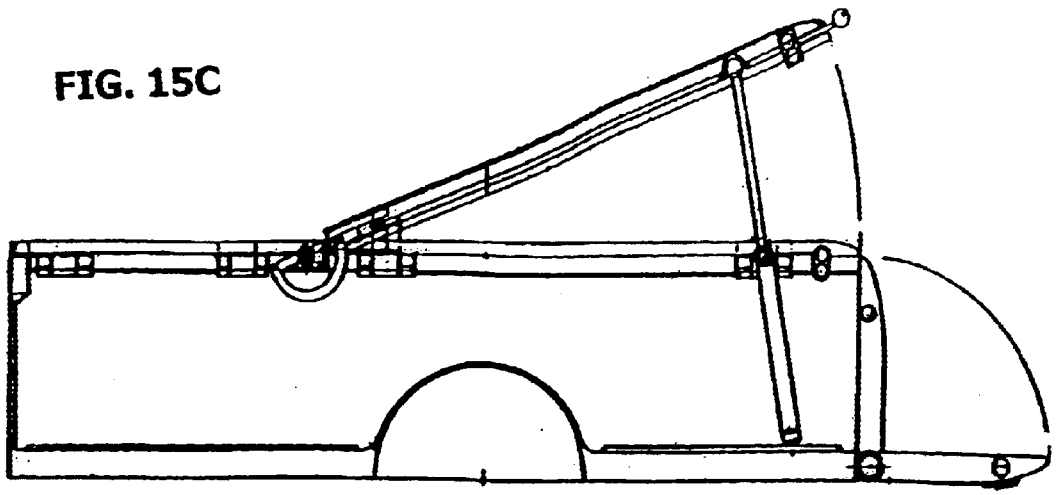
FIG. 15C is a side plan view of the inside of the truck bed of FIG. 15A, partially in cross-section.
Figure 15D:
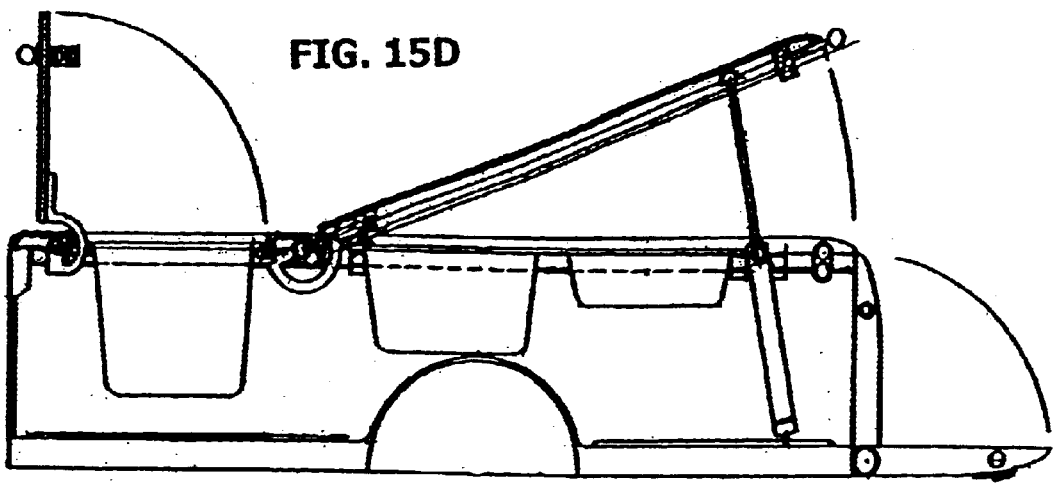
FIG. 15D is a side plan view similar to 15C, also showing three storage trays in the truck bed suspended on the modular panels of the invention.
Figure 15E:
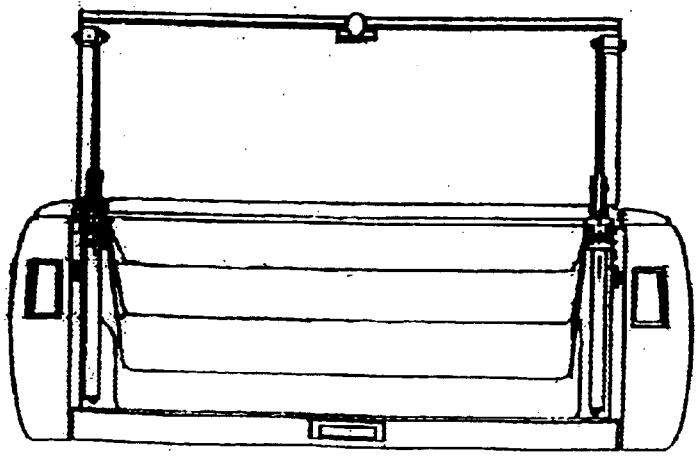
FIG. 15E is a rear plan view of the truck bed of FIG. 15C.

In FIG. 6D, the rear end of panel 12 is higher than the front end, and in FIG. 6E the panel is lifted to a higher extent and shifted rearwardly over the tailgate 114 (such that it functions as a cover for the tailgate which can then be used as a workbench). Also, by removing the pivot pin 130, the center panel 12 may be completely removed from the vehicle, while the side and front panels 14, 16, 18 remain attached. This is very desirable if the truck box is to be used for supporting a fifth (towing) wheel, as shown in FIG. 19.

An optional light 34 may be provided on the underside of the center panel, at 35 is an optional elevated rear brake light provided on the center panel 12, and at 36 is a control handle for releasing a latch mechanism securing the center panel to the side panels 4 in the closed position thereof. Optionally, side skirts and the like (not shown) may be provided for attachment to the center panel when it is disposed in a raised position thereof.

Although shown rotating rearward relative to the pickup truck, the center panel 12 could be raised straight vertically substantially parallel to the side panels 4 or pivoted fully perpendicular to the floor of the truck box 98 to provide full access to the cargo area. Although the preferred embodiment includes four hinge members 28 with one near each corner of the center panel, a plurality of lift members could be used to raise the center panel in many different combinations for a plurality of open positions. Multistage gas shocks 118 could also be used to provide further options to raise the center panel 12 and to provide variable access to the cargo area.

Actuation for Opening

The first preferred embodiment provides the gas shocks 118 to facilitate operation of the pivoting hinge members 28, and to rotate the center panel 12 into its raised positions. The gas shocks 118 are preferably activated by a spring-loaded actuator switch 27 or the like mounted on one of the truck side walls 112, 113 at the point where the tailgate 114 closes. As shown, the spring-loaded switch is preferably located near the tailgate latch, and operates in a manner similar to open-door sensors typically used in most vehicles, wherein an edge of the tailgate 114 in a closed position depressedly shuts off actuator switch 27. The actuator switch 27 in the closed condition may also be used to deactivate the work light 34, when the center panel 12 is closed.

Figure 8C:
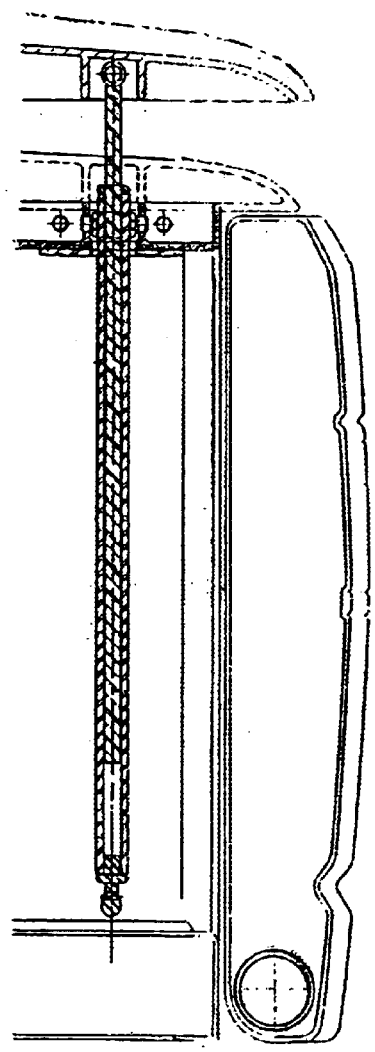
FIGS. 8C–8E are side plan views, partially in cross-section, of a tailgate portion of a truck bed, showing a sequence of steps in raising the back end of the center panel in the system of the invention.
Figure 8D:
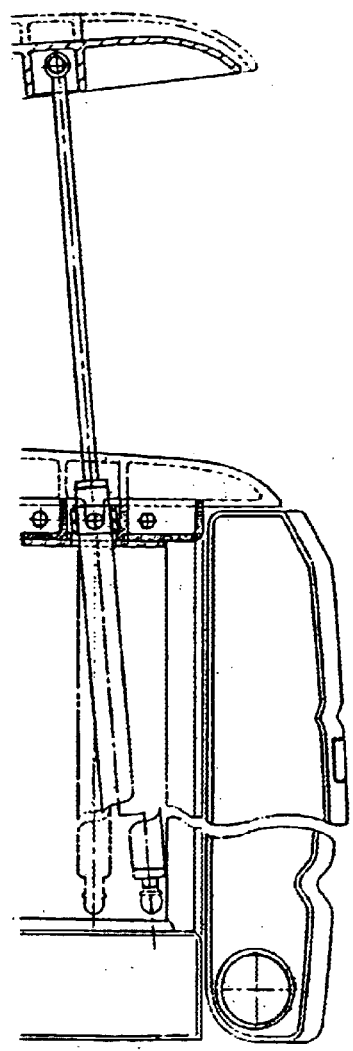
Figure 8E:
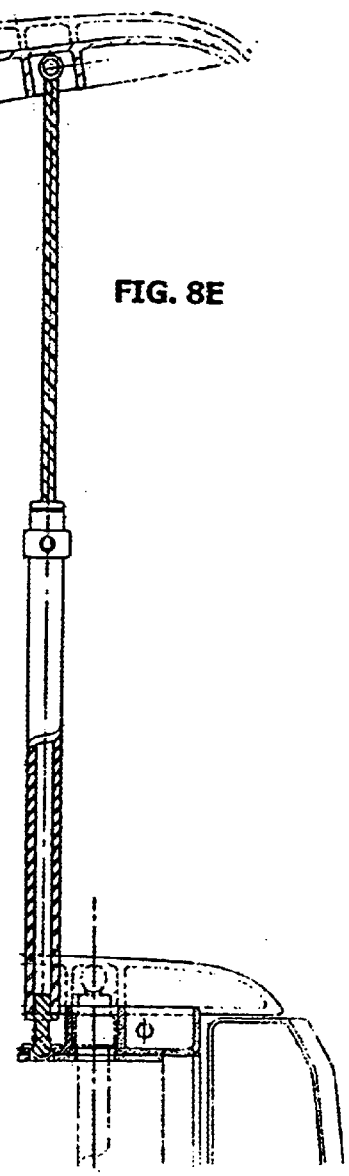
Figure 10:
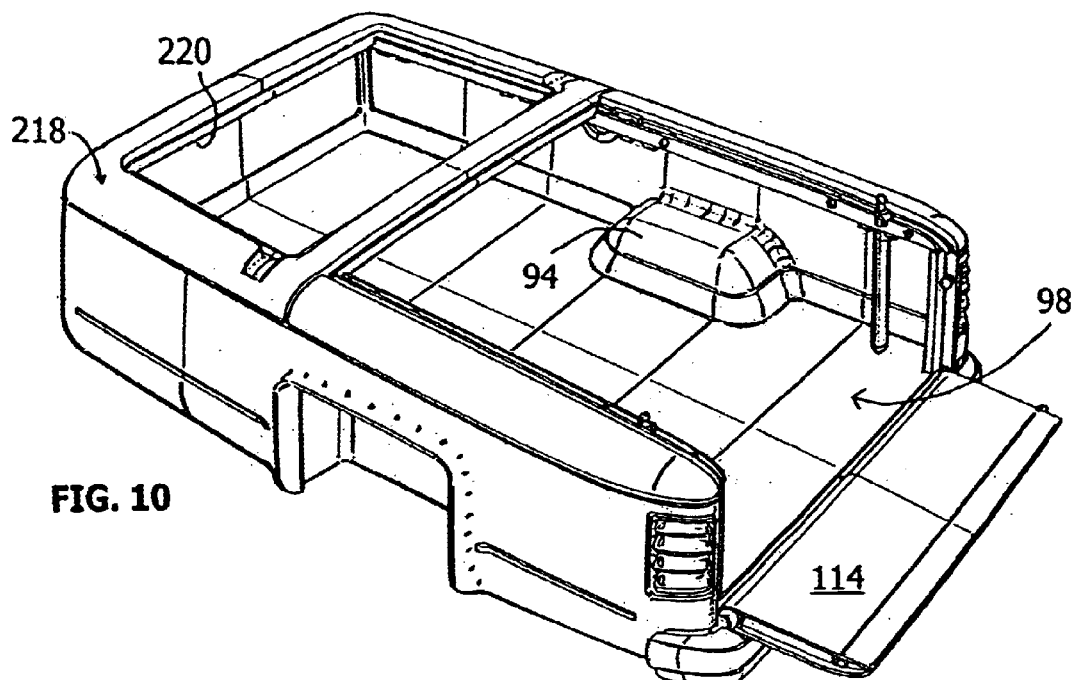
FIG. 10 is a perspective view of a bed portion of a pickup truck having a system according to the invention installed thereon, and with a front filler plate and the center panel removed for purposes of illustration.
Figure 20A:
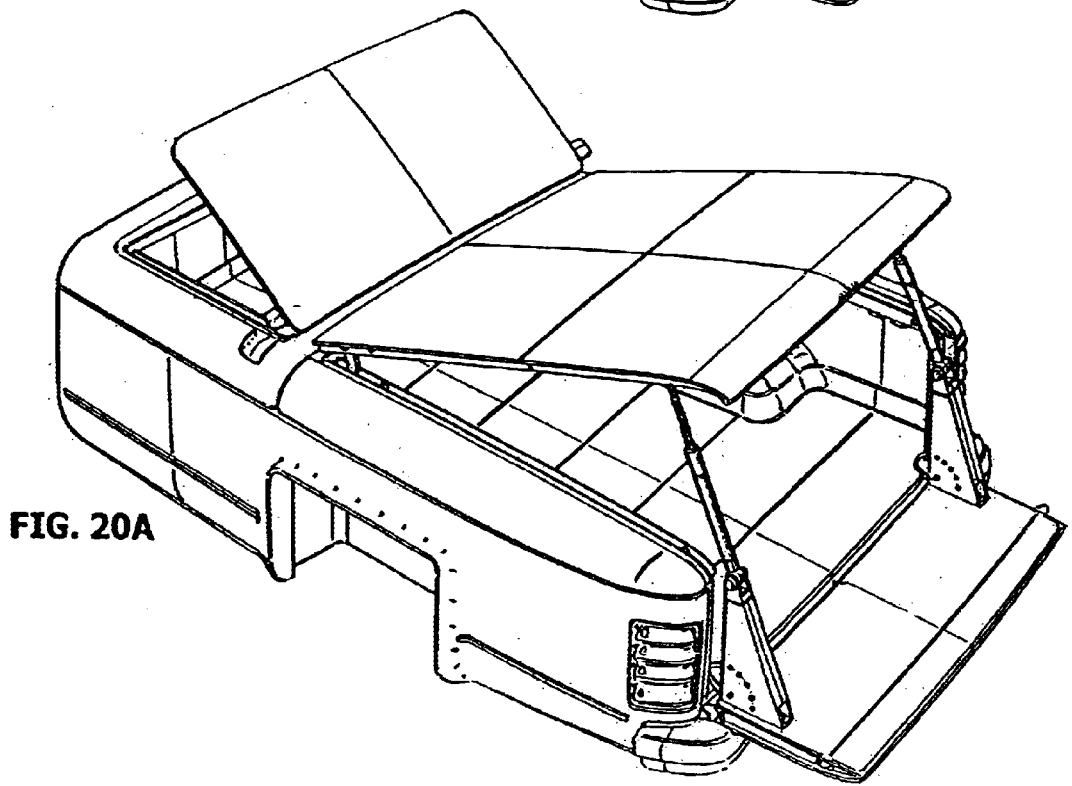
FIG. 20A is a perspective view of a bed portion of a long-bed truck with a cover system according to the invention installed thereon, including a pair of delta brackets attached to the tailgate, and a pair of lift members interconnecting the delta brackets to the center panel.

Opening of the tailgate preferably causes the spring-loaded actuator switch 27 to close, and thereby causes the pneumatic gas shocks 118 to actuate and rotate the center panel 12 to an open position as shown in Fig. It is preferable that gas shocks or other pivoting hinge members 28 are also manually actuatable to further extend the center panel vertically in a multitude of open positions as shown in FIGS. 8b and 8c. Alternatively, they could be activated by means of a control switch (not shown) or the like, located in the cab of the truck, and/or on a side wall 112 of the truck box or other preferred location. The pneumatic shocks 118 and pivoting hinge members 28 could alternatively be activated by means of a remote control arrangement (not shown).

The pneumatic shocks 118 may also function to retain the center panel 12 in a closed position, to provide security and limit access unless properly actuated by means of the actuator switch 27, or control switch (not shown) or the like secured in the cab of the truck or otherwise secured. The center panel 12 could also be maintained in the closed position by means of a locking mechanism (not shown) located in the center panel 112, in the side walls of the truck box 12, the tailgate 114, or other appropriate location.

3rd Preferred Embodiment—Opens with Tailgate

Referring to FIGS. 13 and 13a–13e there is shown a rigid cover 200 for a pickup truck bed 98 according to the third preferred embodiment of the present invention. The tonneau cover 200 is very similar to the cover 100 of the second embodiment, except that specialized structure is provided for automatically lifting the rear end of the center panel 202 concurrently with opening of the tailgate 114. The specialized lifting structure includes delta brackets 204 fixed to the tailgate 114. Each of the brackets 204 includes two parallel flanges 206 connected by a short web. The specialized lifting structure in this embodiment also includes a threadably adjustable support prop 205 connected between a tip end 208 of each of the brackets 204 and the center panel 202, and spring hinges 207 operatively cooperating with the brackets 204.

The support props 205 may be disconnected from the panel 202 or from the brackets 204 for completely removing the panel 1202.

Although not specifically shown, each of the second and third embodiments may include a front panel as well, in accordance with any of the other types of front panels discussed herein.

4th Preferred Embodiment—Tailgate Attached

According to yet another aspect of the invention, a tonneau cover or a center panel cover of same may be provided with a rear tailgate. The tail gate would replace the conventional tailgate at the rear of the pickup bed, be preferably constructed with a multiple layer construction similar to the center panel of the tonneau cover, and would pivot upwardly about the rear edge of the center panel.

Examples of Specialized Modifications within the Scope of the Invention

Referring now to FIGS. 16–20A, it will be seen that using the system and apparatus of the present invention, many specialized modifications of the basic design may be made, to adapt the design for specific applications.

Figure 16A:
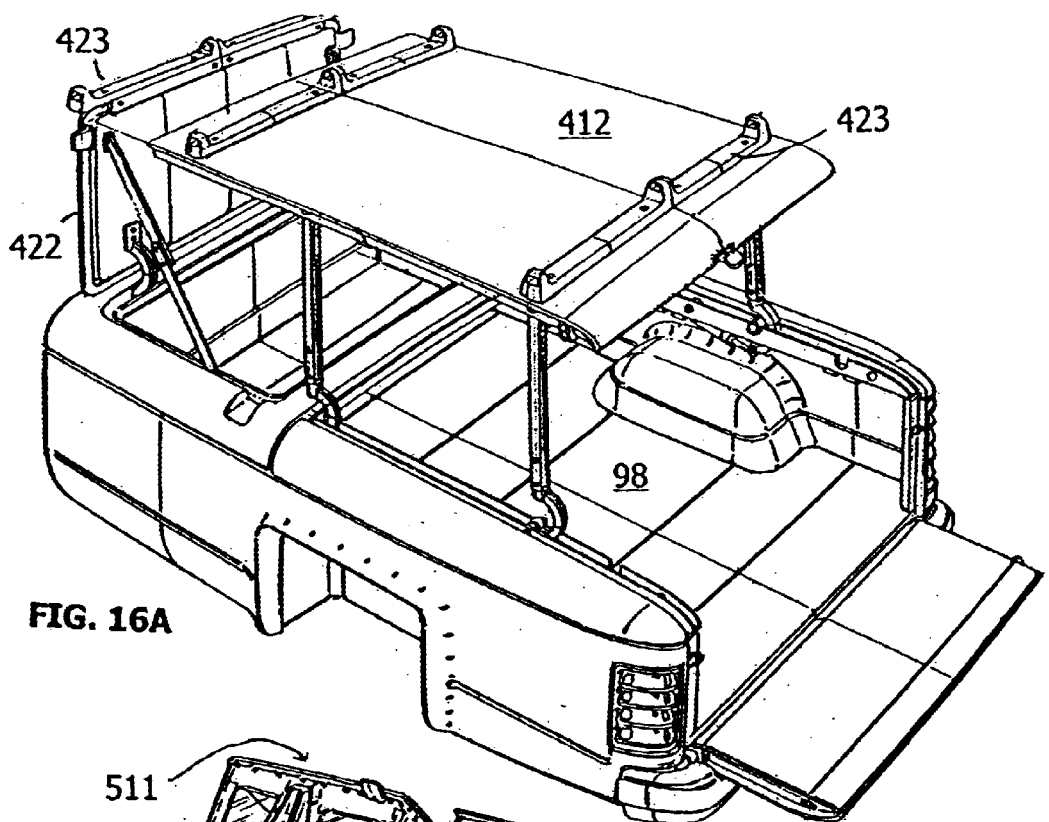
FIG. 16A is a perspective view of a truck bed with a cover system installed thereon, with the center and filler panels shown in open positions thereof, raised to a maximum height and with an optional ladder rack thereon.

For example, FIG. 16A illustrates an embodiment in which four G-hinges 70 and extensions 72 are used to pivotally raise the center panel 412 to a configuration parallel to the floor of the bed 98, at an elevated height. The center panel has a pair of cargo support ribs 423 thereon in this embodiment. Another two G-hinges 70 are usable to pivot the front cover panel 422 to a substantially vertical orientation thereof, and the free side edge of the front cover panel 422 also has a cargo support rib 423 thereon. With the front cover panel 422 and the center panel 412 both locked in the full upright positions shown in FIG. 16A, extended length cargo items such as, for example, ladders, pipes or lumber be carried on the cargo support ribs 423.

Figure 17:
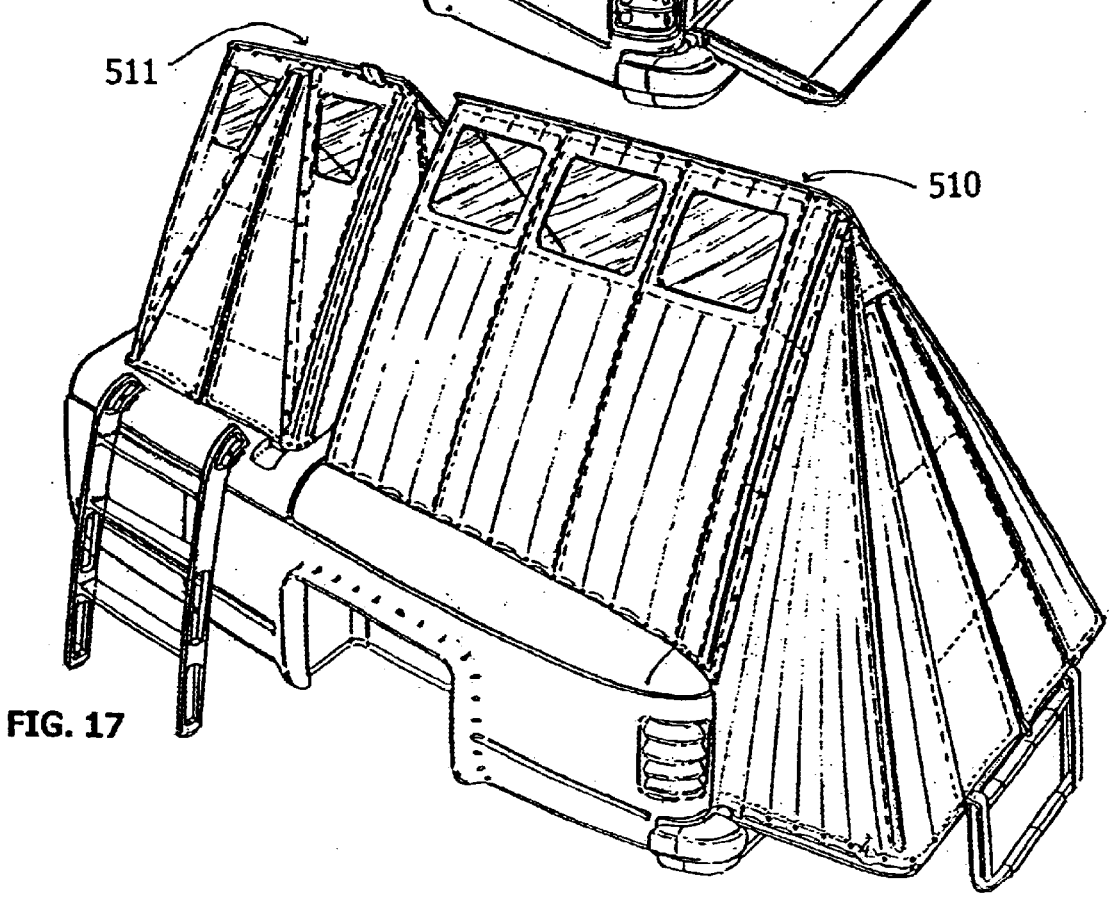
FIG. 17 is a perspective view of a bed portion of a long-bed truck with a cover system according to the invention installed thereon, and also showing a second optional fabric tent structure attached to components of the inventive system.

In FIG. 17 it will be seen that a tent or temporary shelter 510 may be constructed to be used in connection with the system of the present invention. Optionally, this may include a portable lavatory 511, in conjunction with the frame member 218 of the front panel.

Figure 12B:
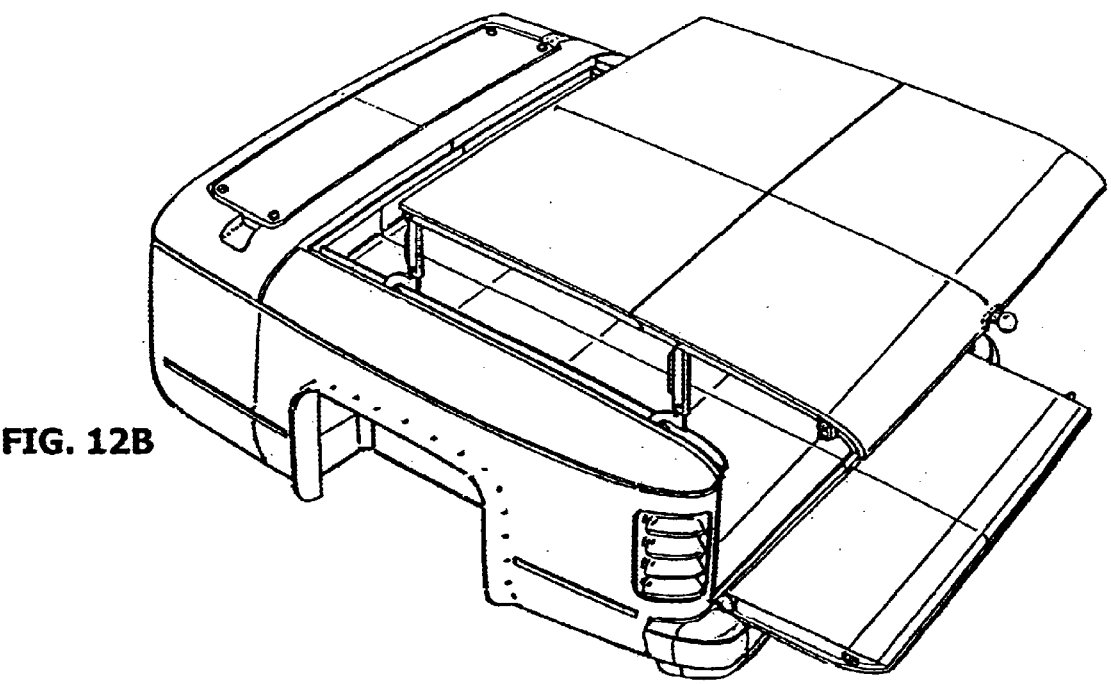
FIG. 12B is a perspective view of a bed portion of the short-bed truck of FIG. 12A, showing the center panel in a raised orientation thereof, parallel to the floor of the truck bed.

FIG. 12B illustrates a system adapted to pivotally raise the center panel 12 in a rearward direction, and only to a limited height above the closed position threreof, using four Ghinges 70.

FIG. 21A illustrates the use of multiple liquid reservoir tanks placed in the opening of the front cover, along with the auxiliary tailgate mentioned earlier.

Provision of Optional Appliques for Branding

Referring now to FIGS. 22A—22D, it will be seen that specialized appliques such as those shown at 720, 722 may be provided for attachment to the center panel 12 and to the front panel 18 or the filler panel 222. The appliques 720, 722 shown in the drawings are intended to illustrate, and not to limit, some of the decorative appliques which could be used in conjunction with the invention.

Method of Installing

The present invention also relates to a method of installing a cover assembly on a cargo area of a truck, including the steps of:

attaching a front panel to a truck cargo area between two side walls of said truck, said front panel being formed from a rigid material;

attaching a side panel atop each of said truck side walls behind said front panel, each of said side panels being formed from a rigid material; and operatively pivotally attaching a center panel to said truck, said center panel fitting between said side panels and behind said front panel, to provide a substantially continuous appearance therewith in a closed position thereof.

Optionally, the method of installing the cover system according to the invention may further include a step of attaching first and second sidewall risers to said truck walls before attaching said side panels, and wherein said side panels are respectively attached to said sidewall risers.

Although the present invention has been described herein with respect to preferred embodiments thereof, the foregoing descriptions are intended to be illustrative, and not restrictive. Those skilled in the art will realize that many modifications of the preferred embodiments could be made which would be operable. All such modifications, which are within the scope of the claims, are intended to be within the scope and spirit of the present invention.

I claim:

1. A modular cover assembly for installation on a truck box of a truck having a cab, said cover assembly comprising:

two substantially rigid side panels, each side panel adapted to fit on top of a longitudinal side wall of a truck box;

a center panel, said center panel fitting between said side panels in a closed position thereof; and support hardware for movably supporting said center panel on said truck box such that when installed thereon, said center panel may be moved upwardly relative to the truck box, between said closed position and at least one open position in which at least a portion of the center panel is raised above the side panels;

wherein said cover assembly is constructed and arranged to fit on said truck entirely outside of said cab.

2. The cover assembly of claim 1, further comprising a front panel for placement on a truck box in front of the center panel.

3. The cover assembly of claim 1, wherein each of the side panels has a plurality of openings formed therein which are alignable with a plurality of hollow receptacles formed in side walls of said truck, to allow a user to mount external hardware on the truck with the cover assembly installed theron.

4. The cover assembly of claim 2, wherein the front panel has a hollow opening formed therein, and further comprising a filler plate for placement covering the hollow opening in the front panel.

5. The cover assembly of claim 4, further comprising at least one hinge for pivotally attaching the filler plate to the front panel.

6. The cover assembly of claim 1, further comprising:

first and second lever arms for attaching to an inwardly facing surface of a truck tailgate, and two extension members for connecting placement between the respective lever arms and the center panel, whereby, when said cover assembly is installed on a truck having a tailgate and the lever arms are attached to the tailgate, opening movement of the tailgate moves of a portion of said center panel upwardly.

7. The cover assembly of claim 6, wherein each of the extension members comprises a hollow outer housing and an extensible inner rod slidably disposed within the housing.

8. The cover assembly of claim 6, wherein each of the first and second lever arms has a substantially triangular outline.

9. A modular cover assembly for covering a truck box of a truck having a cab, said cover assembly comprising:

a center panel comprising at least one substantially rigid section;

two substantially rigid side panels, each side panel adapted to fit on top of a longitudinal side wall of a truck box, said center panel fitting between said side panels in a closed position therof;

a front panel for placement on a truck box between opposed truck side walls and in front of the center and side panels; and support hardware for movably supporting said center panel on said truck box such that when installed thereon, said center panel may be moved upwardly relative to the truck box, between said closed position and at least one open position in which a portion of the center panel is raised above the side panels;

wherein said cover assembly is constructed and arranged to fit on said truck entirely outside of said cab.

10. The cover assembly of claim 9, wherein said support hardware comprises at least two hinges.

11. The cover assembly of claim 10, wherein said hinges are adapted for attachment between said center panel and said front panel.

12. The cover assembly of claim 10, wherein said hinges are adapted for attachment between said center panel and a selected one of said side panels.

13. The cover assembly of claim 9, wherein said support hardware comprises two support members for attaching to the respective said panels to help support the side panels on a truck bed.

14. The cover assembly of claim 9, wherein the front panel has a hallow opening formed therein, and further comprising a filler plate for placement covering the hallow opening in the front panel.

15. The cover assembly of claim 9, further comprising a pair of side wall risers for respective placement on top of the truck side walls and below the side panels.

16. The cover assembly of claim 9, wherein the center panel comprises at least two individual pieces, and further comprising a hinge member comprising:

a first rigid hinge segment for attaching to a first piece of the center panel, a second rigid hinge segment for fixedly attaching to a second piece of the center panel; and a flexible membrane for hingedly interconnecting the first and second hinge segments.

17. The cover assembly of claim 9, wherein the center panel comprises a pre-thinned area extending medially thereacross, to allow separation of the center panel into least two individual pieces.

18. The cover assembly of claim 14, wherein the filler plate is removable from the front panel, and further wherein the center panel is removable from between the side panels, to allow installation of supplemental accessories in place of the center panel and the filler plate.

19. The cover assembly of claim 9, further comprising a tray defining a storage area therein, wherein the tray fits removably between said side panels.

20. The cover assembly of claim 14, wherein the center panel has a plurality of substantially parallel spaced apart longitudinal ribs integrally formed on a lower surface thereof; and further wherein the center panel has a plurality of substantially parallel spaced apart lateral ribs integrally formed on a lower surface thereof, which are substantially transverse to the longitudinal ribs.

21. The cover assembly of claim 9, further comprising an auxiliary tailgate, which is pivotally attachable to a rear edge portion of said center panel.

22. The cover assembly of claim 9, wherein each of said side panels has a plurality of openings formed therethrough for alignment with stake pockets of said truck side walls.

23. A modular cover assembly for covering a truck box, comprising:

a center panel comprising at least one substantially rigid section;

a first substantially rigid side panel, said first side panel adapted to fit above a left side wall of a truck box;

a second substantially rigid side panel which is separate from said first side panel, said second side panel adapted to fit above a right side wall of a truck box;

said center panel fitting between said left and right side panels in a closed position thereof;

a front panel for placement on a truck box between opposed truck side walls and in front of the center and side panels; and support hardware for movably supporting said center panel on said truck box, such that when installed thereon, said center panel may be moved upwardly relative to the truck box, between said closed position and at least one open position in which a portion of the center panel is raised above the side panels.

* * * * *